US010281363B2

(12) United States Patent
Vitullo et al.

(10) Patent No.: US 10,281,363 B2
(45) Date of Patent: May 7, 2019

(54) SYSTEMS AND METHODS FOR FAULT DETECTION AND HANDLING BY ASSESSING BUILDING EQUIPMENT PERFORMANCE

(71) Applicant: Johnson Controls Technology Company, Holland, MI (US)

(72) Inventors: Steven R. Vitullo, Milwaukee, WI (US); Andrew J. Boettcher, Wauwatosa, WI (US)

(73) Assignee: JOHNSON CONTROLS TECHNOLOGY COMPANY, Auburn Hills, MI (US)

( * ) Notice: Subject to any disclaimer, the term of this patent is extended or adjusted under 35 U.S.C. 154(b) by 428 days.

(21) Appl. No.: 15/080,441

(22) Filed: Mar. 24, 2016

(65) Prior Publication Data
US 2017/0276571 A1 Sep. 28, 2017

(51) Int. Cl.
*G01B 5/28* (2006.01)
*G01B 5/30* (2006.01)
*G01M 99/00* (2011.01)
*G05B 23/02* (2006.01)
*G06Q 10/06* (2012.01)

(52) U.S. Cl.
CPC .......... *G01M 99/005* (2013.01); *G01M 99/00* (2013.01); *G05B 23/0248* (2013.01); *G06Q 10/06* (2013.01)

(58) Field of Classification Search
CPC ............... G01M 99/005; G01M 99/00; G05B 23/0248; G06Q 10/06
See application file for complete search history.

(56) References Cited

U.S. PATENT DOCUMENTS

| 9,729,639 | B2* | 8/2017 | Sustaeta ............. G05B 13/0285 |
| 2015/0316901 | A1 | 11/2015 | Wenzel et al. |
| 2015/0316902 | A1 | 11/2015 | Wenzel et al. |
| 2015/0316903 | A1 | 11/2015 | Asmus et al. |
| 2015/0316946 | A1 | 11/2015 | Wenzel et al. |
| 2016/0370258 | A1* | 12/2016 | Perez ..................... G01M 99/00 |
| 2017/0213303 | A1* | 7/2017 | Papadopoulos ...... G06Q 50/163 |
| 2017/0276571 | A1* | 9/2017 | Vitullo ................ G01M 99/005 |

OTHER PUBLICATIONS

U.S. Appl. No. 14/694,633, filed Apr. 23, 2015, Johnson Controls Technology Company.

(Continued)

*Primary Examiner* — Toan K Le
(74) *Attorney, Agent, or Firm* — Foley & Lardner LLP

(57) ABSTRACT

A system for detecting faults in building equipment includes an integration fault detector, a kernel density fault detector, and a fault detector selector. The integration fault detector is configured to detect faults in the building equipment by analyzing time series data using an integration fault detection technique. The kernel density fault detector is configured to detect faults in the building equipment by analyzing the time series data using a kernel density estimation fault detection technique. The fault detector selector is configured to select the integration fault detector or the kernel density fault detector for use in detecting faults in the building equipment based on an attribute of the time series data.

27 Claims, 20 Drawing Sheets

(56) References Cited

OTHER PUBLICATIONS

U.S. Appl. No. 14/872,074, filed Sep. 30, 2015, Johnson Controls Technology Company.
Huber, P., Robust Statistics, John Wiley & Sons, Inc., 1981, 317 pages.
Hwang et al., Nonparametric Multivariate Density Estimation: A Comparative Study, IEEE Transactions on Signal Processing, vol. 42, No. 10, Oct. 1994, 16 pages.
Iglewicz et al., How to Detect and Handle Outliers, vol. 16, Chapters 3-5, ASQC Quality Press, 1993, 35 pages.
Montgomery, D., Introduction to Statistical Quality Control, 2nd edition, John Wiley & Sons, Inc., 1991, pp. 101-146.
Nelson, L., Column: Technical Aids: The Shewhart Control Chart—Tests for Special Causes, Journal of Quality Technology, vol. 16, No. 4, Oct. 1984, 7 pages.
Pearson, R., Mining Imperfect Data: Dealing with Contamination and Incomplete Records, Society for Industrial and Applied Mathematics, Chapter 2, 2005, 61 pages.
Quesenberry, C., SPC Methods for Quality Improvement, Chapter 4, John Wiley & Sons, Inc., 1997, 49 pages.
Seo, S., A Review and Comparison of Methods for Detecting Outliers in Univariate Data Sets, Thesis, University of Pittsburgh, Apr. 26, 2006, retrieved from the Internet at http://d-scholarship.pitt.edu/7948/1/Seo.pdf on Jun. 9, 2016, 59 pages.
Tan et al., Introduction to Data Mining, vol. 1, Pearson Addison-Wesley. 2006, 169 pages.

\* cited by examiner

SYSTEMS AND METHODS FOR FAULT DETECTION AND HANDLING BY ASSESSING BUILDING EQUIPMENT PERFORMANCE

BACKGROUND

The present disclosure relates generally to detecting and handling faults in building equipment. Building equipment can experience faults (e.g., reduced performance or failure) as the equipment ages and degrades. Without algorithmic detection methods to monitor these faults, it becomes difficult to keep equipment running at high efficiency. Faults can have a negative effect on overall system performance, energy efficiency, and energy optimization of central plants. This is caused by the system optimizing to equipment with faults or low performance conditions. Algorithmic methods to detect faults and monitor equipment performance can help increase overall system efficiency and performance.

SUMMARY

One implementation of the present disclosure is a system for detecting faults in building equipment. The system includes an integration fault detector, a kernel density fault detector, and a fault detector selector. The integration fault detector is configured to detect faults in the building equipment by analyzing time series data using an integration fault detection technique. The kernel density fault detector is configured to detect faults in the building equipment by analyzing the time series data using a kernel density estimation fault detection technique. The fault detector selector is configured to select the integration fault detector or the kernel density fault detector for use in detecting faults in the building equipment based on an attribute of the time series data.

In some embodiments, the building equipment include one or more individual devices including at least one of a heater, a chiller, an air handling unit, a variable air volume unit, a pump, a fan, a cooling tower, a valve, an actuator, a damper, and a thermal energy storage (TES) device. In some embodiments, the building equipment include a building subsystem including at least one of a building electrical subsystem, an information communication technology subsystem, a security subsystem, a HVAC subsystem, a lighting subsystem, a lift/escalators subsystem, a fire safety subsystem, a refrigeration subsystem, an advertising or signage subsystem, a cooking subsystem, a vending subsystem, and a printer or copy service subsystem. In some embodiments, the building equipment include one or more subplant systems including at least one of a heater subplant, a heat recovery chiller subplant, a chiller subplant, a cooling tower subplant, a hot TES subplant, and a cold TES subplant. In some embodiments, the building equipment include an energy plant having a plurality of the subplant systems.

In some embodiments, the attribute of the time series data indicates that the time series data represents an uncontrolled process variable. In some embodiments, the uncontrolled process variable includes at least one of an efficiency metric for the building equipment, a coefficient of performance for the building equipment, a power consumption of the building equipment, and an uncontrolled flowrate affected by operating the building equipment. The fault detector selector can be configured to select the integration fault detector in response to a determination that the time series data represents an uncontrolled process variable.

In some embodiments, the attribute of the time series data indicates that the time series data represents a variable controlled to a setpoint. In some embodiments, the variable controlled to a setpoint includes at least one of a controlled flowrate, a controlled temperature, a controlled pressure, a controlled humidity, and a controlled power consumption. The fault detector selector can be configured to select the kernel density fault detector in response to a determination that the time series data represents a variable controlled to a setpoint.

In some embodiments, the integration fault detector and the kernel density fault detector are configured to initiate a corrective action in response to detecting a fault in the building equipment. The corrective action can include at least one of generating an alarm, providing a feedback to a controller for the building equipment, shutting off the building equipment, and automatically switching from using the building equipment to using other equipment configured to perform a same function as the building equipment in an automated control process In some embodiments, the system includes a modified z-score calculator configured to calculate a modified z-score for each data point of the time series data. The modified z-score can be provided as an input to the integration fault detector and the kernel density fault detector. In some embodiments, the modified z-score calculator is configured to calculate the modified z-score by determining a median of the time series data, determining a median absolute deviation of the time series data, and using the median and the median absolute deviation to calculate the modified z-score.

In some embodiments, the integration fault detector includes a distance calculator, an integrator, and a performance metric evaluator. The distance calculator can be configured to calculate a distance value for each data point of the time series data. The integrator can be configured to generate, for each data point of the time series data, a cumulative sum of the distance values calculated for the data point and any previous data points in the time series data. The performance metric evaluator can be configured to calculate a performance metric for each data point of the time series data based on the cumulative sum for the data point and to detect faults in the building equipment by comparing the calculated performance metrics to one or more performance thresholds.

In some embodiments, the kernel density fault detector includes a kernel density estimator, a cumulative distribution function generator, a threshold calculator, and an abnormal data detector. The kernel density estimator can be configured to generate a kernel density function based on the time series data. The cumulative distribution function generator can be configured to generate a cumulative distribution function based on the kernel density function. The threshold calculator can be configured to determine one or more control chart thresholds using the cumulative distribution function. The abnormal data detector can be configured to detect faults in the building equipment by applying control chart rules and the control chart thresholds to the time series data.

Another implementation of the present disclosure is a method for detecting faults in building equipment using an integration fault detection technique. The method includes receiving time series data. The time series data includes a plurality of data points each having a value affected by operating the building equipment. The method includes calculating a modified z-score for each of the plurality of data points and calculating a distance value for each of the plurality of data points. The distance value indicates a difference between the modified z-score for the data point and an outlier threshold. The method includes generating, for each of the plurality of data points, a cumulative sum of the distance values calculated for the data point and any previous data points in the time series data. The method includes calculating, for each of the plurality of data points, a performance metric based on the cumulative sum for the data point and detecting faults in the building equipment by comparing the calculated performance metrics to one or more performance thresholds.

In some embodiments, the method includes operating the building equipment to generate the time series data and adjusting an operation of the building equipment in response to detecting one or more faults in the building equipment.

In some embodiments, calculating the modified z-score includes determining a median of the time series data, determining a median absolute deviation of the time series data, and using the median and the median absolute deviation to calculate the modified z-score.

In some embodiments, calculating the distance value includes determining whether the modified z-score for the data point is positive or negative, calculating a first difference between the modified z-score and a first outlier threshold in response to a determination that the modified z-score is positive, and calculating a second difference between the modified z-score and a second outlier threshold in response to a determination that the modified z-score is negative. These steps can be performed for each of the plurality of data points.

In some embodiments, calculating the distance value includes determining whether the modified z-score for the data point is positive or negative, subtracting a first outlier threshold from the modified z-score in response to a determination that the modified z-score is positive, and subtracting the modified z-score from a second outlier threshold in response to a determination that the modified z-score is negative.

In some embodiments, generating the cumulative sum includes identifying a previous cumulative sum calculated for a previous data point in the time series, adding the distance value for the data point to the previous cumulative sum, determining whether a result of the adding has a negative value, setting the cumulative sum for the data point to zero in response to a determination that the result of the adding has a negative value, and setting the cumulative sum for the data point to the result of the adding in response to a determination that the result of the adding does not have a negative value. These steps can be performed for each of the plurality of data points.

In some embodiments, identifying the previous cumulative sum includes determining whether the data point is a first data point of the time series and setting the previous cumulative sum to zero in response to a determination that the data point is the first data point of the time series.

Another implementation of the present disclosure is a method for detecting faults in building equipment using a kernel density fault detection technique. The method includes receiving time series data including a plurality of data points. Each of the data points has a value affected by operating the building equipment. The method includes calculating a modified z-score for each of the plurality of data points, generating a kernel density distribution based on the modified z-scores, generating a cumulative distribution function based on the kernel density distribution, determining one or more control chart thresholds using the cumulative distribution function, and detecting faults in the building equipment by applying control chart rules and the control chart thresholds to the modified z-scores.

In some embodiments, the method includes operating the building equipment to generate the time series data and adjusting an operation of the building equipment in response to detecting one or more faults in the building equipment.

In some embodiments, generating the kernel density distribution includes generating a kernel smoothing function for each of the modified z-scores and combining the kernel smoothing functions to form the kernel density distribution.

In some embodiments, the cumulative distribution function expresses a probability that a random modified z-score has a value less than or equal to a threshold value. The random modified z-score can be selected from a set of modified z-scores defined by the kernel density distribution.

In some embodiments, determining the one or more control chart thresholds includes identifying one or more probability values, generating an inverse of the cumulative distribution function, and using the one or more probability values as inputs to the inverse of the cumulative distribution function to determine a control chart threshold corresponding to each of the probability values.

In some embodiments, detecting faults in the building equipment by applying the control chart rules and the control chart thresholds to the modified z-scores includes determining that a fault exists in response to a determination that a predetermined number of the modified z-scores are outside of a first range defined by the control chart thresholds. In some embodiments, detecting faults in the building equipment by applying the control chart rules and the control chart thresholds to the modified z-scores includes determining that a fault exists in response to a determination that a percentage of the predetermined number of the modified z-scores are outside of a second range defined by the control chart thresholds. The second range can be wider than the first range.

Those skilled in the art will appreciate that the summary is illustrative only and is not intended to be in any way limiting. Other aspects, inventive features, and advantages of the devices and/or processes described herein, as defined solely by the claims, will become apparent in the detailed description set forth herein and taken in conjunction with the accompanying drawings.

DETAILED DESCRIPTION

Referring generally to the FIGURES, a fault detection and diagnostics (FDD) system and components thereof are shown according to some embodiments. The FDD system is configured to detect faults in time series data. In some embodiments, the FDD system uses a fault detection by integration (FDI) technique to perform the fault detection. In other embodiments, the FDD system uses kernel density control charts (KDCC) to perform the fault detection.

The FDI technique can be performed by an integration fault detector. In some embodiments, the integration fault detector includes a distance calculator, an integrator, and a performance metric evaluator. The distance calculator can be configured to calculate a distance value for each data point of the time series data. The integrator can be configured to generate, for each data point of the time series data, a cumulative sum of the distance values calculated for the data point and any previous data points in the time series data. The performance metric evaluator can be configured to calculate a performance metric for each data point of the time series data based on the cumulative sum for the data point and to detect faults in the building equipment by comparing the calculated performance metrics to one or more performance thresholds.

The KDCC technique can be performed by a kernel density fault detector. In some embodiments, the kernel density fault detector includes a kernel density estimator, a cumulative distribution function generator, a threshold calculator, and an abnormal data detector. The kernel density estimator can be configured to generate a kernel density function based on the time series data. The cumulative distribution function generator can be configured to generate a cumulative distribution function based on the kernel density function. The threshold calculator can be configured to determine one or more control chart thresholds using the cumulative distribution function. The abnormal data detector can be configured to detect faults in the building equipment by applying control chart rules and the control chart thresholds to the time series data.

In some embodiments, the FDD system is configured to select the FDI technique or the KDCC technique based on the type or other attributes of time series data. For example, the FDD system can select the FDI technique when the time series data represents uncontrolled process variables (e.g., chiller efficiency, power consumption, etc.) whereas the FDD system can select the KDCC technique when the time series data represents variables that are controlled to a setpoint (e.g., chiller water output temperature, room temperature, etc.). These and other features of the FDD system are described in greater detail below.

Building Management System and HVAC System

Figure 1:
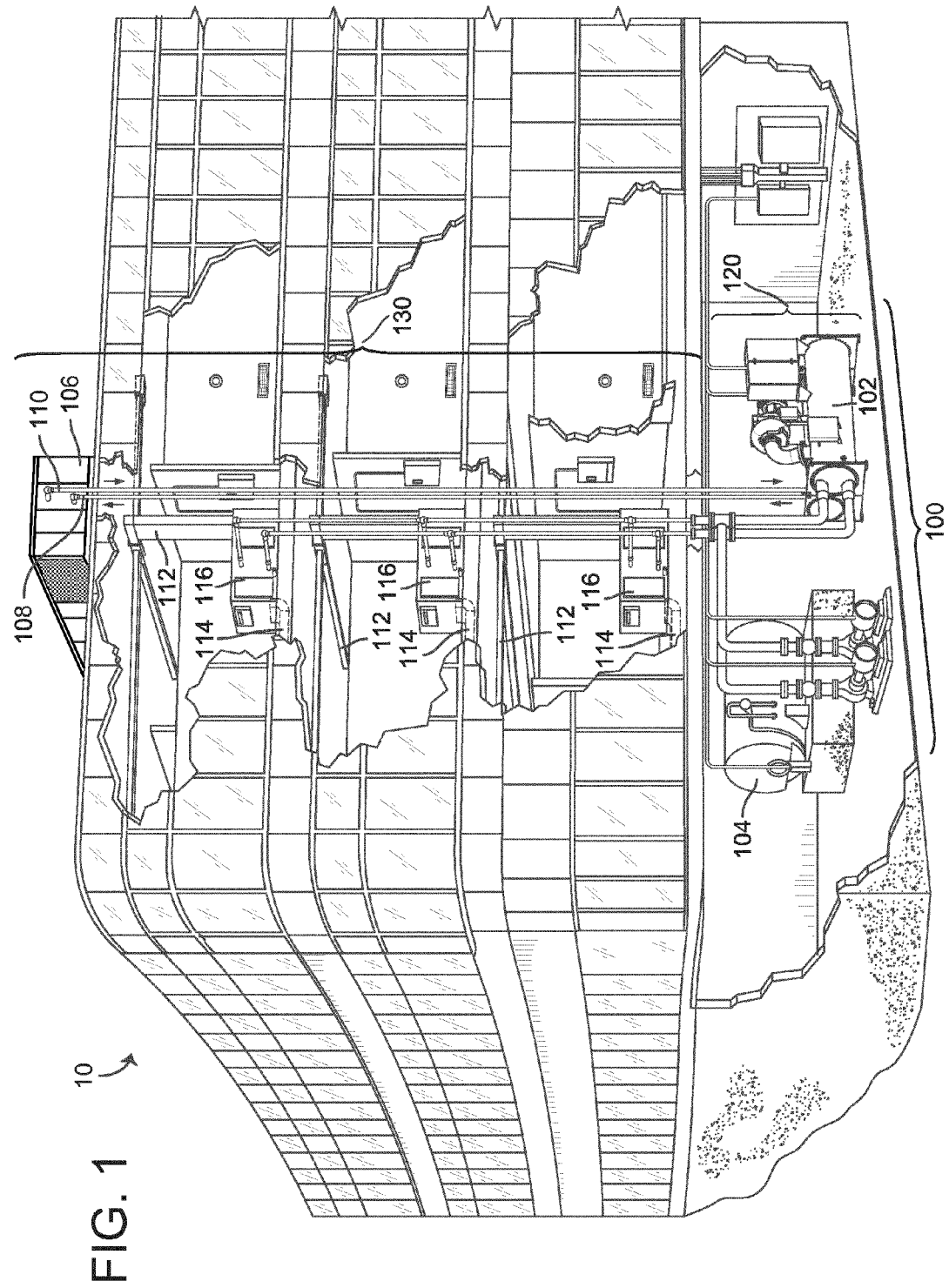
FIG. 1 is a drawing of a building equipped with a HVAC system and a building management system (BMS), according to some embodiments.

Referring now to FIGS. 1-4, a building management system (BMS) and HVAC system in which the systems and methods of the present disclosure can be implemented are shown, according to some embodiments. Referring particularly to FIG. 1, a perspective view of a building 10 is shown. Building 10 is served by a BMS. A BMS is, in general, a system of devices configured to control, monitor, and manage equipment in or around a building or building area. A BMS can include, for example, a HVAC system, a security system, a lighting system, a fire alerting system, any other system that is capable of managing building functions or devices, or any combination thereof.

The BMS that serves building 10 includes an HVAC system 100. HVAC system 100 can include a variety of HVAC devices (e.g., heaters, chillers, air handling units, pumps, fans, thermal energy storage, etc.) configured to provide heating, cooling, ventilation, or other services for building 10. For example, HVAC system 100 is shown to include a waterside system 120 and an airside system 130. Waterside system 120 may provide a heated or chilled fluid to an air handling unit of airside system 130. Airside system 130 may use the heated or chilled fluid to heat or cool an airflow provided to building 10. An exemplary waterside system and airside system which can be used in HVAC system 100 are described in greater detail with reference to FIGS. 2-3.

HVAC system 100 is shown to include a chiller 102, a boiler 104, and a rooftop air handling unit (AHU) 106. Waterside system 120 may use boiler 104 and chiller 102 to heat or cool a working fluid (e.g., water, glycol, etc.) and may circulate the working fluid to AHU 106. In various embodiments, the HVAC devices of waterside system 120 can be located in or around building 10 (as shown in FIG. 1) or at an offsite location such as a central plant (e.g., a chiller plant, a steam plant, a heat plant, etc.). The working fluid can be heated in boiler 104 or cooled in chiller 102, depending on whether heating or cooling is required in building 10. Boiler 104 may add heat to the circulated fluid, for example, by burning a combustible material (e.g., natural gas) or using an electric heating element. Chiller 102 may place the circulated fluid in a heat exchange relationship with another fluid (e.g., a refrigerant) in a heat exchanger (e.g., an evaporator) to absorb heat from the circulated fluid. The working fluid from chiller 102 and/or boiler 104 can be transported to AHU 106 via piping 108.

AHU 106 may place the working fluid in a heat exchange relationship with an airflow passing through AHU 106 (e.g., via one or more stages of cooling coils and/or heating coils). The airflow can be, for example, outside air, return air from within building 10, or a combination of both. AHU 106 may transfer heat between the airflow and the working fluid to provide heating or cooling for the airflow. For example, AHU 106 can include one or more fans or blowers configured to pass the airflow over or through a heat exchanger containing the working fluid. The working fluid may then return to chiller 102 or boiler 104 via piping 110.

Airside system 130 may deliver the airflow supplied by AHU 106 (i.e., the supply airflow) to building 10 via air supply ducts 112 and may provide return air from building 10 to AHU 106 via air return ducts 114. In some embodiments, airside system 130 includes multiple variable air volume (VAV) units 116. For example, airside system 130 is shown to include a separate VAV unit 116 on each floor or zone of building 10. VAV units 116 can include dampers or other flow control elements that can be operated to control an amount of the supply airflow provided to individual zones of building 10. In other embodiments, airside system 130 delivers the supply airflow into one or more zones of building 10 (e.g., via supply ducts 112) without using intermediate VAV units 116 or other flow control elements. AHU 106 can include various sensors (e.g., temperature sensors, pressure sensors, etc.) configured to measure attributes of the supply airflow. AHU 106 may receive input from sensors located within AHU 106 and/or within the building zone and may adjust the flow rate, temperature, or other attributes of the supply airflow through AHU 106 to achieve setpoint conditions for the building zone.

Figure 2:
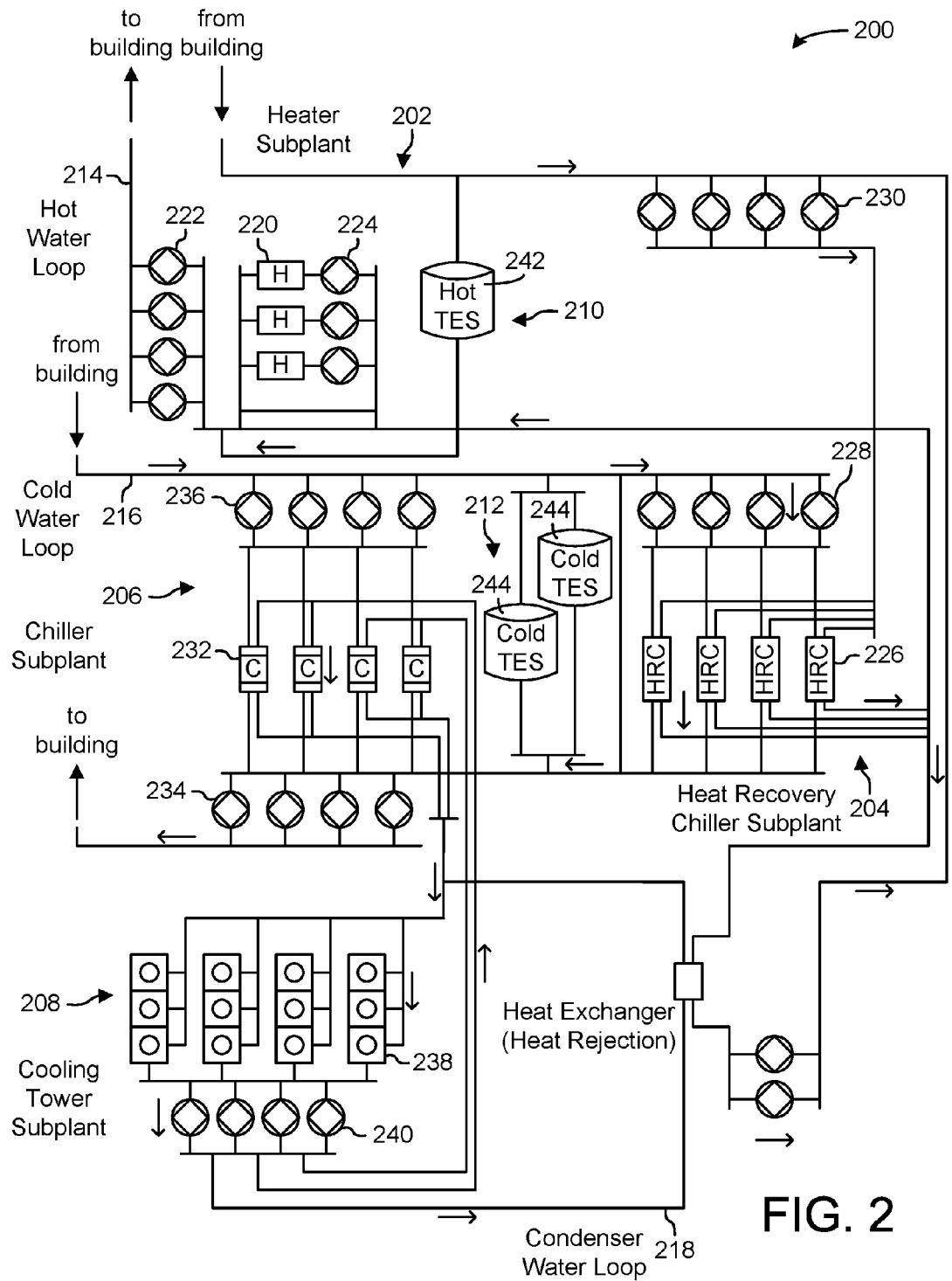
FIG. 2 is a schematic diagram of a waterside system which can be used to provide heating and/or cooling to the building of FIG. 1, according to some embodiments.

Referring now to FIG. 2, a block diagram of a waterside system 200 is shown, according to some embodiments. In various embodiments, waterside system 200 may supplement or replace waterside system 120 in HVAC system 100 or can be implemented separate from HVAC system 100. When implemented in HVAC system 100, waterside system 200 can include a subset of the HVAC devices in HVAC system 100 (e.g., boiler 104, chiller 102, pumps, valves, etc.) and may operate to supply a heated or chilled fluid to AHU 106. The HVAC devices of waterside system 200 can be located within building 10 (e.g., as components of waterside system 120) or at an offsite location such as a central plant.

In FIG. 2, waterside system 200 is shown as a central plant having several subplants 202-212. Subplants 202-212 are shown to include a heater subplant 202, a heat recovery chiller subplant 204, a chiller subplant 206, a cooling tower subplant 208, a hot thermal energy storage (TES) subplant 210, and a cold thermal energy storage (TES) subplant 212. Subplants 202-212 consume resources (e.g., water, natural gas, electricity, etc.) from utilities to serve the thermal energy loads (e.g., hot water, cold water, heating, cooling, etc.) of a building or campus. For example, heater subplant 202 can be configured to heat water in a hot water loop 214 that circulates the hot water between heater subplant 202 and building 10. Chiller subplant 206 can be configured to chill water in a cold water loop 216 that circulates the cold water between chiller subplant 206 building 10. Heat recovery chiller subplant 204 can be configured to transfer heat from cold water loop 216 to hot water loop 214 to provide additional heating for the hot water and additional cooling for the cold water. Condenser water loop 218 may absorb heat from the cold water in chiller subplant 206 and reject the absorbed heat in cooling tower subplant 208 or transfer the absorbed heat to hot water loop 214. Hot TES subplant 210 and cold TES subplant 212 may store hot and cold thermal energy, respectively, for subsequent use.

Hot water loop 214 and cold water loop 216 may deliver the heated and/or chilled water to air handlers located on the rooftop of building 10 (e.g., AHU 106) or to individual floors or zones of building 10 (e.g., VAV units 116). The air handlers push air past heat exchangers (e.g., heating coils or cooling coils) through which the water flows to provide heating or cooling for the air. The heated or cooled air can be delivered to individual zones of building 10 to serve the thermal energy loads of building 10. The water then returns to subplants 202-212 to receive further heating or cooling.

Although subplants 202-212 are shown and described as heating and cooling water for circulation to a building, it is understood that any other type of working fluid (e.g., glycol, $CO_2$, etc.) can be used in place of or in addition to water to serve the thermal energy loads. In other embodiments, subplants 202-212 may provide heating and/or cooling directly to the building or campus without requiring an intermediate heat transfer fluid. These and other variations to waterside system 200 are within the teachings of the present invention.

Each of subplants 202-212 can include a variety of equipment configured to facilitate the functions of the subplant. For example, heater subplant 202 is shown to include heating elements 220 (e.g., boilers, electric heaters, etc.) configured to add heat to the hot water in hot water loop 214. Heater subplant 202 is also shown to include pumps 222 and 224 configured to circulate the hot water in hot water loop 214 and to control the flow rate of the hot water through individual heating elements 220. Chiller subplant 206 is shown to include chillers 232 configured to remove heat from the cold water in cold water loop 216. Chiller subplant 206 is also shown to include pumps 234 and 236 configured to circulate the cold water in cold water loop 216 and to control the flow rate of the cold water through individual chillers 232.

Heat recovery chiller subplant 204 is shown to include heat recovery heat exchangers 226 (e.g., refrigeration circuits) configured to transfer heat from cold water loop 216 to hot water loop 214. Heat recovery chiller subplant 204 is also shown to include several pumps 228 and 230 configured to circulate the hot water and/or cold water through heat recovery heat exchangers 226 and to control the flow rate of the water through individual heat recovery heat exchangers 226. Cooling tower subplant 208 is shown to include cooling towers 238 configured to remove heat from the condenser water in condenser water loop 218. Cooling tower subplant 208 is also shown to include several pumps 240 configured to circulate the condenser water in condenser water loop 218 and to control the flow rate of the condenser water through individual cooling towers 238.

Hot TES subplant 210 is shown to include a hot TES tank 242 configured to store the hot water for later use. Hot TES subplant 210 may also include one or more pumps or valves configured to control the flow rate of the hot water into or out of hot TES tank 242. Cold TES subplant 212 is shown to include cold TES tanks 244 configured to store the cold water for later use. Cold TES subplant 212 may also include one or more pumps or valves configured to control the flow rate of the cold water into or out of cold TES tanks 244.

In some embodiments, one or more of the pumps in waterside system 200 (e.g., pumps 222, 224, 228, 230, 234, 236, and/or 240) or pipelines in waterside system 200 include an isolation valve associated therewith. Isolation valves can be integrated with the pumps or positioned upstream or downstream of the pumps to control the fluid flows in waterside system 200. In various embodiments, waterside system 200 can include more, fewer, or different types of devices and/or subplants based on the particular configuration of waterside system 200 and the types of loads served by waterside system 200.

Figure 3:
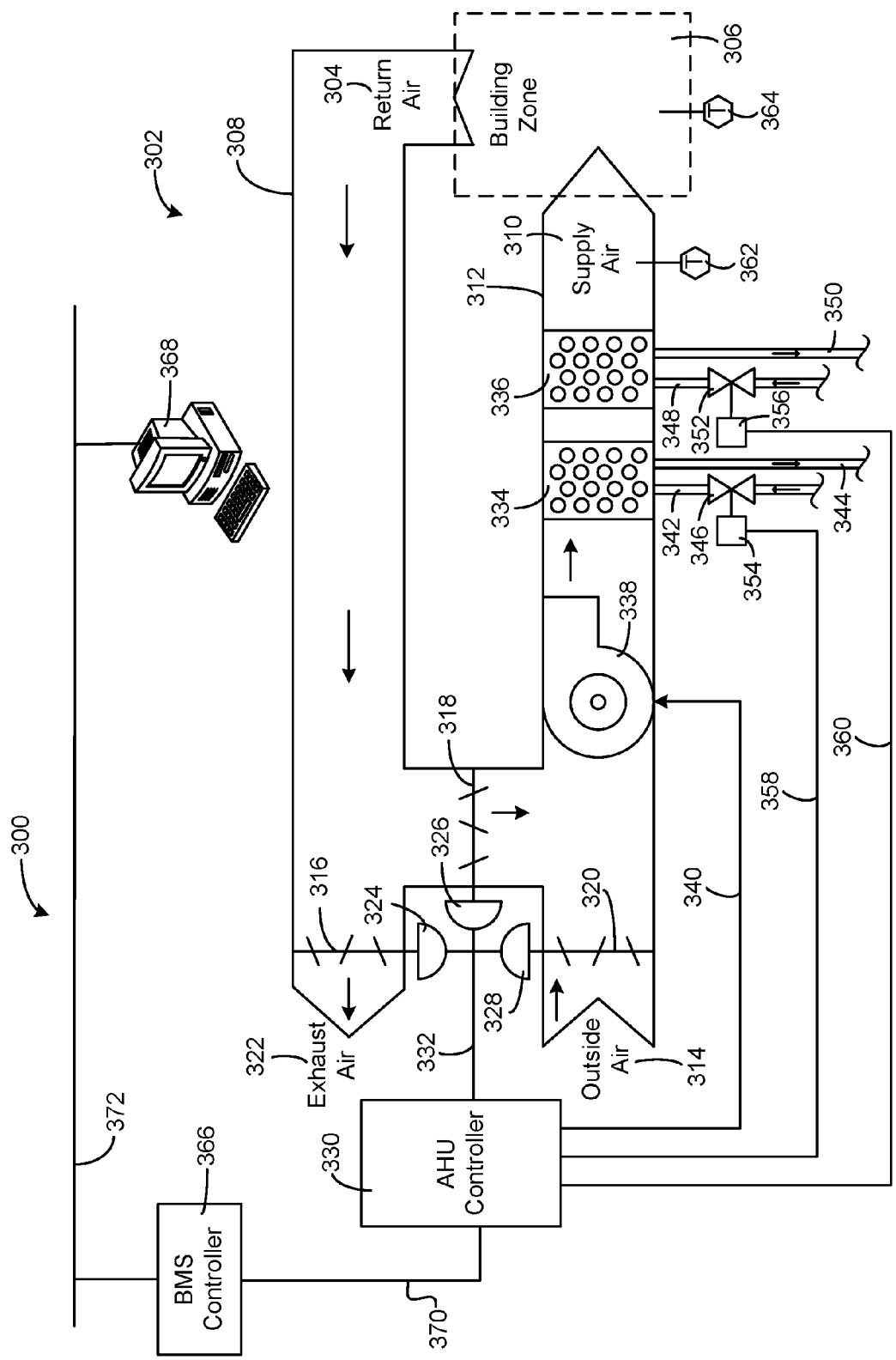
FIG. 3 is a schematic diagram of an airside system which can be used to provide heating and/or cooling to the building of FIG. 1, according to some embodiments.

Referring now to FIG. 3, a block diagram of an airside system 300 is shown, according to some embodiments. In various embodiments, airside system 300 may supplement or replace airside system 130 in HVAC system 100 or can be implemented separate from HVAC system 100. When implemented in HVAC system 100, airside system 300 can include a subset of the HVAC devices in HVAC system 100 (e.g., AHU 106, VAV units 116, ducts 112-114, fans, dampers, etc.) and can be located in or around building 10. Airside system 300 may operate to heat or cool an airflow provided to building 10 using a heated or chilled fluid provided by waterside system 200.

In FIG. 3, airside system 300 is shown to include an economizer-type air handling unit (AHU) 302. Economizer-type AHUs vary the amount of outside air and return air used by the air handling unit for heating or cooling. For example, AHU 302 may receive return air 304 from building zone 306 via return air duct 308 and may deliver supply air 310 to building zone 306 via supply air duct 312. In some embodiments, AHU 302 is a rooftop unit located on the roof of building 10 (e.g., AHU 106 as shown in FIG. 1) or otherwise positioned to receive both return air 304 and outside air 314. AHU 302 can be configured to operate exhaust air damper 316, mixing damper 318, and outside air damper 320 to control an amount of outside air 314 and return air 304 that combine to form supply air 310. Any return air 304 that does not pass through mixing damper 318 can be exhausted from AHU 302 through exhaust damper 316 as exhaust air 322.

Each of dampers 316-320 can be operated by an actuator. For example, exhaust air damper 316 can be operated by actuator 324, mixing damper 318 can be operated by actuator 326, and outside air damper 320 can be operated by actuator 328. Actuators 324-328 may communicate with an AHU controller 330 via a communications link 332. Actuators 324-328 may receive control signals from AHU controller 330 and may provide feedback signals to AHU controller 330. Feedback signals can include, for example, an indication of a current actuator or damper position, an amount of torque or force exerted by the actuator, diagnostic information (e.g., results of diagnostic tests performed by actuators 324-328), status information, commissioning information, configuration settings, calibration data, and/or other types of information or data that can be collected, stored, or used by actuators 324-328. AHU controller 330 can be an economizer controller configured to use one or more control algorithms (e.g., state-based algorithms, extremum seeking control (ESC) algorithms, proportional-integral (PI) control algorithms, proportional-integral-derivative (PID) control algorithms, model predictive control (MPC) algorithms, feedback control algorithms, etc.) to control actuators 324-328.

Still referring to FIG. 3, AHU 302 is shown to include a cooling coil 334, a heating coil 336, and a fan 338 positioned within supply air duct 312. Fan 338 can be configured to force supply air 310 through cooling coil 334 and/or heating coil 336 and provide supply air 310 to building zone 306. AHU controller 330 may communicate with fan 338 via communications link 340 to control a flow rate of supply air 310. In some embodiments, AHU controller 330 controls an amount of heating or cooling applied to supply air 310 by modulating a speed of fan 338.

Cooling coil 334 may receive a chilled fluid from waterside system 200 (e.g., from cold water loop 216) via piping 342 and may return the chilled fluid to waterside system 200 via piping 344. Valve 346 can be positioned along piping 342 or piping 344 to control a flow rate of the chilled fluid through cooling coil 334. In some embodiments, cooling coil 334 includes multiple stages of cooling coils that can be independently activated and deactivated (e.g., by AHU controller 330, by BMS controller 366, etc.) to modulate an amount of cooling applied to supply air 310.

Heating coil 336 may receive a heated fluid from waterside system 200 (e.g., from hot water loop 214) via piping 348 and may return the heated fluid to waterside system 200 via piping 350. Valve 352 can be positioned along piping 348 or piping 350 to control a flow rate of the heated fluid through heating coil 336. In some embodiments, heating coil 336 includes multiple stages of heating coils that can be independently activated and deactivated (e.g., by AHU controller 330, by BMS controller 366, etc.) to modulate an amount of heating applied to supply air 310.

Each of valves 346 and 352 can be controlled by an actuator. For example, valve 346 can be controlled by actuator 354 and valve 352 can be controlled by actuator 356. Actuators 354-356 may communicate with AHU controller 330 via communications links 358-360. Actuators 354-356 may receive control signals from AHU controller 330 and may provide feedback signals to controller 330. In some embodiments, AHU controller 330 receives a measurement of the supply air temperature from a temperature sensor 362 positioned in supply air duct 312 (e.g., downstream of cooling coil 334 and/or heating coil 336). AHU controller 330 may also receive a measurement of the temperature of building zone 306 from a temperature sensor 364 located in building zone 306.

In some embodiments, AHU controller 330 operates valves 346 and 352 via actuators 354-356 to modulate an amount of heating or cooling provided to supply air 310 (e.g., to achieve a setpoint temperature for supply air 310 or to maintain the temperature of supply air 310 within a setpoint temperature range). The positions of valves 346 and 352 affect the amount of heating or cooling provided to supply air 310 by cooling coil 334 or heating coil 336 and may correlate with the amount of energy consumed to achieve a desired supply air temperature. AHU controller 330 may control the temperature of supply air 310 and/or building zone 306 by activating or deactivating coils 334-336, adjusting a speed of fan 338, or a combination of both.

Still referring to FIG. 3, airside system 300 is shown to include a building management system (BMS) controller 366 and a client device 368. BMS controller 366 can include one or more computer systems (e.g., servers, supervisory controllers, subsystem controllers, etc.) that serve as system level controllers, application or data servers, head nodes, or master controllers for airside system 300, waterside system 200, HVAC system 100, and/or other controllable systems that serve building 10. BMS controller 366 may communicate with multiple downstream building systems or subsystems (e.g., HVAC system 100, a security system, a lighting system, waterside system 200, etc.) via a communications link 370 according to like or disparate protocols (e.g., LON, BACnet, etc.). In various embodiments, AHU controller 330 and BMS controller 366 can be separate (as shown in FIG. 3) or integrated. In an integrated implementation, AHU controller 330 can be a software module configured for execution by a processor of BMS controller 366.

In some embodiments, AHU controller 330 receives information from BMS controller 366 (e.g., commands, setpoints, operating boundaries, etc.) and provides information to BMS controller 366 (e.g., temperature measurements, valve or actuator positions, operating statuses, diagnostics, etc.). For example, AHU controller 330 may provide BMS controller 366 with temperature measurements from temperature sensors 362-364, equipment on/off states, equipment operating capacities, and/or any other information that can be used by BMS controller 366 to monitor or control a variable state or condition within building zone 306.

Client device 368 can include one or more human-machine interfaces or client interfaces (e.g., graphical user interfaces, reporting interfaces, text-based computer interfaces, client-facing web services, web servers that provide pages to web clients, etc.) for controlling, viewing, or otherwise interacting with HVAC system 100, its subsystems, and/or devices. Client device 368 can be a computer workstation, a client terminal, a remote or local interface, or any other type of user interface device. Client device 368 can be a stationary terminal or a mobile device. For example, client device 368 can be a desktop computer, a computer server with a user interface, a laptop computer, a tablet, a smartphone, a PDA, or any other type of mobile or non-mobile device. Client device 368 may communicate with BMS controller 366 and/or AHU controller 330 via communications link 372.

Figure 4:
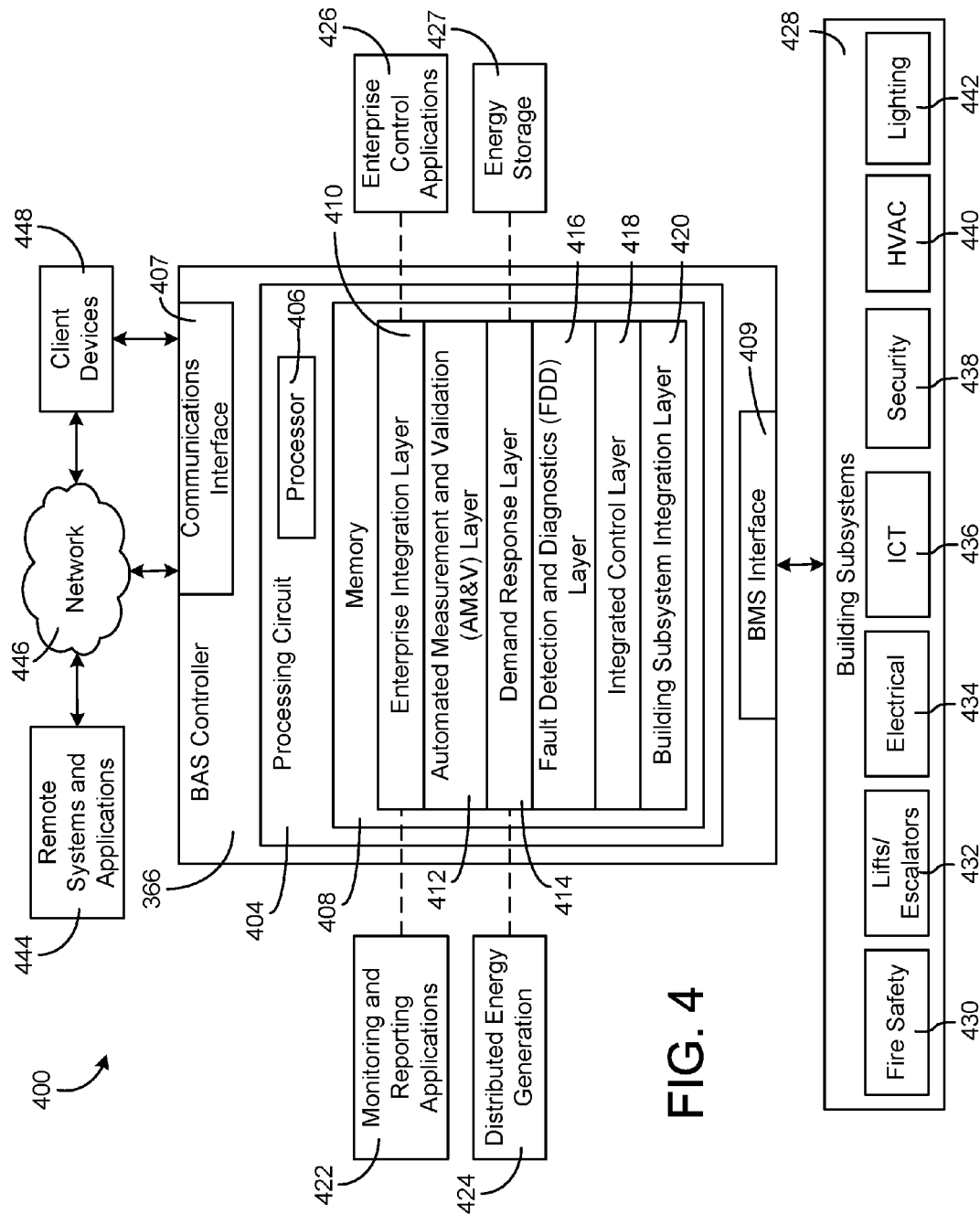
FIG. 4 is a block diagram of a BMS which can be used to monitor and control building equipment in or around the building of FIG. 1, according to some embodiments.

Referring now to FIG. 4, a block diagram of a building management system (BMS) 400 is shown, according to some embodiments. BMS 400 can be implemented in building 10 to automatically monitor and control various building functions. BMS 400 is shown to include BMS controller 366 and several building subsystems 428. Building subsystems 428 are shown to include a building electrical subsystem 434, an information communication technology (ICT) subsystem 436, a security subsystem 438, a HVAC subsystem 440, a lighting subsystem 442, a lift/escalators subsystem 432, and a fire safety subsystem 430. In various embodiments, building subsystems 428 can include fewer, additional, or alternative subsystems. For example, building subsystems 428 may also or alternatively include a refrigeration subsystem, an advertising or signage subsystem, a cooking subsystem, a vending subsystem, a printer or copy service subsystem, or any other type of building subsystem that uses controllable equipment and/or sensors to monitor or control building 10. In some embodiments, building subsystems 428 include waterside system 200 and/or airside system 300, as described with reference to FIGS. 2-3.

Each of building subsystems 428 can include any number of devices, controllers, and connections for completing its individual functions and control activities. HVAC subsystem 440 can include many of the same components as HVAC system 100, as described with reference to FIGS. 1-3. For example, HVAC subsystem 440 can include a chiller, a boiler, any number of air handling units, economizers, field controllers, supervisory controllers, actuators, temperature sensors, and other devices for controlling the temperature, humidity, airflow, or other variable conditions within building 10. Lighting subsystem 442 can include any number of light fixtures, ballasts, lighting sensors, dimmers, or other devices configured to controllably adjust the amount of light provided to a building space. Security subsystem 438 can include occupancy sensors, video surveillance cameras, digital video recorders, video processing servers, intrusion detection devices, access control devices and servers, or other security-related devices.

Still referring to FIG. 4, BMS controller 366 is shown to include a communications interface 407 and a BMS interface 409. Interface 407 may facilitate communications between BMS controller 366 and external applications (e.g., monitoring and reporting applications 422, enterprise control applications 426, remote systems and applications 444, applications residing on client devices 448, etc.) for allowing user control, monitoring, and adjustment to BMS controller 366 and/or subsystems 428. Interface 407 may also facilitate communications between BMS controller 366 and client devices 448. BMS interface 409 may facilitate communications between BMS controller 366 and building subsystems 428 (e.g., HVAC, lighting security, lifts, power distribution, business, etc.).

Interfaces 407, 409 can be or include wired or wireless communications interfaces (e.g., jacks, antennas, transmitters, receivers, transceivers, wire terminals, etc.) for conducting data communications with building subsystems 428 or other external systems or devices. In various embodiments, communications via interfaces 407, 409 can be direct (e.g., local wired or wireless communications) or via a communications network 446 (e.g., a WAN, the Internet, a cellular network, etc.). For example, interfaces 407, 409 can include an Ethernet card and port for sending and receiving data via an Ethernet-based communications link or network. In another example, interfaces 407, 409 can include a WiFi transceiver for communicating via a wireless communications network. In another example, one or both of interfaces 407, 409 can include cellular or mobile phone communications transceivers. In one embodiment, communications interface 407 is a power line communications interface and BMS interface 409 is an Ethernet interface. In other embodiments, both communications interface 407 and BMS interface 409 are Ethernet interfaces or are the same Ethernet interface.

Still referring to FIG. 4, BMS controller 366 is shown to include a processing circuit 404 including a processor 406 and memory 408. Processing circuit 404 can be communicably connected to BMS interface 409 and/or communications interface 407 such that processing circuit 404 and the various components thereof can send and receive data via interfaces 407, 409. Processor 406 can be implemented as a general purpose processor, an application specific integrated circuit (ASIC), one or more field programmable gate arrays (FPGAs), a group of processing components, or other suitable electronic processing components.

Memory 408 (e.g., memory, memory unit, storage device, etc.) can include one or more devices (e.g., RAM, ROM, Flash memory, hard disk storage, etc.) for storing data and/or computer code for completing or facilitating the various processes, layers and modules described in the present application. Memory 408 can be or include volatile memory or non-volatile memory. Memory 408 can include database components, object code components, script components, or any other type of information structure for supporting the various activities and information structures described in the present application. According to some embodiments, memory 408 is communicably connected to processor 406 via processing circuit 404 and includes computer code for executing (e.g., by processing circuit 404 and/or processor 406) one or more processes described herein.

In some embodiments, BMS controller 366 is implemented within a single computer (e.g., one server, one housing, etc.). In various other embodiments BMS controller 366 can be distributed across multiple servers or computers (e.g., that can exist in distributed locations). Further, while FIG. 4 shows applications 422 and 426 as existing outside of BMS controller 366, in some embodiments, applications 422 and 426 can be hosted within BMS controller 366 (e.g., within memory 408).

Still referring to FIG. 4, memory 408 is shown to include an enterprise integration layer 410, an automated measurement and validation (AM&V) layer 412, a demand response (DR) layer 414, a fault detection and diagnostics (FDD) layer 416, an integrated control layer 418, and a building subsystem integration later 420. Layers 410-420 can be configured to receive inputs from building subsystems 428 and other data sources, determine optimal control actions for building subsystems 428 based on the inputs, generate control signals based on the optimal control actions, and provide the generated control signals to building subsystems 428. The following paragraphs describe some of the general functions performed by each of layers 410-420 in BMS 400.

Enterprise integration layer 410 can be configured to serve clients or local applications with information and services to support a variety of enterprise-level applications. For example, enterprise control applications 426 can be configured to provide subsystem-spanning control to a graphical user interface (GUI) or to any number of enterprise-level business applications (e.g., accounting systems, user identification systems, etc.). Enterprise control applications 426 may also or alternatively be configured to provide configuration GUIs for configuring BMS controller 366. In yet other embodiments, enterprise control applications 426 can work with layers 410-420 to optimize building performance (e.g., efficiency, energy use, comfort, or safety) based on inputs received at interface 407 and/or BMS interface 409.

Building subsystem integration layer 420 can be configured to manage communications between BMS controller 366 and building subsystems 428. For example, building subsystem integration layer 420 may receive sensor data and input signals from building subsystems 428 and provide output data and control signals to building subsystems 428. Building subsystem integration layer 420 may also be configured to manage communications between building subsystems 428. Building subsystem integration layer 420 translate communications (e.g., sensor data, input signals, output signals, etc.) across a variety of multi-vendor/multi-protocol systems.

Demand response layer 414 can be configured to optimize resource usage (e.g., electricity use, natural gas use, water use, etc.) and/or the monetary cost of such resource usage in response to satisfy the demand of building 10. The optimization can be based on time-of-use prices, curtailment signals, energy availability, or other data received from utility providers, distributed energy generation systems 424, from energy storage 427 (e.g., hot TES 242, cold TES 244, etc.), or from other sources. Demand response layer 414 may receive inputs from other layers of BMS controller 366 (e.g., building subsystem integration layer 420, integrated control layer 418, etc.). The inputs received from other layers can include environmental or sensor inputs such as temperature, carbon dioxide levels, relative humidity levels, air quality sensor outputs, occupancy sensor outputs, room schedules, and the like. The inputs may also include inputs such as electrical use (e.g., expressed in kWh), thermal load measurements, pricing information, projected pricing, smoothed pricing, curtailment signals from utilities, and the like.

According to some embodiments, demand response layer 414 includes control logic for responding to the data and signals it receives. These responses can include communicating with the control algorithms in integrated control layer 418, changing control strategies, changing setpoints, or activating/deactivating building equipment or subsystems in a controlled manner. Demand response layer 414 may also include control logic configured to determine when to utilize stored energy. For example, demand response layer 414 may determine to begin using energy from energy storage 427 just prior to the beginning of a peak use hour.

In some embodiments, demand response layer 414 includes a control module configured to actively initiate control actions (e.g., automatically changing setpoints) which minimize energy costs based on one or more inputs representative of or based on demand (e.g., price, a curtailment signal, a demand level, etc.). In some embodiments, demand response layer 414 uses equipment models to determine an optimal set of control actions. The equipment models can include, for example, thermodynamic models describing the inputs, outputs, and/or functions performed by various sets of building equipment. Equipment models may represent collections of building equipment (e.g., subplants, chiller arrays, etc.) or individual devices (e.g., individual chillers, heaters, pumps, etc.).

Demand response layer 414 may further include or draw upon one or more demand response policy definitions (e.g., databases, XML files, etc.). The policy definitions can be edited or adjusted by a user (e.g., via a graphical user interface) so that the control actions initiated in response to demand inputs can be tailored for the user's application, desired comfort level, particular building equipment, or based on other concerns. For example, the demand response policy definitions can specify which equipment can be turned on or off in response to particular demand inputs, how long a system or piece of equipment should be turned off, what setpoints can be changed, what the allowable set point adjustment range is, how long to hold a high demand setpoint before returning to a normally scheduled setpoint, how close to approach capacity limits, which equipment modes to utilize, the energy transfer rates (e.g., the maximum rate, an alarm rate, other rate boundary information, etc.) into and out of energy storage devices (e.g., thermal storage tanks, battery banks, etc.), and when to dispatch on-site generation of energy (e.g., via fuel cells, a motor generator set, etc.).

Integrated control layer 418 can be configured to use the data input or output of building subsystem integration layer 420 and/or demand response later 414 to make control decisions. Due to the subsystem integration provided by building subsystem integration layer 420, integrated control layer 418 can integrate control activities of the subsystems 428 such that the subsystems 428 behave as a single integrated supersystem. In some embodiments, integrated control layer 418 includes control logic that uses inputs and outputs from several building subsystems to provide greater comfort and energy savings relative to the comfort and energy savings that separate subsystems could provide alone. For example, integrated control layer 418 can be configured to use an input from a first subsystem to make an energy-saving control decision for a second subsystem. Results of these decisions can be communicated back to building subsystem integration layer 420.

Integrated control layer 418 is shown to be logically below demand response layer 414. Integrated control layer 418 can be configured to enhance the effectiveness of demand response layer 414 by enabling building subsystems 428 and their respective control loops to be controlled in coordination with demand response layer 414. This configuration may advantageously reduce disruptive demand response behavior relative to conventional systems. For example, integrated control layer 418 can be configured to assure that a demand response-driven upward adjustment to the setpoint for chilled water temperature (or another component that directly or indirectly affects temperature) does not result in an increase in fan energy (or other energy used to cool a space) that would result in greater total building energy use than was saved at the chiller.

Integrated control layer 418 can be configured to provide feedback to demand response layer 414 so that demand response layer 414 checks that constraints (e.g., temperature, lighting levels, etc.) are properly maintained even while demanded load shedding is in progress. The constraints may also include setpoint or sensed boundaries relating to safety, equipment operating limits and performance, comfort, fire codes, electrical codes, energy codes, and the like. Integrated control layer 418 is also logically below fault detection and diagnostics layer 416 and automated measurement and validation layer 412. Integrated control layer 418 can be configured to provide calculated inputs (e.g., aggregations) to these higher levels based on outputs from more than one building subsystem.

Automated measurement and validation (AM&V) layer 412 can be configured to verify that control strategies commanded by integrated control layer 418 or demand response layer 414 are working properly (e.g., using data aggregated by AM&V layer 412, integrated control layer 418, building subsystem integration layer 420, FDD layer 416, or otherwise). The calculations made by AM&V layer 412 can be based on building system energy models and/or equipment models for individual BMS devices or subsystems. For example, AM&V layer 412 may compare a model-predicted output with an actual output from building subsystems 428 to determine an accuracy of the model.

Fault detection and diagnostics (FDD) layer 416 can be configured to provide on-going fault detection for building subsystems 428, building subsystem devices (i.e., building equipment), and control algorithms used by demand response layer 414 and integrated control layer 418. FDD layer 416 may receive data inputs from integrated control layer 418, directly from one or more building subsystems or devices, or from another data source. FDD layer 416 may automatically diagnose and respond to detected faults. The responses to detected or diagnosed faults can include providing an alert message to a user, a maintenance scheduling system, or a control algorithm configured to attempt to repair the fault or to work-around the fault.

FDD layer 416 can be configured to output a specific identification of the faulty component or cause of the fault (e.g., loose damper linkage) using detailed subsystem inputs available at building subsystem integration layer 420. In other exemplary embodiments, FDD layer 416 is configured to provide "fault" events to integrated control layer 418 which executes control strategies and policies in response to the received fault events. According to some embodiments, FDD layer 416 (or a policy executed by an integrated control engine or business rules engine) may shut-down systems or direct control activities around faulty devices or systems to reduce energy waste, extend equipment life, or assure proper control response.

FDD layer 416 can be configured to store or access a variety of different system data stores (or data points for live data). FDD layer 416 may use some content of the data stores to identify faults at the equipment level (e.g., specific chiller, specific AHU, specific terminal unit, etc.) and other content to identify faults at component or subsystem levels. For example, building subsystems 428 may generate temporal (i.e., time-series) data indicating the performance of BMS 400 and the various components thereof. The data generated by building subsystems 428 can include measured or calculated values that exhibit statistical characteristics and provide information about how the corresponding system or process (e.g., a temperature control process, a flow control process, etc.) is performing in terms of error from its setpoint. These processes can be examined by FDD layer 416 to expose when the system begins to degrade in performance and alert a user to repair the fault before it becomes more severe.

Fault Detection and Diagnostics

Figure 5A:
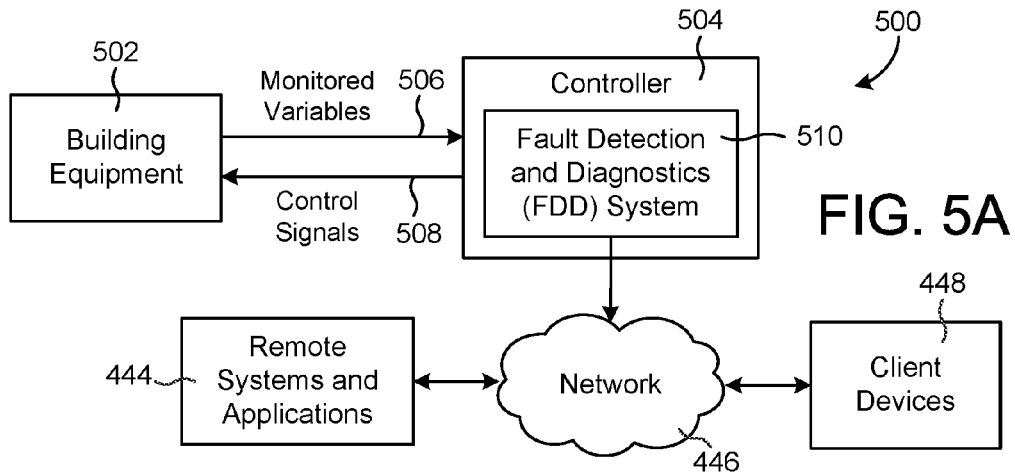
FIG. 5A is a block diagram of another BMS including building equipment, a controller, and remote systems and applications, in which the controller includes a fault detection and diagnostics (FDD) system, according to some embodiments.
Figure 5B:
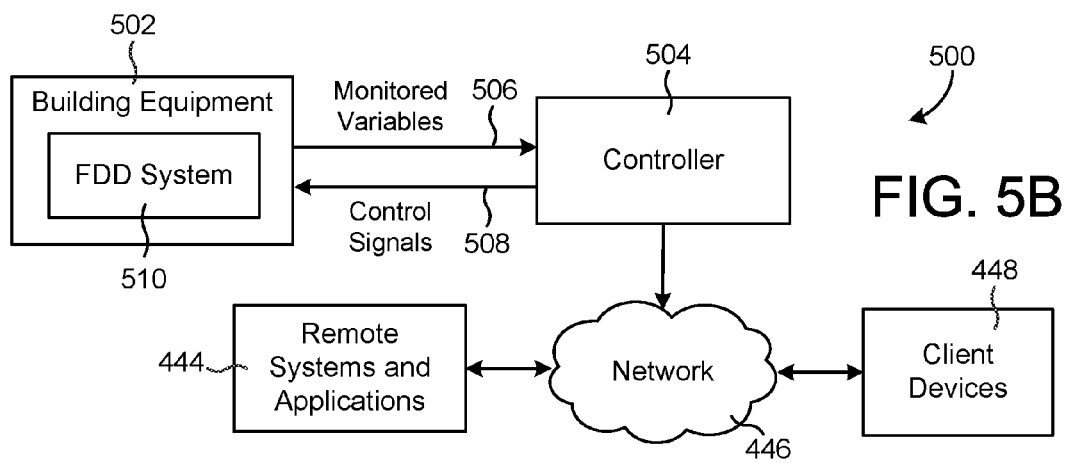
FIG. 5B is a block diagram of another BMS including building equipment, a controller, and remote systems and applications, in which the building equipment includes the FDD system, according to some embodiments.
Figure 5C:
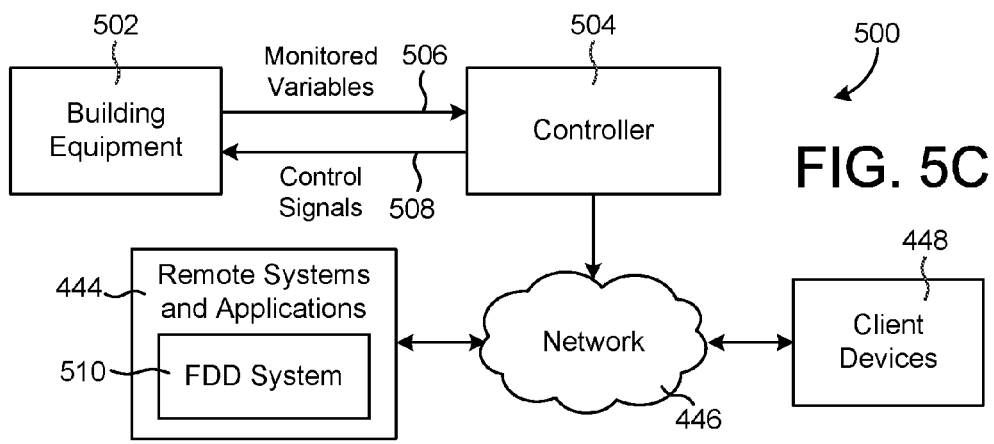
FIG. 5C is a block diagram of another BMS including building equipment, a controller, and remote systems and applications, in which the remote systems and applications include the FDD system, according to some embodiments.

Referring now to FIGS. 5A-5C, several block diagrams of a building management system (BMS) 500 are shown, according to various embodiments. BMS 500 can include many of the same components as BMS 400, as described with reference to FIG. 4. For example, BMS 500 is shown to include building equipment 502, a controller 504, network 446, client devices 448, and remote systems and applications 444.

Building equipment 502 can include any type of equipment capable of monitoring and/or controlling conditions within a building (e.g., HVAC equipment, lighting equipment, security equipment, fire safety equipment, etc.) or other types of equipment which can be used in or around a building (e.g., ICT equipment, lifts/escalators, refrigeration equipment, advertising or signage, cooling equipment, vending equipment, etc.). Building equipment 502 can include various types of sensors (e.g., temperature sensors, humidity sensors, lighting sensors, motion sensors, voltage sensors, etc.) configured to measure a variable of interest in or around a building (e.g., temperature, humidity, light intensity, power consumption, etc.) and/or controllable equipment configured to affect the measured variable (e.g., heaters, chillers, humidifiers, lighting devices, etc.).

In some embodiments, building equipment 502 includes one or more devices of HVAC system 100, one or more devices or subplants of waterside system 200, and/or one or more devices of airside system 300 as described with reference to FIGS. 1-3. For example, building equipment 502 can include one or more heaters, chillers, air handling units, variable air volume units, pumps, fans, cooling towers, thermal energy storage, valves, actuators, dampers, heating or cooling coils, and/or other types of equipment which can be used in or around a building. In some embodiments, building equipment 502 includes one or more of building subsystems 428 as described with reference to FIG. 4.

In some embodiments, building equipment 502 includes an energy plant (e.g., waterside system 200) and/or subplant systems (e.g., heater subplant 202, heat recovery chiller subplant 204, chiller subplant 206, cooling tower subplant 208, hot TES subplant 210, cold TES subplant 212, etc.). As used herein, the term "building equipment" includes any device or combination of devices (e.g., building subsystems, energy plants, subplant systems, etc.) that can be used in a building and/or can provide services to a building (e.g., heating, cooling, airflow, electricity, hot water, cold water, etc.). Building equipment 502 is not limited to equipment physically installed in the building. For example, building equipment 502 can include a remote energy plant that provides a heated or chilled fluid to a building and/or one or more subplants or devices within the remote energy plant.

In some embodiments, controller 504 is the same or similar to BMS controller 366, as described with reference to FIGS. 3-4. For example, controller 504 can be a supervisory controller configured to monitor and control multiple building subsystems. In other embodiments, controller 504 is subsystem controller for one of building subsystems 428 or subplants (e.g., a HVAC controller, a lighting controller, a heater subplant controller, a chiller subplant controller, etc. etc.) or a local controller for one or more BMS devices (e.g., a chiller controller, an AHU controller, an actuator controller, etc.). Controller 504 can receive monitored variables 506 from building equipment 502 and can provide control signals 508 to building equipment 502.

Still referring to FIGS. 5A-5C, BMS 500 is shown to include a fault detection and diagnostics (FDD) system 510. In some embodiments, FDD system 510 is a component of building equipment 502, as shown in FIG. 5A. For example, FDD system 510 can be implemented as a component of a chiller, heater, actuator, or other BMS device. When implemented as part of building equipment 502, FDD system 510 can be configured to perform fault detection and diagnostics using local data available to the BMS device (e.g., measured data, calculated data, etc.).

In other embodiments, FDD system 510 is a component of controller 504 (e.g., within FDD layer 416), as shown in FIG. 5B. For example, FDD system 510 can be implemented as part of a subsystem level controller (e.g., a HVAC controller), a subplant controller, a device controller (e.g., AHU controller 330, a chiller controller, etc.), a field controller, a computer workstation, a client device, or any other system or device that receives and processes monitored variables 506 from building equipment 502. In some embodiments, FDD system 510 is implemented as part of a METASYS® brand building automation system, as sold by Johnson Controls Inc.

In other embodiments, FDD system 510 is a component of remote systems and applications 444, as shown in FIG. 5C. For example, FDD system 510 can be implemented as part of a remote computing system or cloud-based computing system configured to receive and process data from one or more building management systems via a communications network 446. In some embodiments, FDD system 510 is implemented as part of a PANOPTIX® brand building efficiency platform, as sold by Johnson Controls Inc.

Figure 6:
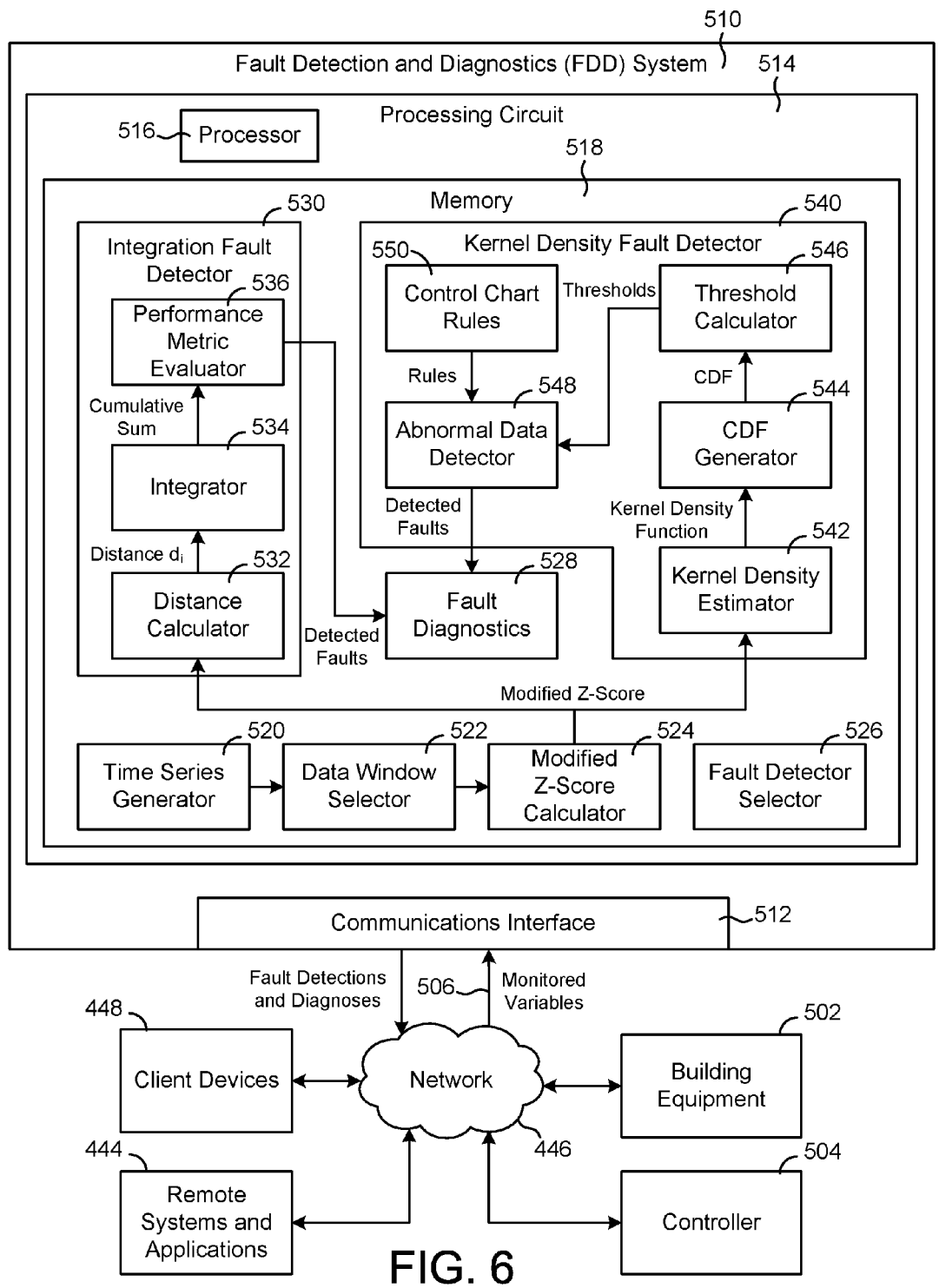
FIG. 6 is a block diagram illustrating the FDD system of FIGS. 5A-5C in greater detail, according to some embodiments.

Referring now to FIG. 6, a block diagram illustrating FDD system 510 in greater detail is shown, according to some embodiments. FDD system 510 is configured to detect faults in time series data. In some embodiments, FDD system 510 uses a fault detection by integration (FDI) technique to perform the fault detection. In other embodiments, FDD system 510 uses kernel density control charts (KDCC) to perform the fault detection. In some embodiments, FDD system 510 is configured to select the FDI technique or the KDCC technique based on the type or other attributes of time series data. For example, FDD system 510 can select the FDI technique when the time series data represents uncontrolled process variables (e.g., chiller efficiency, power consumption, etc.) whereas FDD system 510 can select the KDCC technique when the time series data represents variables that are controlled to a setpoint (e.g., chiller water output temperature, room temperature, etc.). These and other features of FDD system 510 are described in greater detail below.

FDD system 510 is shown to include a communications interface 512 and a processing circuit 514. Communications interface 512 is configured to facilitate communications between FDD system 510 and various external systems or devices. For example, FDD system 510 can receive monitored variables 506 from building equipment 502 and/or control signals from controller 504 via communications interface 512. FDD system 510 can use a time series of monitored variables 506 to detect and diagnose faults and can provide fault detections and diagnoses as an output via communications interface 512. Communications interface 512 may also be used to communicate with remote systems and applications 444, client devices 448, and/or any other external system or device. For example, FDD system 510 can provide fault detections and diagnoses to remote systems and applications 444, client devices 448, or any other external system or device via communications interface 512.

Communications interface 512 can include any number and/or type of wired or wireless communications interfaces (e.g., jacks, antennas, transmitters, receivers, transceivers, wire terminals, etc.). For example, communications interface 512 can include an Ethernet card and port for sending and receiving data via an Ethernet-based communications link or network. As another example, communications interface 512 can include a WiFi transceiver, a NFC transceiver, a cellular transceiver, a mobile phone transceiver, or the like for communicating via a wireless communications network. In some embodiments, communications interface 512 includes RS232 and/or RS485 circuitry for communicating with BMS devices (e.g., chillers, controllers, etc.). Communications interface 512 can be configured to use any of a variety of communications protocols (e.g., BACNet, Modbus, N2, MSTP, Zigbee, etc.). Communications via interface 512 can be direct (e.g., local wired or wireless communications) or via an intermediate communications network 446 (e.g., a WAN, the Internet, a cellular network, etc.). Communications interface 512 can be communicably connected with processing circuit 514 such that processing circuit 514 and the various components thereof can send and receive data via communications interface 512.

Processing circuit 514 is shown to include a processor 516 and memory 518. Processor 516 can be implemented as a general purpose processor, an application specific integrated circuit (ASIC), one or more field programmable gate arrays (FPGAs), a group of processing components, or other suitable electronic processing components. Memory 518 (e.g., memory, memory unit, storage device, etc.) can include one or more devices (e.g., RAM, ROM, Flash memory, hard disk storage, etc.) for storing data and/or computer code for completing or facilitating the various processes, layers and modules described herein. Memory 518 can include volatile memory or non-volatile memory. Memory 518 can include database components, object code components, script components, or any other type of information structure for supporting the various activities and information structures of the present disclosure. In some embodiments, memory 518 is communicably connected to processor 516 via processing circuit 514 and includes computer code for executing (e.g., by processing circuit 514 and/or processor 516) one or more processes described herein.

Still referring to FIG. 6, FDD system 510 is shown to include a time series generator 520. Time series generator 520 can be configured to monitor one or more variables (i.e., monitored variables 506) that indicate the performance of a monitored system, device, or process. For example, monitored variables 506 can include one or more measured or calculated temperatures (e.g., refrigerant temperatures, cold water supply temperatures, hot water supply temperatures, supply air temperatures, zone temperatures, etc.), pressures (e.g., evaporator pressure, condenser pressure, supply air pressure, etc.), flow rates (e.g., cold water flow rates, hot water flow rates, refrigerant flow rates, supply air flow rates, etc.), valve positions, resource consumptions (e.g., power consumption, water consumption, electricity consumption, etc.), control setpoints, model parameters (e.g., regression model coefficients), or any other time-series values that provide information about how the corresponding system, device, or process is performing.

Monitored variables 506 can be received from building equipment 502, controller 504, and/or from various other systems or devices in communication with FDD system 510. For example, monitored variables 506 can be received from one or more controllers (e.g., BMS controllers, subsystem controllers, HVAC controllers, subplant controllers, AHU controllers, device controllers, etc.), BMS devices (e.g., chillers, cooling towers, pumps, heating elements, etc.), or collections of BMS devices within building subsystems 428 and/or building equipment 502. In some embodiments, monitored variables 506 are received as data points. Each data point can include a data value indicating a value of a particular monitored variable and a time stamp indicating a time at which the data value was measured or calculated.

Time series generator 520 is configured to generate a time series for each of monitored variables 506. In some embodiments, each time series includes a collection of data points and/or data values. Time series generator 520 can use the time stamps associated with each data point to generate a series of data points, arranged according to their time stamps. In some embodiments, time series generator 520 adds contextual information to each time series. Contextual information can include, for example, the type of quantity represented by the time series (e.g., temperature, humidity, etc.), the type of variable (e.g., measured, calculated, estimated, etc.), the identify of a sensor that measured the monitored variable, the identity of a BMS device associated with the time series (e.g., "Chiller 1"), or any other type of information that gives context to the time series or allows a user to understand what the time series represent. Time series generator 520 can store the time series in a data table, list, vector, matrix or any other data structure. For example, time series generator 520 can generate a p×q matrix X that includes p samples of each of the q time series variables 506. In various embodiments, time series generator 520 stores the time series in memory 518 or in external data storage (e.g., cloud data storage).

FDD system 510 is shown to include a data window selector 522. Data window selector 522 is configured to select a data window for use in analyzing a set of the monitored variables 506. The data window can be defined by window parameters including a start time, an end time, and/or a duration. In some embodiments, the window parameters are defined by a user (e.g., received as user input from client devices 448 and/or a user interface device). In other embodiments, the window parameters are defined automatically by data window selector 522. For example, data window selector 522 can automatically adjust the data window to include a threshold number of data points or to have a minimum or maximum duration (e.g., one week, one month, one hour, one day, etc.).

In some embodiments, data window selector 522 determines the duration of the data window based on the type of monitored variable or the frequency with which the monitored variable is sampled. Data window selector 522 may select a relatively shorter data window if the monitored variable is sampled more frequently, and a relatively longer data window if the monitored variable is sampled less frequently. In some embodiments, data window selector 522 identifies an equipment model associated with the monitored variable. The equipment model can provide various parameters or attributes of a BMS device associated with the monitored variable (e.g., type of device, model number, operating parameters, sampling frequency, etc.). Data window selector 522 can use information from the equipment model to automatically select a window duration. The selected data window duration defines a set of data points that have time stamps within the data window.

Still referring to FIG. 6, FDD system 510 is shown to include a modified z-score calculator 524. Modified z-score calculator 524 is configured to normalize the time series data for monitored variables 506. Modified z-score calculator 524 can receive the time series data (i.e., samples of a particular monitored variable) from time series generator 520 and the selected data window from data window selector 522. Modified z-score calculator 524 can use a normalization technique to calculate normalized values for each sample of the monitored variable within the selected data window. The normalized values calculated by modified z-score calculator 524 are referred to as modified z-scores.

In some embodiments, modified z-score calculator 524 calculates traditional z-scores for each sample of the time series within the selected data window. Traditional z-scores can be calculated using the following equation:

$$z_i = \frac{x_i - \mu}{\sigma}$$

where $x_i$ is the ith sample of the time series, $\mu$ is the mean of the samples within the selected data window, and $\sigma$ is the standard deviation of the samples within the selected data window. The lack of robustness of the traditional z-score can cause a lack of sensitivity in finding outliers due to $z_i$ having a low breakdown point. The breakdown point is the amount of data that must be contaminated to mask the outliers and cause problems detecting them.

In some embodiments, modified z-score calculator 524 modifies the traditional z-score by replacing the standard deviation $\sigma$ with an estimated standard deviation $\hat{\sigma}$. The estimated standard deviation $\hat{\sigma}$ can be calculated using the following equation:

$$\hat{\sigma} = K * MAD$$

where K is a constant (e.g., K=1.426) and MAD is the median absolute deviation of the time series samples within the selected data window.

The median absolute deviation MAD can be calculated using the following equation:

$$MAD = \text{median}(|x_i - \tilde{x}|)$$

where $x_i$ is the ith sample of the time series and $\tilde{x}$ is the median of the samples within the selected data window. The expression $|x_i - \tilde{x}|$ represents the absolute deviation $A_i$ of the sample $x_i$ relative to the median $\tilde{x}$. The function median( ) calculates the median of the set of absolute deviations $A_i$, where i=1 . . . n and n is the total number of samples within the selected data window.

In some embodiments, the constant K has a value of K=1.426 for large and normally distributed data sets. However, it is contemplated that other values of K could be used for other types of data sets. For example, the value of K for a given data set can be selected such that the product K*MAD is equal to the standard deviation $\sigma$ of the data set. In other words, the value of K can be calculated using the following equation:

$$K = \frac{\sigma}{MAD}$$

In some embodiments, modified z-score calculator 524 modifies the traditional z-score by replacing the mean $\mu$ with the median $\tilde{x}$. The modified z-score $M_i$ can be represented using the following equation:

$$M_i = \frac{x_i - \tilde{x}}{K * MAD} = \frac{x_i - \tilde{x}}{1.4826 * MAD} = \frac{0.6745 * (x_i - \tilde{x})}{MAD}$$

Using the median $\tilde{x}$ in the modified z-score $M_i$ improves (i.e., increases) the breakdown point since the median $\tilde{x}$ is a robust statistic with a breakdown point of 0.5. Hence, 50% of the data would need to be contaminated with outliers for the median $\tilde{x}$ to be adversely affected by outliers. In some embodiments, a breakdown point of 0.5 is the highest possible value and 0.0 is the lowest possible value. Accordingly, using the median $\tilde{x}$ achieves the highest (i.e., best) possible value for the breakdown point.

In some embodiments, modified z-score calculator 524 calculates a modified z-score $M_i$ for each sample $x_i$ of the time series data within the selected data window. Hence, the set of modified z-scores M can include n modified z-scores (i.e., $M \ni \{M_1, M_2, \ldots M_n\}$) where n is the total number of samples $x_i$ of the time series within the selected data window. Calculating the modified z-score $M_i$ can include calculating the median absolute deviation MAD and median $\tilde{x}$ of the time series data points $x_i$ within the selected data window, as previously described. The values for the median absolute deviation MAD and median $\tilde{x}$ can then be used in the equation for $M_i$ to calculate a modified z-score for each of the samples $x_i$.

Still referring to FIG. 6, FDD system 510 is shown to include an integration fault detector 530, a kernel density fault detector 540, and a fault detector selector 526. Integration fault detector 530 is configured to detect faults in the time series data using a fault detection by integration (FDI) technique. Kernel density fault detector 540 is configured to detect faults in the time series data using a kernel density estimation technique and kernel density control charts (KDCC). Both integration fault detector 530 and kernel density fault detector 540 are described in greater detail below. Fault detector selector 526 is configured to select integration fault detector 530 and/or kernel density fault detector 540 to perform the fault detection. The selected fault detector can then be used to detect faults in the time series data.

In some embodiments, fault detector selector 526 selects integration fault detector 530 and/or kernel density fault detector 540 based various attributes of time series data (e.g., data type, controlled or uncontrolled variable, measured or calculated values, etc.). Fault detector selector 526 can be configured to determine the type of data represented by the time series. For example, fault detector selector 526 can determine whether the time series represents an uncontrolled process variable (e.g., chiller efficiency, power consumption, etc.) or a variable that is controlled to a setpoint (e.g., chilled water temperature, supply air temperature, room temperature, etc.). In some embodiments, fault detector selector 526 selects integration fault detector 530 in response to a determination that the time series data represents an uncontrolled process variable. In some embodiments, fault detector selector 526 selects kernel density fault detector 540 in response to a determination that the time series data represents a variable that is controlled to a setpoint.

Integration Fault Detector

Still referring to FIG. 6, integration fault detector 530 is shown to include a distance calculator 532, an integrator 534, and a performance metric evaluator 536. Distance calculator 532 is configured to calculate distance values $d_i$ based on the modified z-scores $M_i$ generated by modified z-score calculator 524. In some embodiments, distance calculator 532 calculates a distance value $d_i$ for each of the modified z-scores $M_i$. Each distance value $d_i$ indicates a difference between the corresponding modified z-score $M_i$ and an outlier threshold. Data points having modified z-score values $M_i$ beyond the outlier threshold can be considered outliers.

In some embodiments, the outlier threshold is a positive outlier threshold $T_{high}$ if the modified z-score $M_i$ is positive, but a negative outlier threshold $T_{low}$ if the modified z-score $M_i$ is negative. For example, distance calculator 532 can calculate the distance value $d_i$ using the following piecewise equation:

$$d_i = \begin{cases} M_i - T_{high} & \text{if } M_i \geq 0 \\ T_{low} - M_i & \text{if } M_i < 0 \end{cases}$$

Accordingly, the distance value $d_i$ represents an amount by which the corresponding modified z-score $M_i$ exceeds the positive outlier threshold $T_{high}$ (if $M_i$ is positive) or an amount by which the modified z-score $M_i$ is less than the negative outlier threshold $T_{low}$ (if $M_i$ is negative). Positive values of $d_i$ indicate that the corresponding modified z-score $M_i$ is outside the range between $T_{low}$ and $T_{high}$, whereas negative values of $d_i$ indicate that the corresponding modified z-score $M_i$ is between $T_{low}$ and $T_{high}$. In some embodiments, $T_{low}$ is approximately −3.5 (i.e., $T_{low}$=−3.5), whereas $T_{high}$ is approximately 3.5 (i.e., $T_{high}$=3.5).

In some embodiments, the outlier threshold is a single positive threshold $T_{threshold}$ (e.g., $T_{threshold}$=3.5). The distance value $d_i$ can be defined as the amount by which the absolute value of the corresponding modified z-score $M_i$ exceeds the positive threshold $T_{threshold}$. For example, distance calculator 532 can calculate the distance value $d_i$ using the following equation:

$$d_i = |M_i| - T_{threshold}$$

Positive values of $d_i$ indicate that the corresponding modified z-score $M_i$ is either greater than $T_{threshold}$ or less than $-T_{threshold}$, whereas negative values of $d_i$ indicate that the corresponding modified z-score $M_u$ is between $T_{threshold}$ and $-T_{threshold}$.

In some embodiments, distance calculator 532 calculates a distance $d_i$ for each of the modified z-scores $M_i$ (i.e., $D \ni \{d_1, d_2, \ldots d_n\}$). The distances $d_i$ can be stored as time series values where each distance value $d_i$ represents an element of the time series and corresponds to a particular element $x_i$ of the original time series. In other embodiments, distance calculator 532 calculates a distance $d_i$ for only for the modified z-scores $M_i$ that qualify as outliers. The calculated distance values $d_i$ can be provided to integrator 534.

Integrator 534 is configured to calculate cumulative sums $X_i$ of the distance values $d_i$. In some embodiments, integrator 534 calculates a cumulative sum $X_i$ for each distance value $d_i$. Each cumulative sum $X_i$ can be calculated as the summation of the distance values up to and including $d_i$, as shown in the following equation:

$$X_i = \sum_{j=1}^{i} d_j$$

such that the value of the cumulative sum $X_i$ increases when $d_j$ is positive and decreases when $d_j$ is negative. For example, the first cumulative sum $X_1$ is equal to the first distance value $d_1$, whereas the second cumulative sum $X_2$ is equal to the sum $d_1+d_2$.

In some embodiments, integrator 534 calculates $X_i$ subject to the constraint that the cumulative sum $X_i$ cannot decrease below zero during the summation. For example, integrator 534 can calculate $X_i$ using the following equation:

$$X_i = \min \begin{cases} X_{i-1} + d_i \\ 0 \end{cases}$$

where $X_0$ is set to a value of $X_0$=0 such that $X_1$=min($d_i$, 0). This equation constrains the value of $X_i$ to be greater than or equal to zero after each distance $d_i$ is added. Using this equation to calculate $X_i$ can reduce integrator windup caused by a history of negative values for $d_i$ since the minimum value of the summation $X_i$ is constrained to be non-negative at each step of the summation. This allows integrator 534 to output a positive summation $X_i$ when a positive value of $d_i$ occurs after one or more negative values of $d_i$, which can be used to detect single point outliers in the original time series.

Alternatively, integrator 534 can calculate $X_i$ using the equation:

$$X_i = \min \begin{cases} \sum_{j=1}^{i} d_j \\ 0 \end{cases}$$

which constrains the value of $X_i$ to be greater than or equal to zero at the end of the summation. This equation can cause integrator windup since a history of negative values for $d_i$ can prevent the summation $X_i$ from having a positive value even if the next value of $d_i$ is positive. However, using this equation can allow integrator 534 to at least partially negate the impact of a positive value for $d_i$ based on a history of previous negative values.

In some embodiments, integrator 534 calculates a cumulative sum $X_i$ for each of the distance values $d_i$ (i.e., $X \ni \{X_1, X_2, \ldots X_n\}$). The cumulative sums $X_i$ can be stored as time series values where each cumulative sum $X_i$ represents an element of the time series and corresponds to a particular element $x_i$ of the original time series. The calculated cumulative sums $X_i$ can be provided to performance metric evaluator 536.

Performance metric evaluator 536 is configured to calculate performance metrics $P_i$ based on the cumulative sums $X_i$. In some embodiments, performance metric evaluator 536 calculates a performance metric $P_i$ for each cumulative sum $X_i$. Performance metric evaluator 536 can calculate the performance metrics $P_i$ using the following equation:

$$P_i = P_{ideal} - G \cdot X_i \cdot \Delta T$$

where $P_{ideal}$ is the maximum possible value of the performance metric $P_i$ (e.g., $P_{ideal}$=100) which indicates ideal performance, G is a tunable gain term, and $\Delta T$ is the sampling period. The value of the gain G can be empirically tuned, retrieved from memory 518, specified by a user, automatically determined by performance metric evaluator 536, and/or received from an outside data source. In some embodiments, the gain G is initially set to a value of approximately G=0.4. Performance metric evaluator 536 can adjust the gain G to increase or decrease the impact of the cumulative sum $X_i$ on the calculated performance metric $P_i$.

In some embodiments, performance metric evaluator 536 automatically sets or calculates the value of the gain G based on attributes of the time series data. For example, performance metric evaluator 536 can set the value of the gain G based on the type of data represented by the time series (e.g., measured value, calculated value, uncontrolled process variable, controlled variable, temperature, humidity, efficiency, etc.). In some embodiments, attributes of the time series data are added to the time series by time series generator 520 and subsequently extracted from the time series by performance metric evaluator 536.

In some embodiments, performance metric evaluator 536 accesses an equipment model associated with the time series data to identify the attributes of the time series data. Different BMS devices may have different equipment models that provide information about the device. For example, an equipment model can identify the type of device, the device model number, the types of input variables accepted by the device, the output variables produced or measured by the device, and/or other attributes that characterize a particular BMS device associated with the time series data. Performance metric evaluator 536 can use the attributes of the equipment model to determine whether the time series data originated from a chiller, a temperature sensor, a controller, or other type of building equipment. In some embodiments, attributes of the equipment model are added to the time series by time series generator 520 and subsequently extracted from the time series by performance metric evaluator 536.

Performance metric evaluator 536 can use attributes of the equipment model (e.g., device model number, type of device, etc.) to determine an appropriate value for the tunable gain G. For example, performance metric evaluator 536 can use a first tunable gain value $G_1$ if the time series data is associated with a first type of building equipment (e.g., a chiller), but a second different tunable gain value $G_2$ if the time series data is associated with a second type of building equipment (e.g., a temperature sensor). Rules defining the different values of the tunable gain G to be used for different types of time series data and/or building equipment can be stored in memory 518 or received from an outside data source (e.g., defined by a user, received from another system or device, etc.).

In some embodiments, performance metric evaluator 536 calculates a performance metric $P_i$ for each cumulative sum $X_i$. (i.e., $P \ni \{P_1, P_2, \ldots P_n\}$). The performance metrics $P_i$ can be stored as time series values where each performance metric $P_i$ represents an element of the time series and corresponds to a particular element $x_i$ of the original time series. In some embodiments, performance metric evaluator 536 compares the performance metrics $P_i$ to one or more threshold values. The threshold values define various levels of performance. For example, the threshold values can include a first performance threshold $T_1$ (e.g., $T_1=100$), a second performance threshold $T_2$ (e.g., $T_2=90$), a third performance threshold $T_3$ (e.g., $T_3=80$), and so on. It is contemplated that any number of performance thresholds can be defined and/or used to evaluate the performance metrics $P_i$.

If a performance metric $P_i$ is greater than or equal to the highest performance threshold $T_1$ (e.g., $P_i=100$), performance metric evaluator 536 may determine that the performance metric $P_i$ represents an ideal level of performance. If the performance metric $P_i$ is between the first (ideal) performance threshold $T_1$ and the second performance threshold $T_2$ (e.g., $P_i=95$), performance metric evaluator 536 may determine that the performance metric $P_i$ represents a high level of performance. If the performance metric $P_i$ is between the second performance threshold $T_2$ and the third performance threshold $T_3$ (e.g., $P_i=85$), performance metric evaluator 536 may determine that the performance metric $P_i$ represents an acceptable level of performance. If the performance metric $P_i$ is below the third performance threshold $T_3$ (e.g., $P_i=70$), performance metric evaluator 536 may determine that the performance metric $P_i$ represents a poor level of performance.

In some embodiments, performance metric evaluator 536 uses the calculated performance metrics $P_i$ to detect faults. Faults can be detected by evaluating one or more values of the performance metric $P_i$ using fault detection rules. The fault detection rules define faults as a function of the performance metrics $P_i$. For example, a fault detection rule can define a fault as a performance metric $P_i$ below one or more of the threshold values (e.g., $P_i<T_3$). Another fault detection rule can define a fault as multiple consecutive values of the performance metric $P_i$ below a threshold value (e.g., $P_i<T_2$ and $P_{i-1}<T_2$). Performance metric evaluator 536 can apply the fault detection rules to the time series of performance metrics $P_i$ to determine whether any faults are detected. In some embodiments, detected faults are provided to fault diagnostics 528 to diagnose a cause of the faults, stored in memory 518, reported to a user, and/or reported to a building management system via communications interface 512.

Kernel Density Fault Detector

Still referring to FIG. 6, kernel density fault detector 540 is shown receiving the modified z-scores $M_i$ from modified z-score calculator 524. Kernel density fault detector 540 is configured to detect faults by evaluating the modified z-scores $M_i$ using kernel density control charts (KDCC). Evaluating the modified z-scores $M_i$ can include comparing the modified z-scores $M_i$ to one or more threshold values. Kernel density fault detector 540 is configured to automatically determine the threshold values based on the set of modified z-scores $M_i$ and to evaluate the modified z-scores $M_i$ using the KDCCs. Kernel density fault detector 540 is shown to include a kernel density estimator 542, a cumulative distribution function (CDF) generator 544, a threshold calculator 546, an abnormal data detector 548, and control chart rules 550.

Kernel density estimator 542 is shown receiving the modified z-scores $M_i$ from modified z-score calculator 524. In some embodiments, kernel density estimator 542 is configured to generate a kernel density distribution based on the modified z-scores $M_i$. A kernel density distribution is a nonparametric representation of a probability density function (PDF) of a random variable. Kernel density estimation can be viewed as data smoothing where inferences about the population of data points are made based on a finite data sample (i.e., the samples within the selected data window). Kernel density estimator 542 can generate a kernel density distribution based on the normalized set of sample data (i.e., the modified z-scores $M_i$) within the selected data.

In some embodiments, kernel density estimator 542 generates the kernel density distribution using the following equation:

$$f_h(M) = \frac{1}{nh}\sum_{i=1}^{n} K\left(\frac{M-M_i}{h}\right); -\infty < M < \infty$$

where n is the sample size, h is the bandwidth, and the function $$K\left(\frac{M-M_i}{h}\right)$$

is the kernel smoothing function. In some embodiments, the kernel smoothing function $$K\left(\frac{M-M_i}{h}\right)$$

is a non-negative function that integrates to one and has a mean of zero (e.g., if the kernel smoothing function is a standardized normal distribution). In other embodiments, the kernel smoothing function can have a non-zero mean and/or can integrate to a value other than one (e.g., if the kernel smoothing function is a chi-square function, a beta function, or other arbitrary distribution). In some embodiments, kernel density estimator 542 uses the normal distribution function as the kernel smoothing function $$K\left(\frac{M-M_i}{h}\right).$$

In other embodiments, kernel density estimator 542 can use any of a variety of other functions as the kernel smoothing function $$K\left(\frac{M-M_i}{h}\right)$$

(e.g., uniform, triangular, biweight, triweight, etc.). Kernel density estimator 542 can generate a kernel smoothing function $$K\left(\frac{M-M_i}{h}\right)$$

for each of the modified z-scores $M_i$. For example, if the normal distribution function is used as the kernel smoothing function $$K\left(\frac{M-M_i}{h}\right),$$

kernel density estimator 542 can generate a set of normal distribution functions, each of which is centered at one of the modified z-scores $M_i$.

The kernel density distribution $f_h(M)$ represents a summation of the individual kernel smoothing functions $$K\left(\frac{M-M_i}{h}\right).$$

Like a histogram, the kernel density distribution $f_h(M)$ represents the probability distribution of the modified z-scores $M_i$. However, unlike a histogram, the kernel density distribution $f_h(M)$ sums the component smoothing functions $$K\left(\frac{M-M_i}{h}\right)$$

for each modified z-score $M_i$ to produce a smooth, continuous probability distribution curve instead of placing the data into discrete bins. Kernel density estimator 542 can generate the kernel density distribution $f_h(M)$ by summing the individual component smoothing functions using the equation for $f_h(M)$. An example of how a kernel density distribution can be constructed from several kernel smoothing functions is described in greater detail with reference to FIG. 17.

The bandwidth h controls the smoothness of the resulting kernel density distribution $f_h(M)$. In general, a low bandwidth h results in a rough kernel density distribution $f_h(M)$ with less smoothing, whereas a high bandwidth h results in a smoother kernel density distribution $f_h(M)$. In some embodiments, kernel density estimator 542 calculates the value of the bandwidth h based on the estimated standard deviation $\hat{\sigma}$ of the original time series values $x_i$. For example, kernel density estimator 542 can calculate the bandwidth h using the following piecewise equation:

$$h = \begin{cases} \hat{\sigma}\left(\frac{4}{3n}\right) & \text{if } \hat{\sigma} > 0 \\ 1 & \text{if } \hat{\sigma} \leq 0 \end{cases}$$

As previously described, the estimated standard deviation $\hat{\sigma}$ can be calculated using the equation:

$$\hat{\sigma} = K \cdot \text{MAD}$$

where K is a constant (e.g., K=1.426) and MAD is the median absolute deviation of the time series samples within the selected data window. The median absolute deviation MAD can be calculated using the equation:

$$\text{MAD} = \text{median}(|x_i - \tilde{x}|)$$

where $x_i$ is the ith sample of the time series and $\tilde{x}$ is the median of the samples within the selected data window. Kernel density estimator 542 can calculate the values of MAD and $\hat{\sigma}$ and use the value of $\hat{\sigma}$ to set the bandwidth h. Kernel density estimator 542 can provide the kernel density distribution $f_h(M)$ to CDF generator 544.

Cumulative distribution function (CDF) generator 544 is configured to generate a cumulative distribution function based on the kernel density distribution $f_h(M)$. In some embodiments, the cumulative distribution function is defined as:

$$F(T) = \int_{-\infty}^{T} f_h(M)dM = P(M \leq T)$$

where M is a random variable representing the modified z-scores. The cumulative distribution function F(t) represents the probability P that a random modified z-score M is less than or equal to the threshold value T, given the kernel density distribution of the modified z-scores defined by $f_h(M)$. CDF generator 544 can provide the cumulative distribution function F(T) to threshold calculator 546.

Threshold calculator 546 is configured to establish one or more control chart thresholds based on the cumulative distribution function F(T). In some embodiments, threshold calculator 546 uses the cumulative distribution function F(T) to determine values for the threshold T that correspond to predetermined probability values P. For example, threshold calculator 546 can use the cumulative distribution function F(T) to define an interval between a lower threshold $T_{low}$ and an upper threshold $T_{up}$ that excludes a predetermined proportion α of random modified z-scores M. In other words, (1−α)*100% of random modified z-scores M will be between $T_{low}$ and $T_{up}$. The lower threshold $T_{low}$ and the upper threshold $T_{up}$ can be defined in terms of the cumulative distribution function F(T) using the following equations:

$$F(T_{low}) = \int_{-\infty}^{T_{low}} f_h(M)dM = P(M \leq T_{low}) = \frac{\alpha}{2}$$

$$F(T_{up}) = \int_{-\infty}^{T_{up}} f_h(M)dM = P(M \leq T_{up}) = 1 - \frac{\alpha}{2}$$

Threshold calculator 546 can use the inverse of the cumulative distribution function F(T) to determine the values of $T_{low}$ and $T_{up}$. The inverse of the cumulative distribution function can be expressed as $F^{-1}(P)=T$, where P is the probability that a random modified z-score M will be less than or equal to the threshold T and $F^{-1}(\ )$ is the inverse of the cumulative distribution function $F(\ )$. The inverse cumulative distribution function can be used to determine values of the thresholds $T_{low}$ and $T_{up}$ by substituting the values $$\frac{\alpha}{2} \text{ and } 1-\frac{\alpha}{2}$$

for P, as shown in the following equations:

$$T_{low} = F^{-1}\left(\frac{\alpha}{2}\right)$$

$$T_{up} = F^{-1}\left(1-\frac{\alpha}{2}\right)$$

In some embodiments, threshold calculator 546 determines values of $T_{low}$ and $T_{up}$ for several different probability values $\alpha$. For example, threshold calculator 546 can determine a first lower threshold $T_{low,1}$ and a first upper threshold $T_{up,1}$ that define an interval which excludes 32% of random modified z-scores M by setting $\alpha=0.32$. In other words 68% of random modified z-scores M will be between $T_{low,1}$ and $T_{up,1}$. Threshold calculator 546 can calculate $T_{low,1}$ and $T_{up,1}$ using the following equations:

$$T_{low,1}=F^{-1}(0.16)$$

$$T_{up,1}=F^{-1}(0.84)$$

Threshold calculator 546 can determine a second lower threshold $T_{low,2}$ and a second upper threshold $T_{up,2}$ that define an interval which excludes 5% of random modified z-scores M by setting $\alpha=0.05$. In other words 95% of random modified z-scores M will be between $T_{low,2}$ and $T_{up,2}$. Threshold calculator 546 can calculate $T_{low,2}$ and $T_{up,2}$ using the following equations:

$$T_{low,2}=F^{-1}(0.025)$$

$$T_{up,2}=F^{-1}(0.975)$$

Threshold calculator 546 can determine a third lower threshold $T_{low,3}$ and a third upper threshold $T_{up,3}$ that define an interval which excludes 1% of random modified z-scores M by setting $\alpha=0.01$. In other words 99% of random modified z-scores M will be between $T_{low,3}$ and $T_{up,3}$. Threshold calculator 546 can calculate $T_{low,3}$ and $T_{up,3}$ using the following equations:

$$T_{low,3}=F^{-1}(0.005)$$

$$T_{up,3}=F^{-1}(0.995)$$

Although several specific values of $\alpha$ are provided, it is contemplated that threshold calculator 546 can determine threshold values $T_{low}$ and $T_{up}$ for any probability value $\alpha$ in addition to (or in place of) the specific examples described herein. As such, the lower threshold $T_{low}$ can include any number of lower thresholds (e.g., $T_{low,1}$, $T_{low,2}$, $T_{low,3}$, etc.) and the upper threshold $T_{up}$ can include any number of upper thresholds (e.g., $T_{up,1}$, $T_{up,2}$, $T_{up,3}$, etc.). Threshold calculator 546 can provide the calculated thresholds $T_{low}$ and $T_{up}$ to abnormal data detector 548.

Abnormal data detector 548 is configured to detect faults by applying control chart rules 550 and the calculated thresholds to the set of modified z-scores $M_i$. Control chart rules 550 define faults based on the values of the modified z-scores $M_i$ relative to the various thresholds provided by threshold calculator 546. For example, one control chart rule can define a fault as a modified z-score $M_i$ having a value outside the range between the third lower threshold $T_{low,3}$ and the third upper threshold $T_{up,3}$. Abnormal data detector 548 can use this control chart rule to detect faults by comparing each of the modified z-scores $M_i$ to both the third lower threshold $T_{low,3}$ and the third upper threshold $T_{up,3}$. Abnormal data detector 548 can determine that a fault exists in response to a determination that any of the modified z-scores is less than the third lower threshold $T_{low,3}$ or greater than the third upper threshold $T_{up,3}$ (i.e., fault if $M_i<T_{low,3}$ or $M_i>T_{up,3}$ for i=1 . . . n).

Another control chart rule can define a fault as two of three consecutive modified z-scores $M_i$ having values outside the range between the second lower threshold $T_{low,2}$ and the second upper threshold $T_{up,2}$. Abnormal data detector 548 can use this control chart rule to detect faults by comparing each of the modified z-scores $M_i$ to both the second lower threshold $T_{low,2}$ and the second upper threshold $T_{up,2}$. Abnormal data detector 548 can determine that a fault exists in response to a determination that two or more of any three consecutive modified z-scores (e.g., $M_i$, $M_{i+1}$, $M_{i+2}$) are less than the second lower threshold $T_{low,2}$ or greater than the second upper threshold $T_{up,2}$ (i.e., fault if $M_i$ AND ($M_{i+1}$ OR $M_{i+2}$)$<T_{low,2}$ or $M_i$ AND ($M_{i+1}$ OR $M_{i+2}$)$>T_{up,2}$ for i=1 . . . n-1).

Abnormal data detector 548 uses control chart rules 550 to determine whether any of the criteria provided by control chart rules 550 are satisfied. If the criteria of a control chart rule are satisfied, abnormal data detector 548 can determine that a fault is detected. Several sets of control chart rules 550 which can be used by abnormal data detector 548 are provided below. A first set of control chart rules 550 define a fault if any of the following criteria are met:

One or more values of $M_i$ outside the range between the third lower threshold $T_{low,3}$ and the third upper threshold $T_{up,3}$ Two or more of three consecutive values of $M_i$ outside the range between the second lower threshold $T_{low,2}$ and the second upper threshold $T_{up,2}$ Four or more of five consecutive values of $M_i$ outside the range between the first lower threshold $T_{low,1}$ and the first upper threshold $T_{up,1}$ Eight or more consecutive values of $M_i$ on one side of the mean value of $M_i$ A second set of control chart rules 550 define a fault if any of the following criteria are met:

One or more values of $M_i$ outside the range between the third lower threshold $T_{low,3}$ and the third upper threshold $T_{up,3}$ Nine or more consecutive values of $M_i$ on one side of the mean value of $M_i$ Six or more consecutive values of $M_i$ continuously increasing or decreasing Fourteen or more consecutive values of $M_i$ alternate in direction between increasing and decreasing Two or more of three consecutive values of $M_i$ outside the range between the second lower threshold $T_{low,2}$ and the second upper threshold $T_{up,2}$ Four or more of five consecutive values of $M_i$ outside the range between the first lower threshold $T_{low,1}$ and the first upper threshold $T_{up,1}$ Fifteen or more consecutive values of $M_i$ on one side of the mean value of $M_i$ and within the range between the first lower threshold $T_{low,1}$ and the first upper threshold $T_{up,1}$ Eight or more consecutive values of $M_i$ on one side of the mean value of $M_i$ and outside the range between the first lower threshold $T_{low,1}$ and the first upper threshold $T_{up,1}$ A third set of control chart rules 550 define a fault if any of the following criteria are met:

(0.75*f) values of $M_i$ outside the range between the third lower threshold $T_{low,3}$ and the third upper threshold $T_{up,3}$ f values of $M_i$ outside the range between the second lower threshold $T_{low,2}$ and the second upper threshold $T_{up,2}$ where f is the sampling frequency (e.g., number of samples per hour, number of samples per day, number of samples per minute, number of samples per second, etc.). For example, if samples are collected at 15 minute intervals (i.e., four samples per hour), the sampling period f can be defined as f=4. Accordingly, the number of outlier values of $M_i$ that define a fault is greater when the sampling frequency is higher and less when the sampling frequency is lower. If the sampling frequency f or the product 0.75*f is a non-integer value (e.g., f=3.5), the non-integer value can be rounded down to the nearest integer value (e.g., f=3).

In some embodiments, abnormal data detector 548 uses a secondary fault detection technique to detect abnormal values of $M_i$. The secondary fault detection technique can be used as an alternative to the KDDC fault detection technique to detect faults that would otherwise be masked by larger faults. For example, the KDDC technique can be used to detect faults by analyzing a set of modified z-scores $M_i$ within a selected data window (e.g., one day). If a large fault occurs within a first portion of the data window, the large fault can mask subsequent smaller yet important faults from being detected. Abnormal data detector 548 can counter this masking by rechecking the modified z-scores $M_i$ within the data window using the secondary fault detection technique. Accordingly, the secondary fault detection technique can be used to detect multiple spikes in the modified z-scores $M_i$ within the same data window and can be referred to as a multiple spike filter.

In some embodiments, abnormal data detector 548 performs the secondary fault detection by checking the set of modified z-scores $M_i$ for a series of values that deviate from a median of the modified z-scores $\tilde{M}_i$ by a threshold deviation $T_d$ for a threshold amount of time $t_d$. For example, abnormal data detector 548 can determine whether the time series of modified z-scores $M_i$ includes series of consecutive values that exceed $\tilde{M}_i + T_d$ for at least the threshold amount of time $t_d$ or are less than $\tilde{M}_i - T_d$ for at least the threshold amount of time $t_d$. Both the threshold deviation $T_d$ and the threshold amount of time $t_d$ can be set by a user. For example, if the user sets the threshold deviation to $T_d$=0.5 and the threshold amount of time to $t_d$=1 hour, abnormal data detector 548 can determine whether the time series of modified z-scores $M_i$ exceeds $\tilde{M}_i$+0.5 for at least one hour or is less than $\tilde{M}_i$−0.5 for at least one hour. In response to a determination that either of these criteria are satisfied, abnormal data detector 548 can determine that a fault is detected within the data window and can flag the data window as having a fault.

Fault Detection by Integration Graphs

Figure 7A:
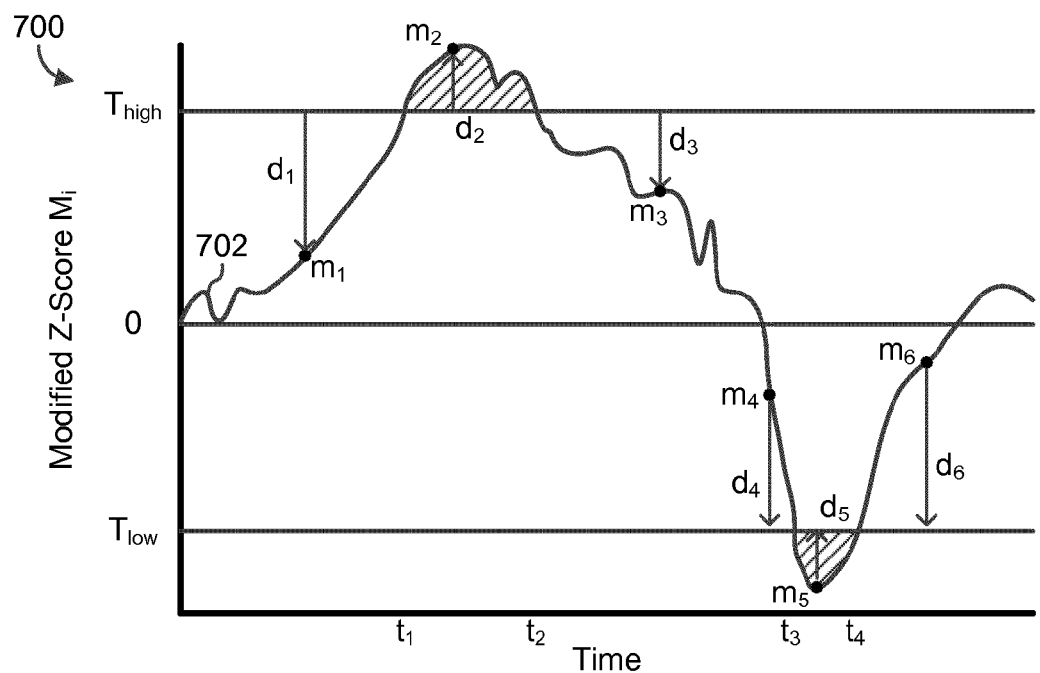
FIG. 7A is a graph of modified z-scores which can be calculated by the FDD system as a function of time, according to some embodiments.

Referring now to FIGS. 7A-16B, several graphs illustrating the fault detection by integration technique used by integration fault detector 530 are shown, according to some embodiments. Referring particularly to FIG. 7A, a graph 700 of the modified z-scores $M_i$ as a function of time is shown. Curve 702 represents the modified z-scores $M_i$. The values of the modified z-scores $M_i$ can be calculated by modified z-score calculator 524, as described with reference to FIG. 6. Graph 700 is shown to include a positive outlier threshold $T_{high}$ and a negative outlier threshold $T_{low}$. In some embodiments, $T_{low}$ is approximately −3.5 (i.e., $T_{low}$=−3.5) and $T_{high}$ is approximately 3.5 (i.e., $T_{high}$=3.5). Values of the modified z-scores $M_i$ that exceed $T_{high}$ or are less than $T_{low}$ can be considered outliers.

Graph 700 is shown to include several modified z-scores $M_1$, $M_2$, $M_3$, $M_4$, $M_5$, and $M_6$. Distance calculator 532 can use the modified z-scores $M_1$, $M_2$, $M_3$, $M_4$, $M_5$, and $M_6$ and the outlier thresholds $T_{low}$ and $T_{high}$ to calculate distances $d_1$, $d_2$, $d_3$, $d_4$, $d_5$, and $d_6$. In some embodiments, distance calculator 532 uses the following equation to calculate the distance values:

$$d_i = \begin{cases} M_i - T_{high} & \text{if } M_i \geq 0 \\ T_{low} - M_i & \text{if } M_i < 0 \end{cases}$$

Each distance value $d_i$ represents an amount by which the corresponding modified z-score $M_i$ exceeds the positive outlier threshold $T_{high}$ (if $M_i$ is positive) or an amount by which the modified z-score $M_i$ is less than the negative outlier threshold $T_{low}$ (if $M_i$ is negative). For example, distance $d_1$ can be calculated as $d_1 = M_1 - T_{high}$ since $M_1 \geq 0$, whereas distance $d_4$ can be calculated as $d_4 = T_{low} - M_4$ since $M_4 < 0$. Positive values of $d_i$ (shown as upward pointing arrows in FIG. 7A) indicate that the corresponding modified z-score $M_i$ is outside the range between $T_{low}$ and $T_{high}$. For example, distances $d_2$ and $d_5$ are shown having positive values. Negative values of $d_i$ (shown as downward pointing arrows in FIG. 7A) indicate that the corresponding modified z-score $M_i$ is between $T_{low}$ and $T_{high}$. For example, distances $d_1$, $d_3$, $d_4$, and $d_6$ are shown having negative values.

Figure 7B:
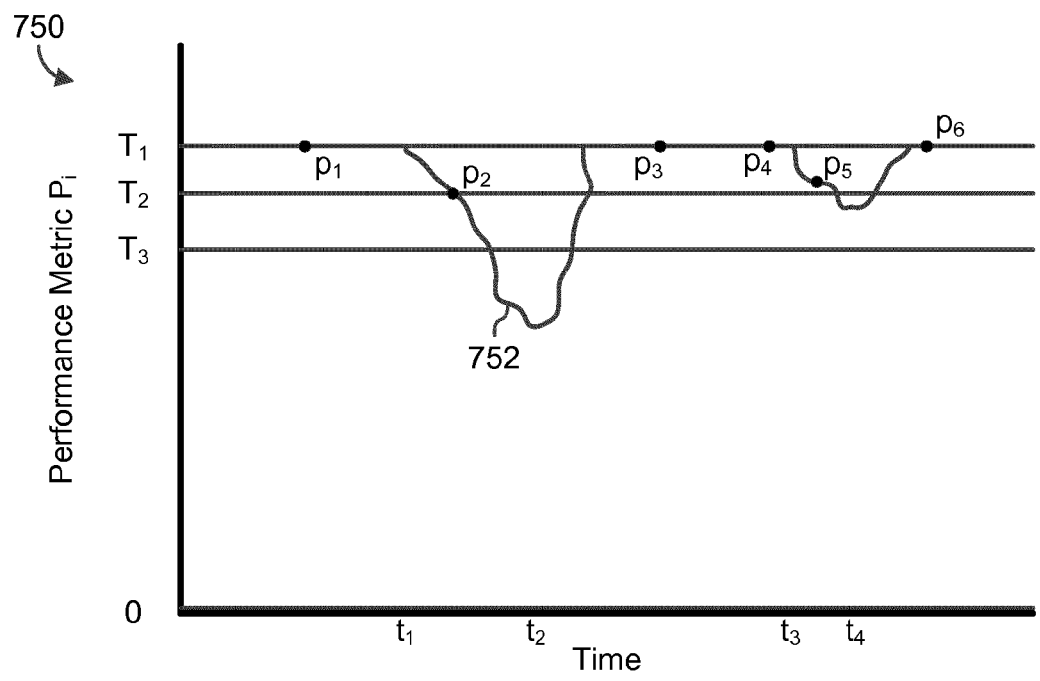
FIG. 7B is a graph of a performance metric which can be calculated by the FDD system as a function of time, according to some embodiments.

Referring now to FIG. 7B, a graph 750 of the performance metric $P_i$ as a function of time is shown, according to some embodiments. Curve 752 represents the performance metric $P_i$. Graph 750 is shown to include several threshold values $T_1$, $T_2$, and $T_3$. The threshold values define various levels of performance. In some embodiments, $T_1$=100, $T_2$=90, and $T_3$=80. However, it is contemplated that the thresholds $T_1$, $T_2$, and $T_3$ can have other values in various other embodiments. Additionally, it should be noted that although only three thresholds are shown in FIG. 7B, any number of threshold values can be used to evaluate the performance metric $P_i$.

Graph 750 is shown to include several values $P_1$, $P_2$, $P_3$, $P_4$, $P_5$, and $P_6$ of the performance metric. Values of the performance metric $P_i$ can be calculated from the time series of distances $d_i$ as previously described. For example, integrator 534 can calculate a cumulative sum $X_i$ for each distance $d_i$ using the following equation:

$$X_i = \min \begin{cases} X_{i-1} + d_i \\ 0 \end{cases}$$

where $X_0$=0 such that $X_1$=min($d_i$, 0). This equation constrains the value of $X_i$ to be greater than or equal to zero after each distance $d_i$ is added. Performance metric evaluator 536 can calculate the performance metrics $P_i$ from the cumulative sums $X_i$ using the following equation:

$$P_i = P_{ideal} - G * X_i * \Delta T$$

where $P_{ideal}$ is the maximum possible value of the performance metric $P_i$ (e.g., $P_{ideal}=100$) which indicates ideal performance, G is a tunable gain term, and $\Delta T$ is the sampling period.

As shown in FIGS. 7A-7B, positive distance values $d_i>0$ cause the performance metric $P_i$ to decrease, whereas negative distance values $d_i<0$ cause the performance metric $P_i$ to increase. For example, between time $t_0$ and time $t_1$, the value of the modified z-score curve 702 is between zero and $T_{high}$, which results in negative distance values (e.g., $d_1<0$) and causes the performance metric curve 752 to remain at the highest performance threshold $T_1$ (e.g., $P_1=T_1$).

At time $t_1$, the modified z-score curve 702 increases above $T_{high}$, which results in positive distance values (e.g., $d_2>0$) and causes the performance metric curve 752 to begin decreasing such that the second performance metric value $P_2$ is between the second performance threshold $T_2$ and the third performance threshold $T_3$ (e.g., $T_3<P_2<T_2$). Between times $t_1$ and $t_2$, the value of the modified z-score curve 702 remains greater than $T_{high}$, which causes the performance metric curve 752 to continue decreasing.

At time $t_2$, the modified z-score curve 702 decreases below $T_{high}$, which results in negative distance values (e.g., $d_3<0$ and $d_4<0$) and causes the performance metric curve 752 to begin increasing such that the third performance metric value $P_3$ and the fourth performance metric value $P_4$ are once again at the highest performance threshold $T_1$ (e.g., $P_3=T_1$ and $P_4=T_1$). Between times $t_2$ and $t_3$, the value of the modified z-score curve 702 remains between $T_{low}$ and $T_{high}$, which causes the performance metric curve 752 to continue increasing up to a maximum of $T_1$.

At time $t_3$, the modified z-score curve 702 decreases below $T_{low}$, which results in positive distance values (e.g., $d_5>0$) and causes the performance metric curve 752 to begin decreasing such that the fifth performance metric value $P_5$ is between the first performance threshold $T_1$ and the second performance threshold $T_2$ (e.g., $T_2<P_5<T_1$). Between times $t_3$ and $t_4$, the value of the modified z-score curve 702 remains less than $T_{low}$, which causes the performance metric curve 752 to continue decreasing.

At time $t_4$, the modified z-score curve 702 increases above $T_{low}$, which results in negative distance values (e.g., $d_6<0$) and causes the performance metric curve 752 to begin increasing such that the sixth performance metric value $P_6$ is once again at the highest performance threshold $T_1$ (e.g., $P_6=T_1$). After time $t_4$, the value of the modified z-score curve 702 remains between $T_{low}$ and $T_{high}$, which causes the performance metric curve 752 to continue increasing up to a maximum of $T_1$.

Performance metric evaluator 536 can use the value of the performance metric $P_i$ to evaluate the level of performance. For example, if the performance metric $P_i$ is equal to the highest performance threshold $T_1$ (e.g., $P_i=100$), performance metric evaluator 536 may determine that the performance metric $P_i$ represents an ideal level of performance. If the performance metric $P_i$ is between the first (ideal) performance threshold $T_1$ and the second performance threshold $T_2$ (e.g., $P_i=95$), performance metric evaluator 536 may determine that the performance metric $P_i$ represents a high level of performance. If the performance metric $P_i$ is between the second performance threshold $T_2$ and the third performance threshold $T_3$ (e.g., $P_i=85$), performance metric evaluator 536 may determine that the performance metric $P_i$ represents an acceptable level of performance. If the performance metric $P_i$ is below the third performance threshold $T_3$ (e.g., $P_i=70$), performance metric evaluator 536 may determine that the performance metric $P_i$ represents a poor level of performance.

Figure 8A:
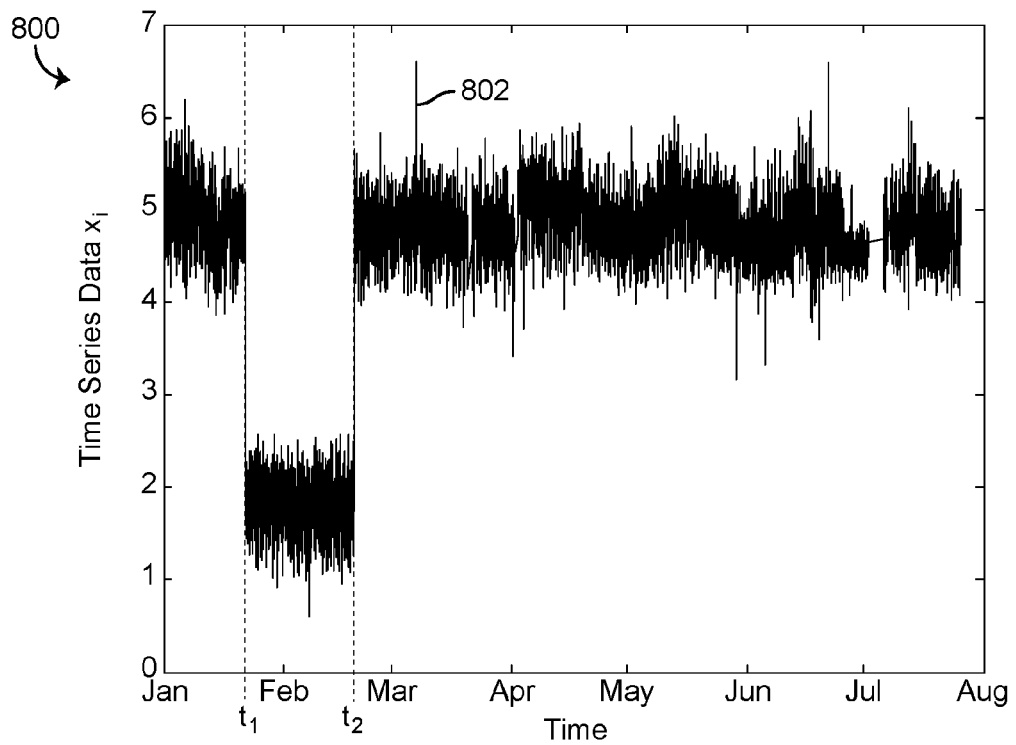
FIG. 8A is a graph of time series data as a function of time illustrating a scenario in which the time series data has an abrupt shift, according to some embodiments.
Figure 8B:
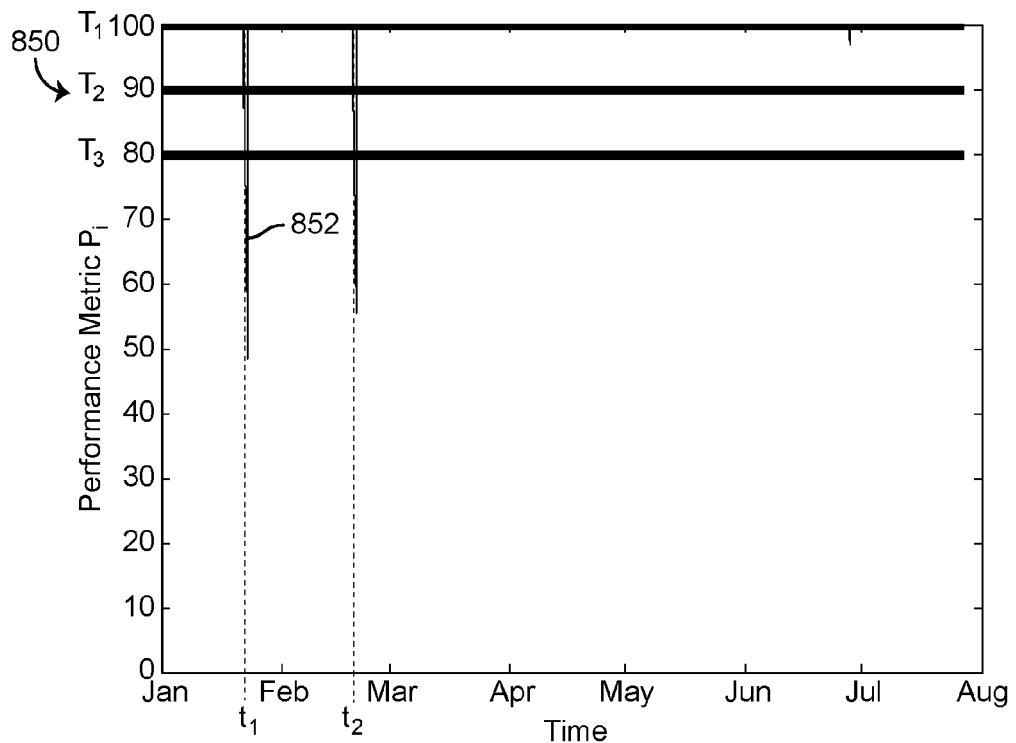
FIG. 8B is a graph of a performance metric which can be generated by the FDD system based on the time series data shown in FIG. 8A, according to some embodiments.

Referring now to FIGS. 8A-8B, graphs 800 and 850 illustrating time series data $x_i$ and corresponding performance metrics $P_i$ that result from an abrupt shift in the time series data $x_i$ are shown, according to some embodiments. Graph 800 is shown to include a time series data curve 802 which represents the time series data $x_i$. Graph 850 is shown to include a performance metric curve 852 which represents the corresponding values of the performance metric $P_i$.

In graph 800, an abrupt shift in the time series data curve 802 occurs at time $t_1$, which drops the value of the time series data curve 802 for a thirty-day duration. Integration fault detector 530 can detect the abrupt shift by dropping the performance metric curve 852 below the third threshold $T_3$ at time $t_1$. Integration fault detector 530 can also detect the second shift at time $t_2$ which returns the time series data curve 802 to normal operation. In some embodiments, integration fault detector 530 can be configured to detect only the first shift at time $t_1$ by setting the detection to occur only when $M_i<T_{high}$ instead of $|M_i|>T_{high}$. The scenario illustrated in FIGS. 8A-8B shows that integration fault detector 530 can detect abrupt shifts in the time series data.

Figure 9A:
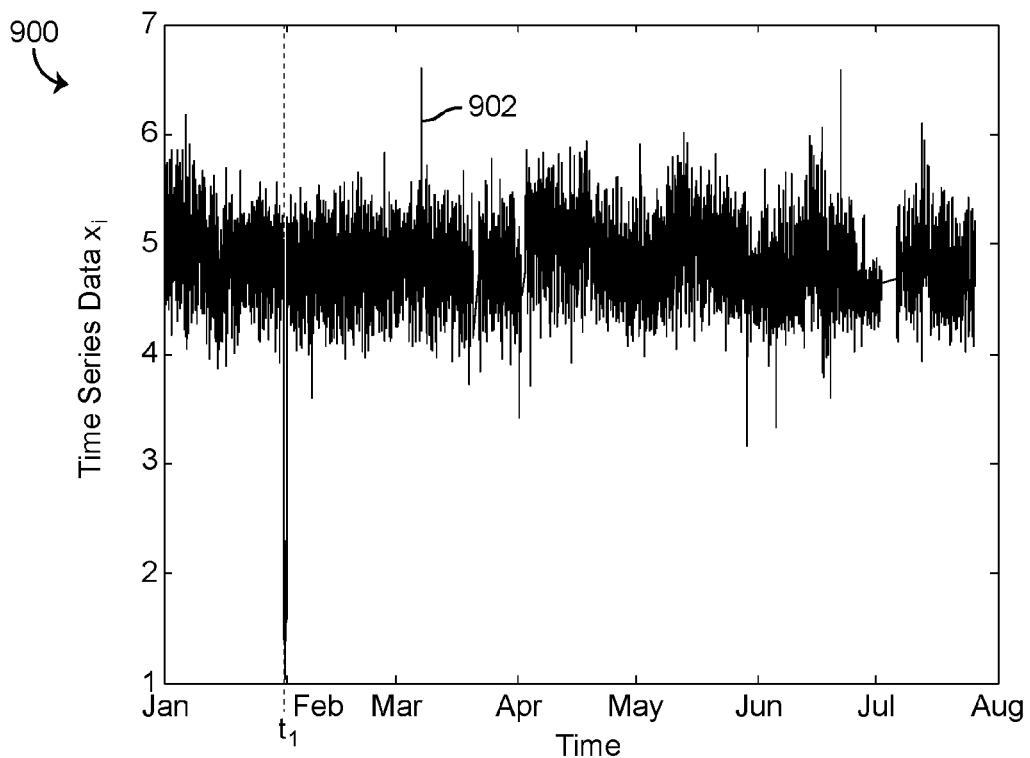
FIG. 9A is a graph of time series data as a function of time illustrating a scenario in which the time series data has spike, according to some embodiments.
Figure 9B:
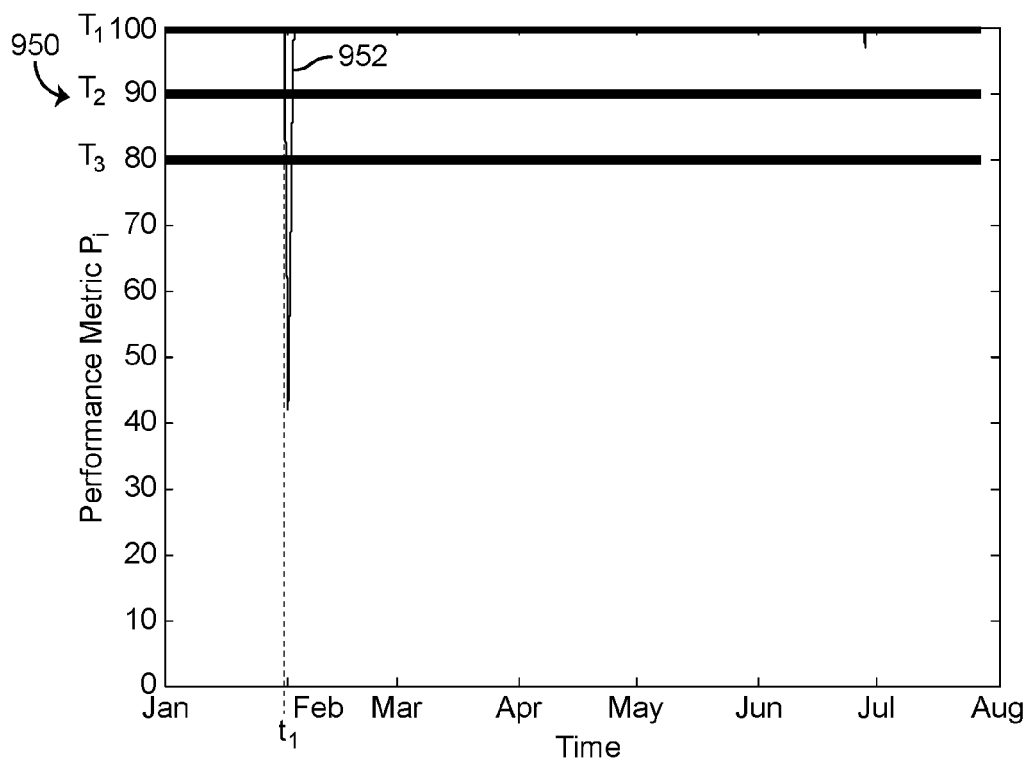
FIG. 9B is a graph of a performance metric which can be generated by the FDD system based on the time series data shown in FIG. 9A, according to some embodiments.

Referring now to FIGS. 9A-9B, graphs 900 and 950 illustrating time series data $x_i$ and corresponding performance metrics $P_i$ that result from a spike in the time series data $x_i$ are shown, according to some embodiments. Graph 900 is shown to include a time series data curve 902 which represents the time series data $x_i$. Graph 950 is shown to include a performance metric curve 952 which represents the corresponding values of the performance metric $P_i$.

In graph 900, a spike in the time series data curve 902 occurs at time $t_1$. In this scenario, integration fault detector can detect the spike by dropping the performance metric curve 952 below the third threshold $T_3$ at time $t_1$. Shortly after the spike, the value of the performance metric curve 952 returns to the highest threshold value $T_1$. The scenario illustrated in FIGS. 9A-9B shows that integration fault detector 530 can detect spikes in the time series data.

Figure 10A:
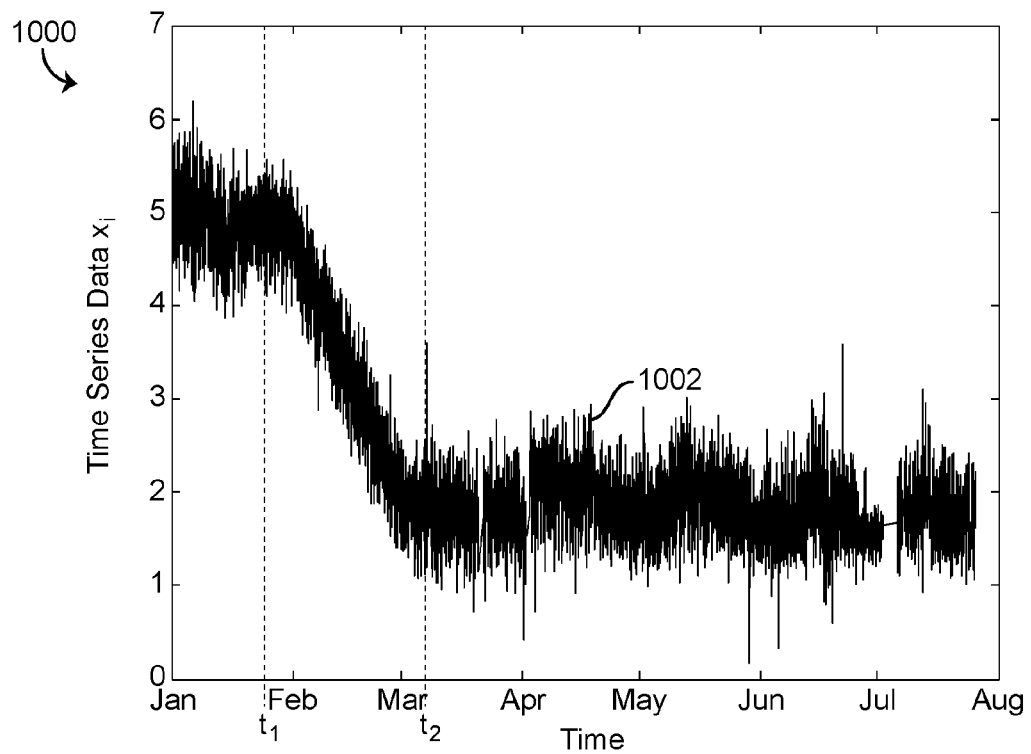
FIG. 10A is a graph of time series data as a function of time illustrating a scenario in which the time series data has a thirty-day downward ramp, according to some embodiments.
Figure 10B:
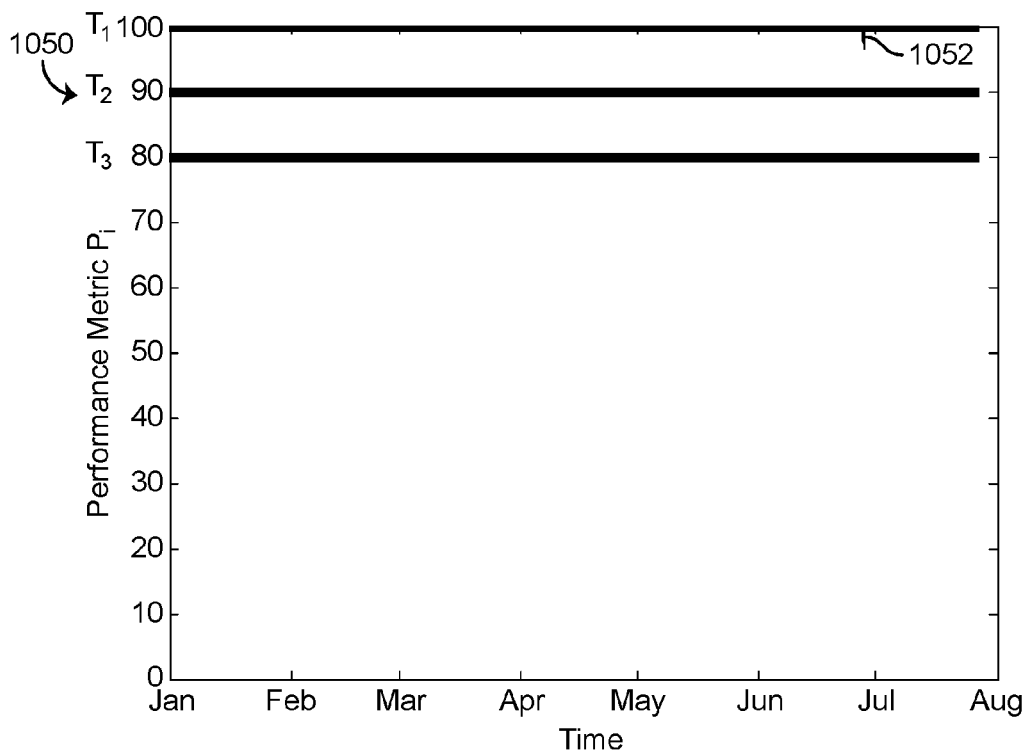
FIG. 10B is a graph of a performance metric which can be generated by the FDD system based on the time series data shown in FIG. 10A, according to some embodiments.

Referring now to FIGS. 10A-10B, graphs 1000 and 1050 illustrating time series data $x_i$ and corresponding performance metrics $P_i$ that result from a thirty-day downward ramp in the time series data $x_i$ are shown, according to some embodiments. Graph 1000 is shown to include a time series data curve 1002 which represents the time series data $x_i$. Graph 1050 is shown to include a performance metric curve 1052 which represents the corresponding values of the performance metric $P_i$.

In graph 1000, the time series data curve 1002 begins decreasing at time $t_1$ and stops decreasing approximately thirty days later at time $t_2$. In the embodiment illustrated in FIGS. 10A-10B, integration fault detector 530 uses a five-day data window to analyze the time series data curve 1002. Because the duration of the data window (i.e., five days) is relatively short compared to the duration of the downward ramp (i.e., thirty days), the value of the time series data curve 1002 is not changing enough to be detected by integration fault detector 530 over the duration of the data window. Accordingly, the performance metric curve 1052 does not drop below the second threshold value $T_2$.

The scenario illustrated in FIGS. 10A-10B shows that integration fault detector 530 might not detect slow ramps in the time series data when the window duration is substantially shorter than the duration of the ramp. However, the duration of the data window can be increased to detect slow ramps, as described with reference to FIGS. 13A-13B.

Figure 11A:
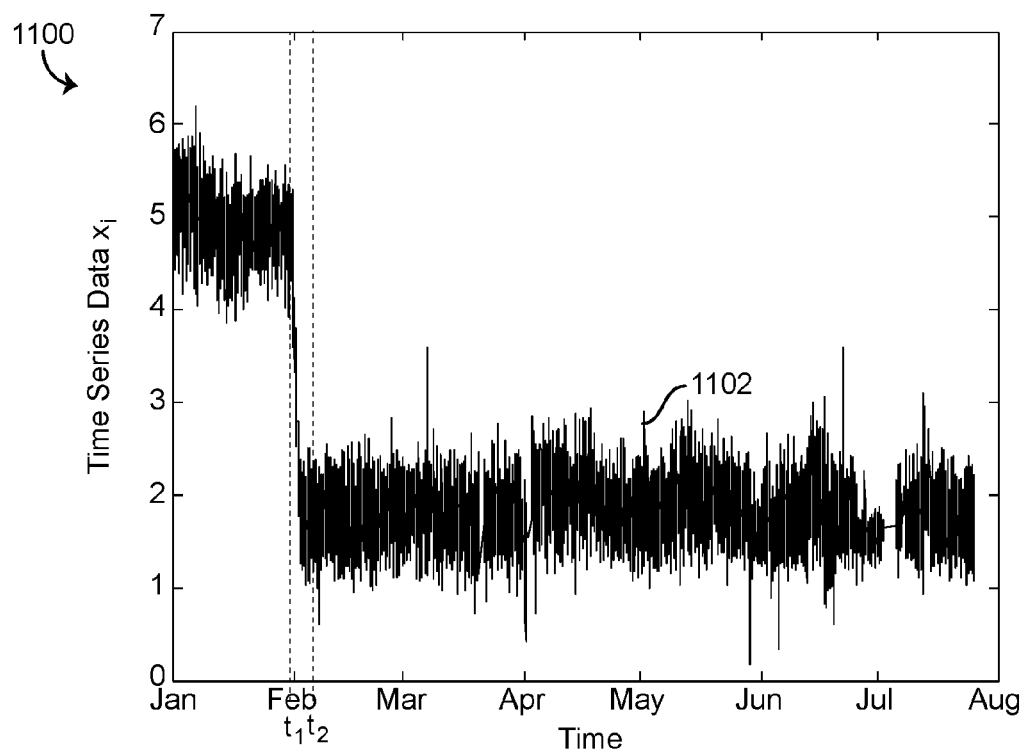
FIG. 11A is a graph of time series data as a function of time illustrating a scenario in which the time series data has a two-day downward ramp, according to some embodiments.
Figure 11B:
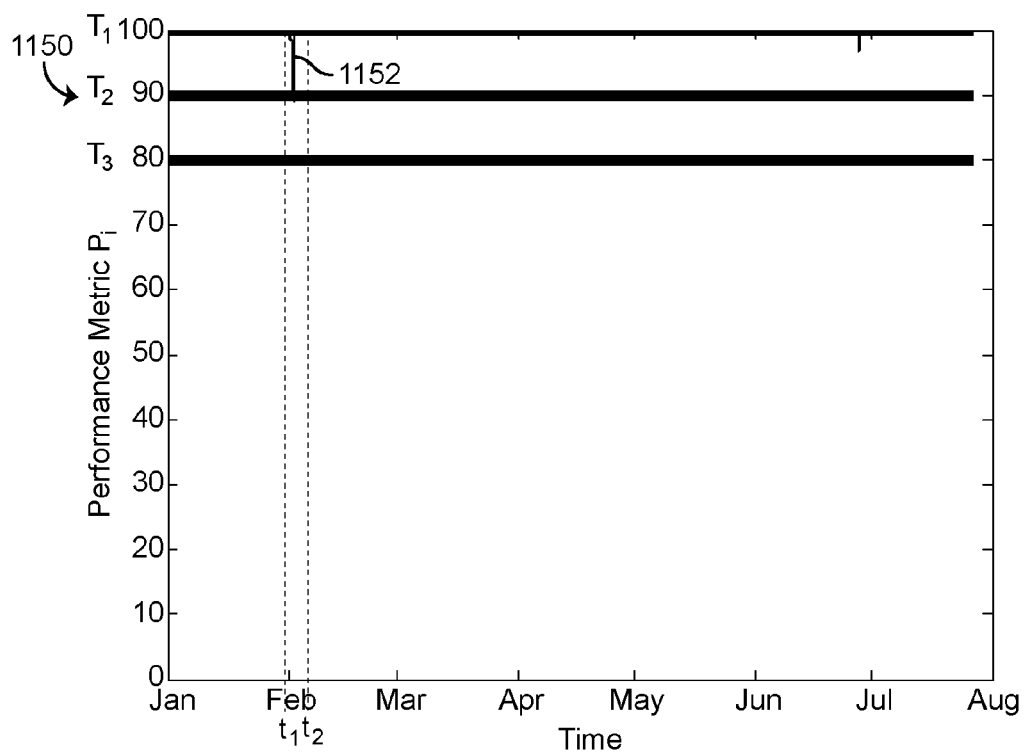
FIG. 11B is a graph of a performance metric which can be generated by the FDD system based on the time series data shown in FIG. 11A, according to some embodiments.

Referring now to FIGS. 11A-11B, graphs 1100 and 1150 illustrating time series data $x_i$ and corresponding performance metrics $P_i$ that result from a two-day downward ramp in the time series data $x_i$ are shown, according to some embodiments. Graph 1100 is shown to include a time series data curve 1102 which represents the time series data $x_i$. Graph 1150 is shown to include a performance metric curve 1152 which represents the corresponding values of the performance metric $P_i$.

In graph 1100, the time series data curve 1102 begins decreasing at time $t_1$ and stops decreasing approximately two days later at time $t_2$. In the embodiment illustrated in FIGS. 11A-11B, integration fault detector 530 uses a five-day data window to analyze the time series data curve 1102. Because the duration of the data window (i.e., five days) is relatively long compared to the duration of the downward ramp (i.e., two days), the value of the time series data curve 1102 is changing enough to be detected by integration fault detector 530 over the duration of the data window. Accordingly, the performance metric curve 1152 drops below the second threshold value $T_2$ between times $t_1$ and $t_2$.

The scenario illustrated in FIGS. 11A-11B shows that integration fault detector 530 can detect ramps in the time series data when the window duration is longer than the duration of the ramp. In some embodiments, integration fault detector 530 is configured to detect ramps in the time series data when the duration of the ramp is approximately half the duration of the data window. In other words, integration fault detector 530 can use a data window having a duration approximately twice the duration of the ramp to detect such ramps in the time series data.

Figure 12A:
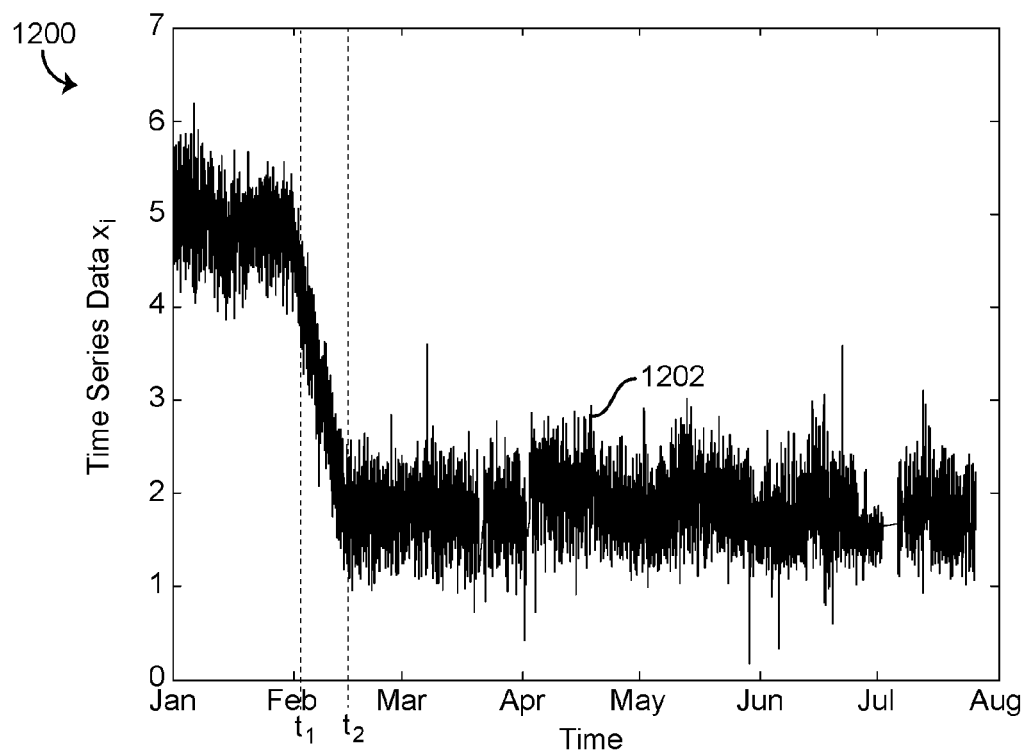
FIG. 12A is a graph of time series data as a function of time illustrating a scenario in which the time series data has a fourteen-day downward ramp, according to some embodiments.
Figure 12B:
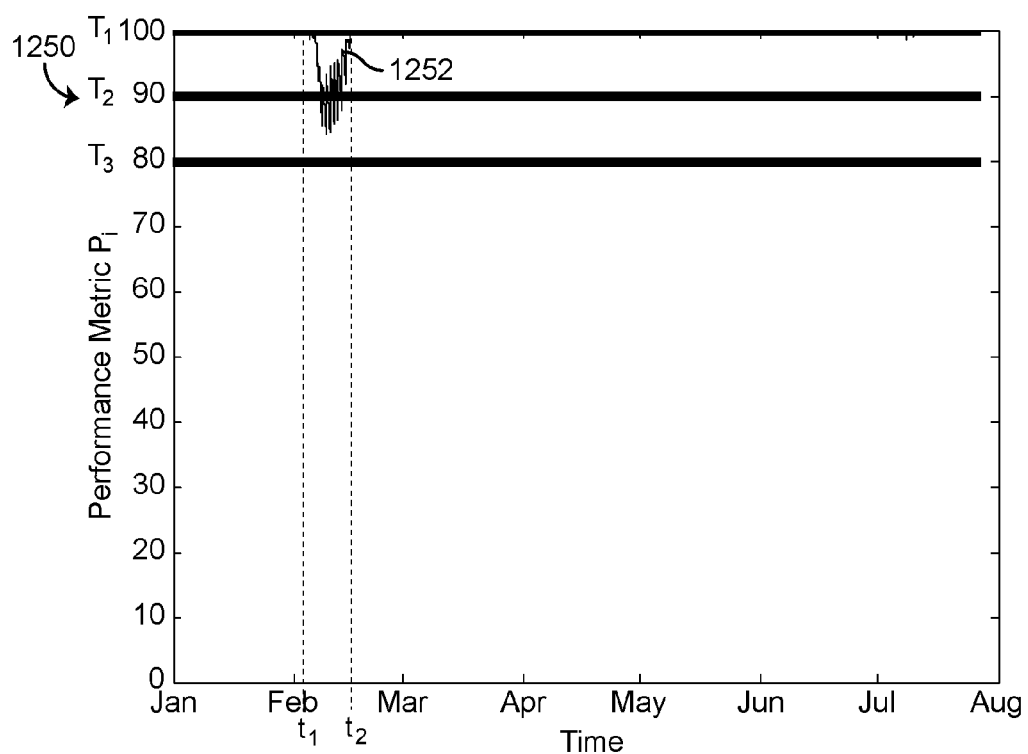
FIG. 12B is a graph of a performance metric which can be generated by the FDD system based on the time series data shown in FIG. 12A, according to some embodiments.

Referring now to FIGS. 12A-12B, graphs 1200 and 1250 illustrating time series data $x_i$ and corresponding performance metrics $P_i$ that result from a fourteen-day downward ramp in the time series data $x_i$ are shown, according to some embodiments. Graph 1200 is shown to include a time series data curve 1202 which represents the time series data $x_i$. Graph 1250 is shown to include a performance metric curve 1252 which represents the corresponding values of the performance metric $P_i$.

In graph 1200, the time series data curve 1202 begins decreasing at time $t_1$ and stops decreasing approximately fourteen days later at time $t_2$. In the embodiment illustrated in FIGS. 12A-12B, integration fault detector 530 uses a thirty-day data window to analyze the time series data curve 1202. Because the duration of the data window (i.e., thirty days) is approximately twice the duration of the downward ramp (i.e., fourteen days), the value of the time series data curve 1202 is changing enough to be detected by integration fault detector 530 over the duration of the data window. Accordingly, the performance metric curve 1252 drops below the second threshold value $T_2$ between times $t_1$ and $t_2$.

The scenario illustrated in FIGS. 12A-12B shows that integration fault detector 530 can detect ramps in the time series data when the window duration approximately twice the duration of the ramp. However, if the data window were decreased to be any shorter, the ramp in the time series data might not be detected unless the duration of the ramp were also decreased. Similarly, if the duration of the ramp were increased to be any longer, the ramp in the time series data might not be detected unless the duration of the data window were also increased.

Figure 13A:
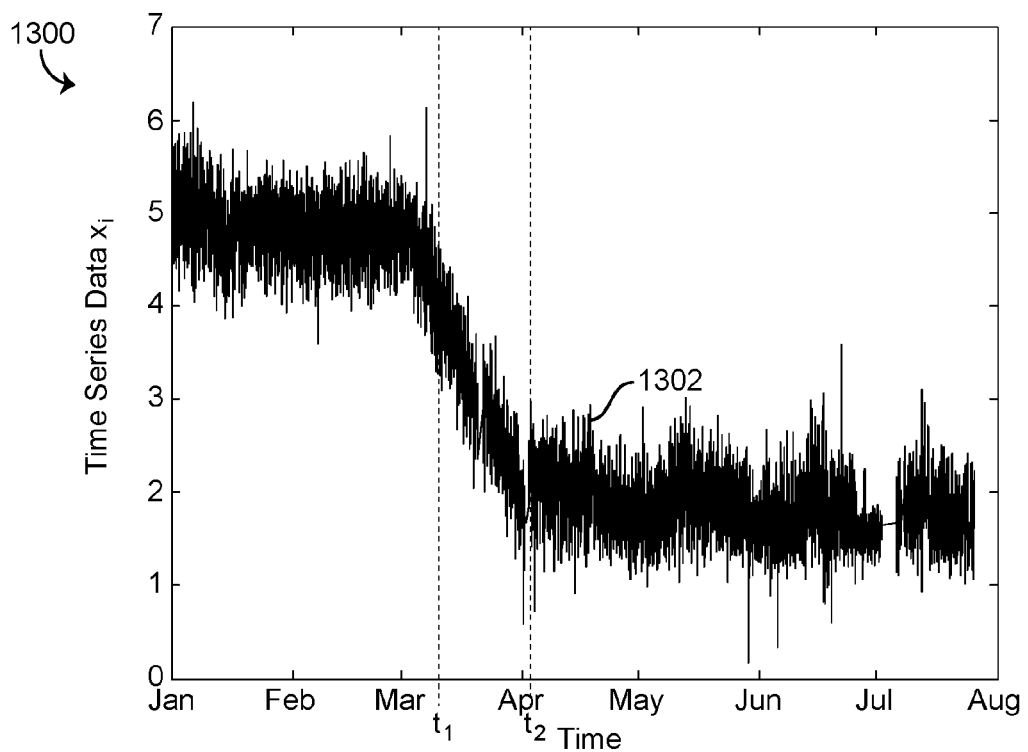
FIG. 13A is a graph of time series data as a function of time illustrating a scenario in which the time series data has a thirty-day downward ramp and a sixty-day data window is used to analyze the time series data, according to some embodiments.
Figure 13B:
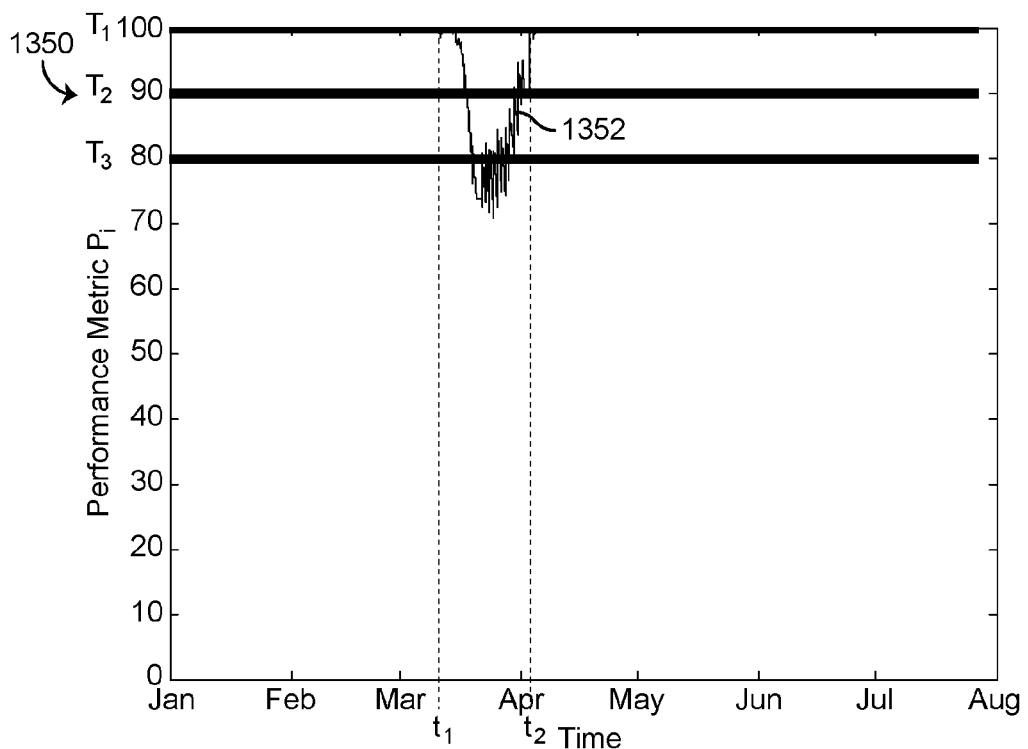
FIG. 13B is a graph of a performance metric which can be generated by the FDD system based on the time series data shown in FIG. 13A, according to some embodiments.

Referring now to FIGS. 13A-13B, graphs 1300 and 1350 illustrating time series data $x_i$ and corresponding performance metrics $P_i$ that result from a thirty-day downward ramp in the time series data $x_i$ and a sixty-day data window are shown, according to some embodiments. Graph 1300 is shown to include a time series data curve 1302 which represents the time series data $x_i$. Graph 1350 is shown to include a performance metric curve 1352 which represents the corresponding values of the performance metric $P_i$.

In graph 1300, the time series data curve 1302 begins decreasing at time $t_1$ and stops decreasing approximately thirty days later at time $t_2$. In the embodiment illustrated in FIGS. 13A-13B, integration fault detector 530 uses a sixty-day data window to analyze the time series data curve 1302. Because the duration of the data window (i.e., sixty days) is approximately twice the duration of the downward ramp (i.e., thirty days), the value of the time series data curve 1302 is changing enough to be detected by integration fault detector 530 over the duration of the data window. Accordingly, the performance metric curve 1352 drops below the third threshold value $T_3$ between times $t_1$ and $t_2$.

The scenario illustrated in FIGS. 13A-13B shows that integration fault detector 530 can detect ramps in the time series data when the window duration approximately twice the duration of the ramp. Compared with FIGS. 10A-10B, the same thirty-day ramp occurs in the time series data. However the longer sixty-day data window used in FIGS. 13A-13B allows the ramp to be detected (as shown in FIG. 13B) whereas the shorter five-day data window used in FIGS. 10A-10B does not detect the ramp (as shown in FIG. 10B).

Figure 14A:
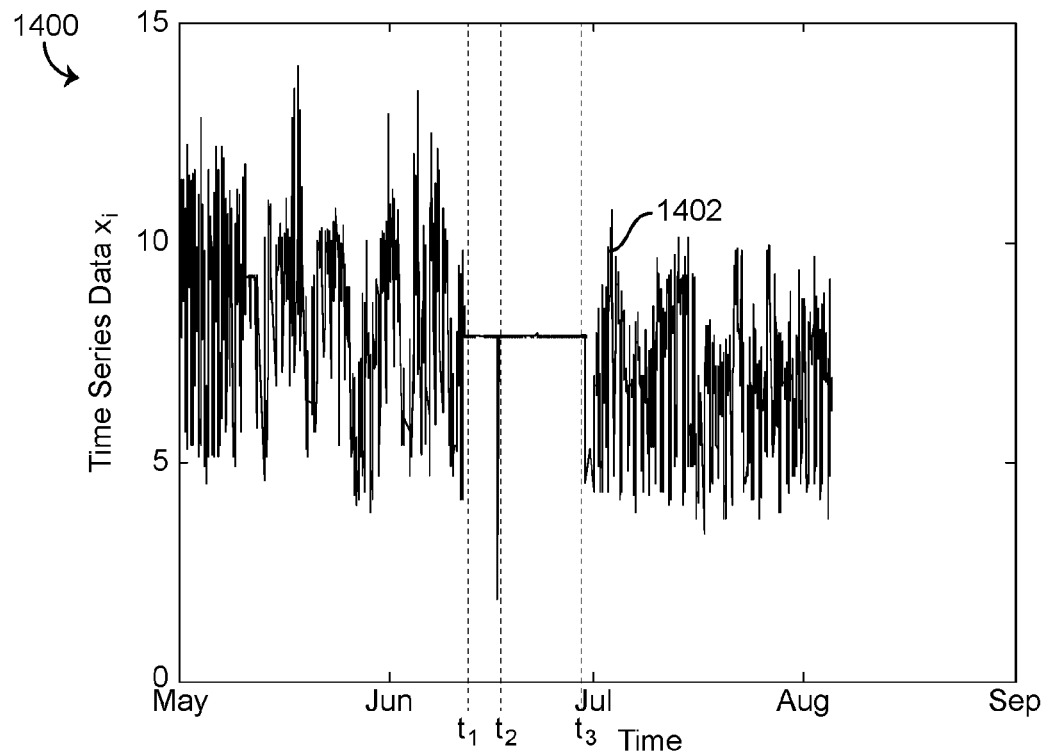
FIG. 14A is a graph of time series data as a function of time illustrating a scenario in which the time series data has a large variance change, according to some embodiments.
Figure 14B:
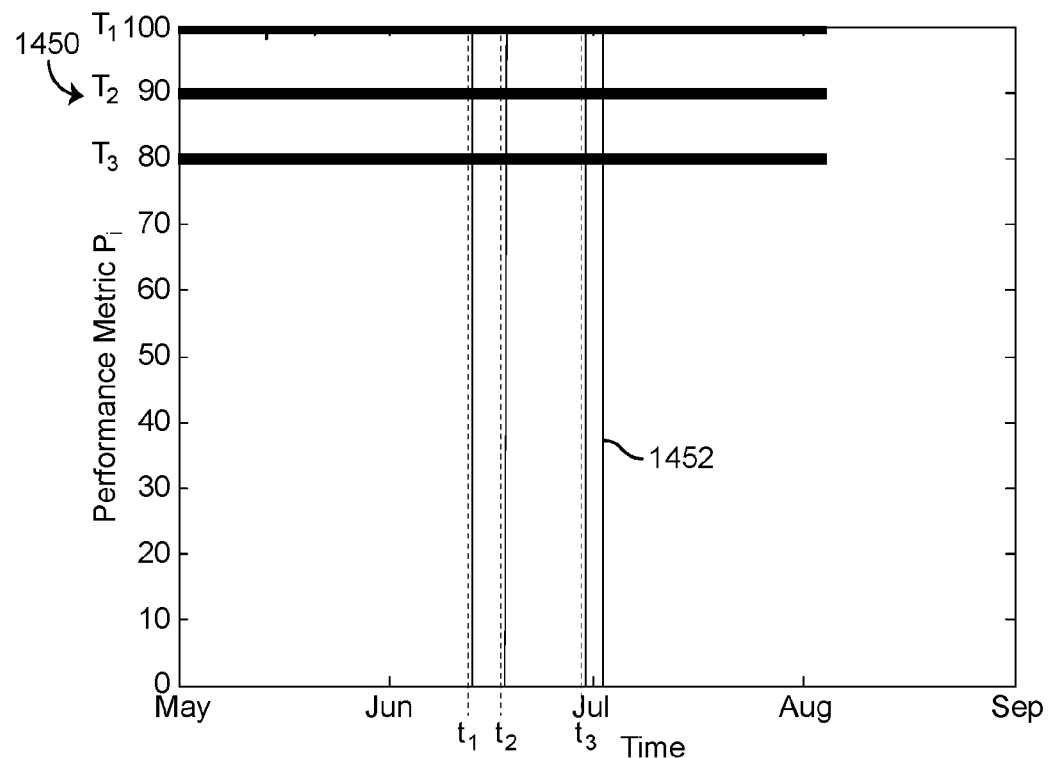
FIG. 14B is a graph of a performance metric which can be generated by the FDD system based on the time series data shown in FIG. 14A, according to some embodiments.

Referring now to FIGS. 14A-14B, graphs 1400 and 1450 illustrating time series data $x_i$ and corresponding performance metrics $P_i$ that result from a large variance change in the time series data $x_i$ are shown, according to some embodiments. Graph 1400 is shown to include a time series data curve 1402 which represents the time series data $x_i$. Graph 1450 is shown to include a performance metric curve 1452 which represents the corresponding values of the performance metric $P_i$.

In graph 1400, the variance of the time series data curve 1402 decreases significantly at time $t_1$ and then increases significantly at time $t_3$. At time $t_2$, a spike occurs in the time series data curve 1402. Integration fault detector 530 can be configured to detect changes in the variance of the time series data. For example, graph 1450 shows that the value of the performance metric curve 1452 can drop below the third threshold value $T_3$ in response to the decrease in variance at time $t_1$. Similarly, graph 1450 shows that the value of the performance metric curve 1452 can drop below the third threshold value $T_3$ in response to the increase in variance at time $t_2$. Integration fault detector 530 can also be configured to detect the spike in the time series data at time $t_2$, as previously described.

Figure 15A:
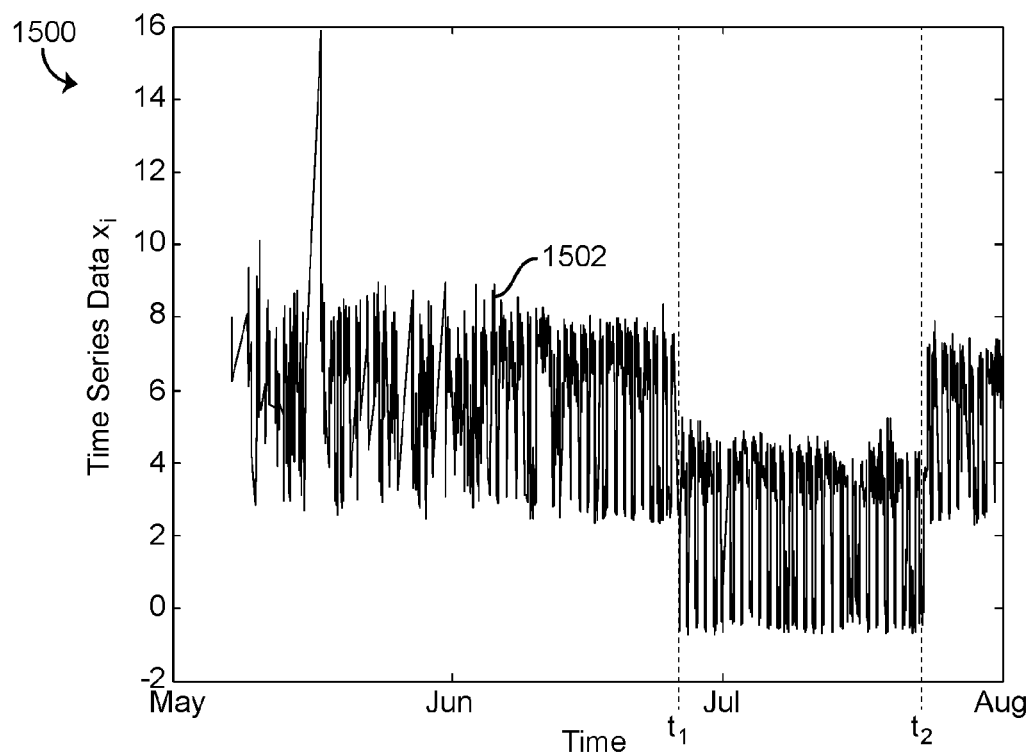
FIG. 15A is a graph of time series data as a function of time illustrating a scenario in which the time series data has another large variance change, according to some embodiments.
Figure 15B:
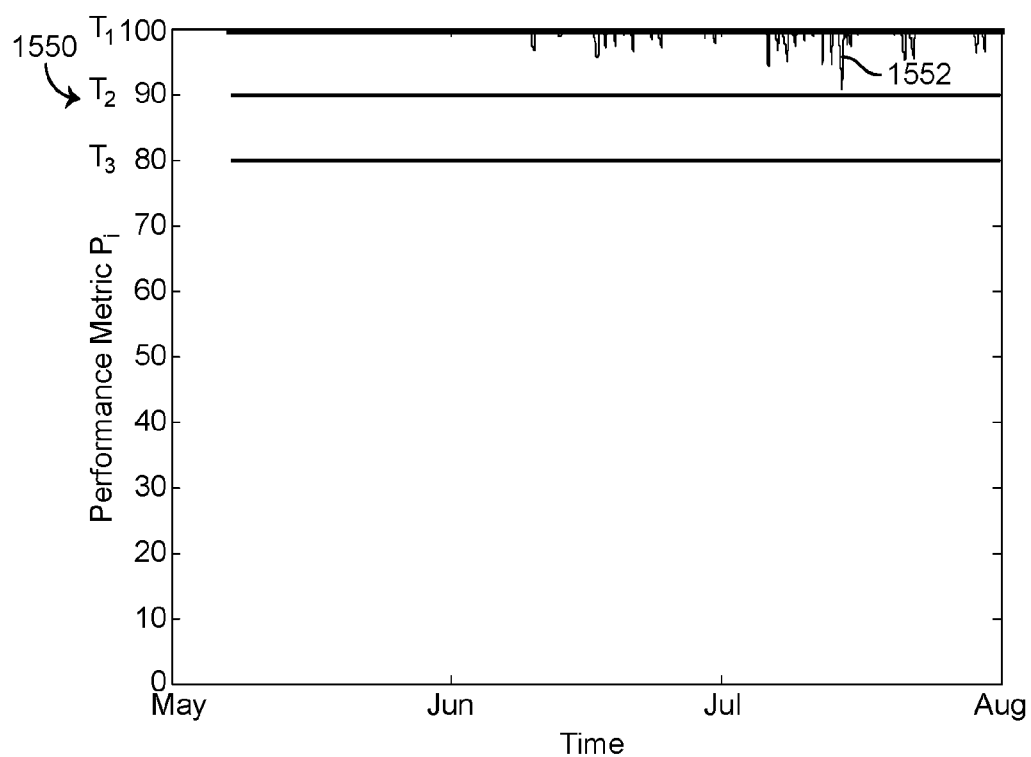
FIG. 15B is a graph of a performance metric which can be generated by the FDD system based on the time series data shown in FIG. 15A, according to some embodiments.

Referring now to FIGS. 15A-15B, graphs 1500 and 1550 illustrating time series data $x_i$ and corresponding performance metrics $P_i$ that result from another large variance change in the time series data $x_i$ are shown, according to some embodiments. Graph 1500 is shown to include a time series data curve 1502 which represents the time series data $x_i$. Graph 1550 is shown to include a performance metric curve 1552 which represents the corresponding values of the performance metric $P_i$.

In graph 1500, the time series data curve 1502 shifts to a new mean value at time $t_1$ and then shifts back to the original mean value at time $t_2$. However, the magnitude of the shift is relatively small compared to the variance of the time series data curve 1502. The value of the performance metric curve 1552 remains above the second threshold value $T_2$ throughout the shift. The scenario illustrated in FIGS. 15A-

15B shows that integration fault detector 530 might not detect shifts in the time series of the data when the time series data has a high variability relative to the magnitude of the shift.

Figure 16A:
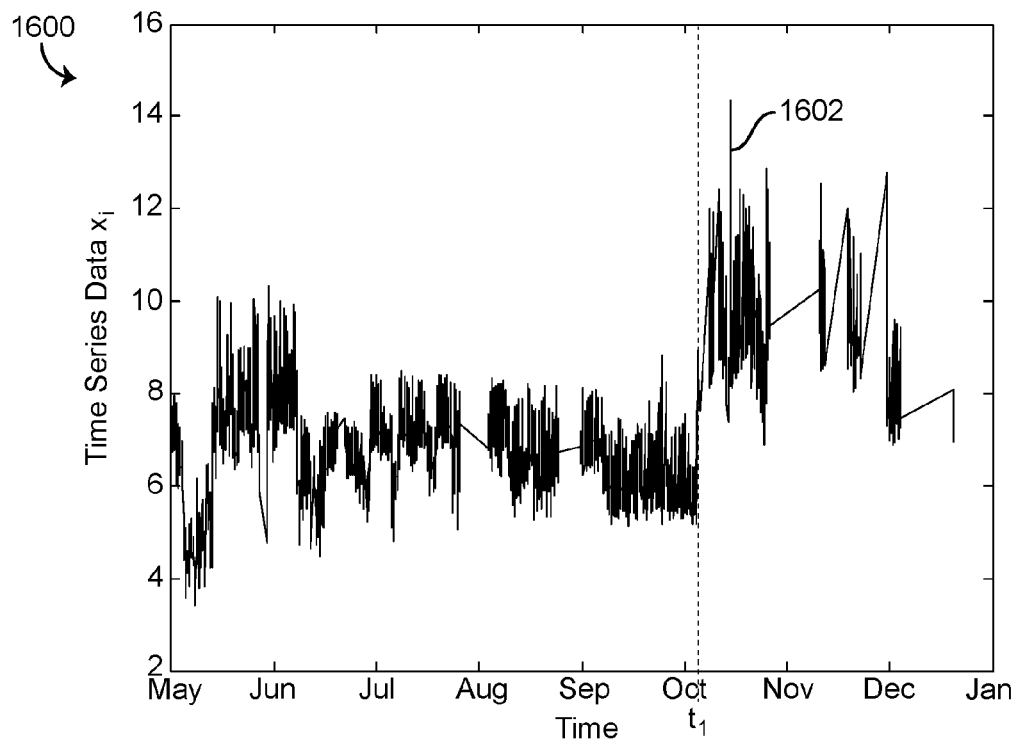
FIG. 16A is a graph of chiller time series data as a function of time, according to some embodiments.
Figure 16B:
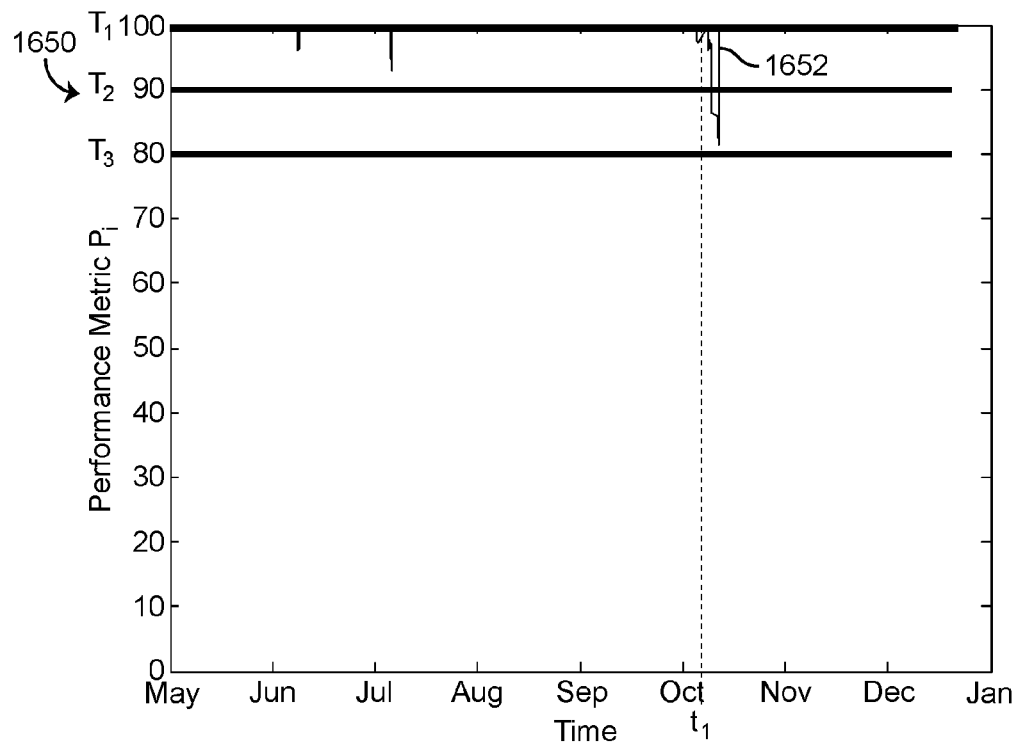
FIG. 16B is a graph of a performance metric which can be generated by the FDD system based on the time series data shown in FIG. 16A, according to some embodiments.

Referring now to FIGS. 16A-16B, graphs 1600 and 1650 illustrating time series data $x_i$ and corresponding performance metrics $P_i$ that result from chiller time series data $x_i$ are shown, according to some embodiments. Graph 1600 is shown to include a time series data curve 1602 which represents the time series data $x_i$. Graph 1650 is shown to include a performance metric curve 1652 which represents the corresponding values of the performance metric $P_i$. In graph 1600, the time series data curve 1602 represents the coefficient of performance (COP) for a chiller. At time $t_1$, the COP increases from a mean value of approximately 6.0 to a mean value of approximately 10.0. Integration fault detector 530 detects this change by dropping the value of the performance metric curve 1652 below the second threshold $T_2$ at time $t_1$.

As shown in FIGS. 8A-16B, the fault detection by integration (FDI) technique has several strengths and weaknesses. For example, the FDI technique can detect spikes and abrupt shifts in the time series data. The FDI technique can also detect ramps in the time series data that occur over a duration less than or equal to half the duration of the data window. However, the FDI technique might not detect ramps in the time series data that occur over a duration greater than the half the duration of the data window. The FDI technique can be used to detect increases and decreases in variance in the time series data. In some embodiments, the FDI technique is most readily applicable to uncontrolled variables (e.g., COP) and may not be particularly suitable for controlled variables (e.g., chiller water temperature). Fault detector selector 526 can uses these strengths and weaknesses to determine whether to use integration fault detector or kernel density fault detector for a set of time series data.

Fault Detection by Kernel Density Graphs

Figure 17A:
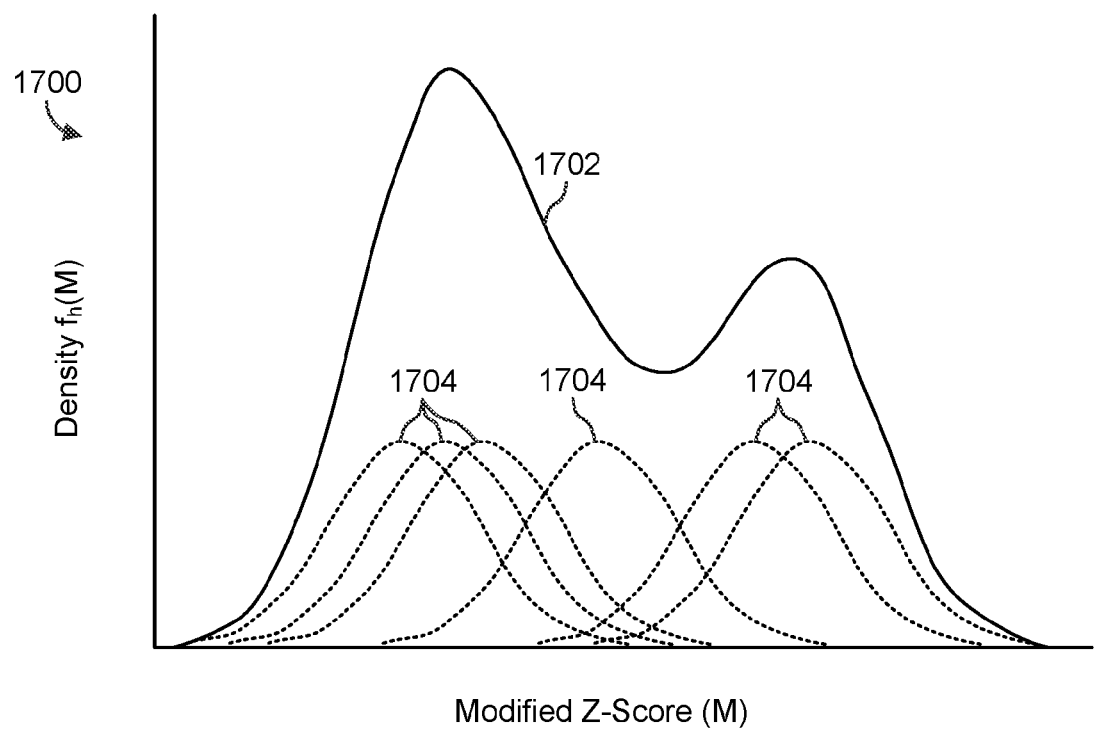
FIG. 17A is a graph of a kernel density distribution which can be generated by the FDD system, according to some embodiments.
Figure 17B:
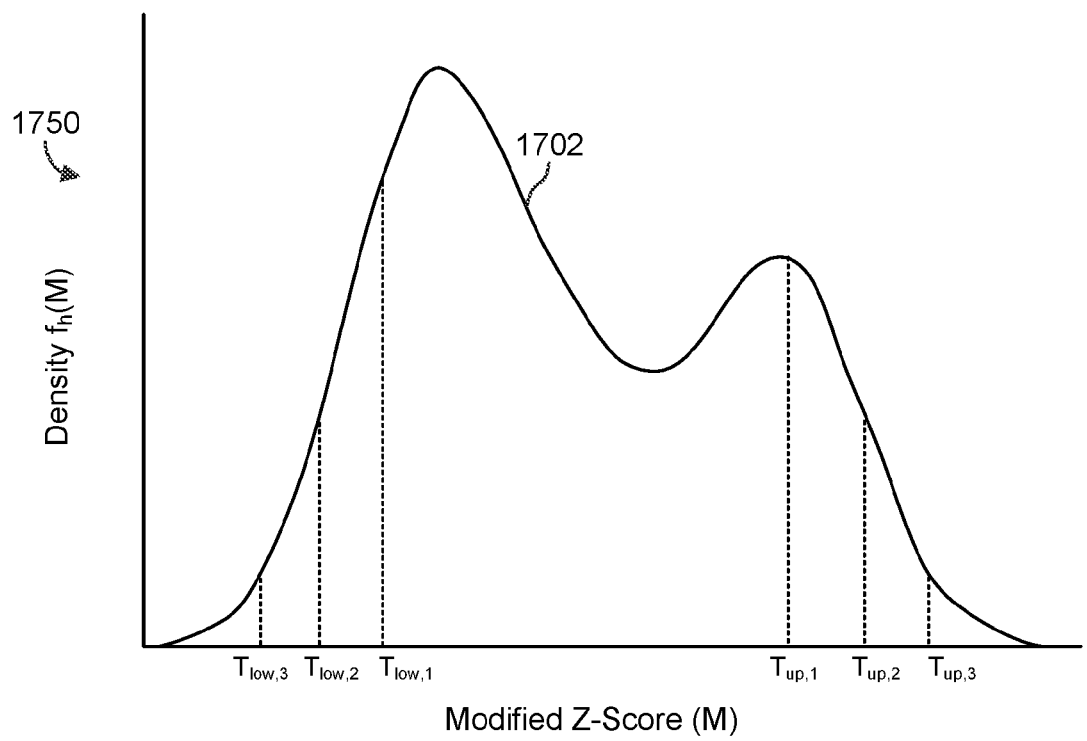
FIG. 17B is a graph of the kernel density distribution with several threshold values, according to some embodiments.
Figure 18:
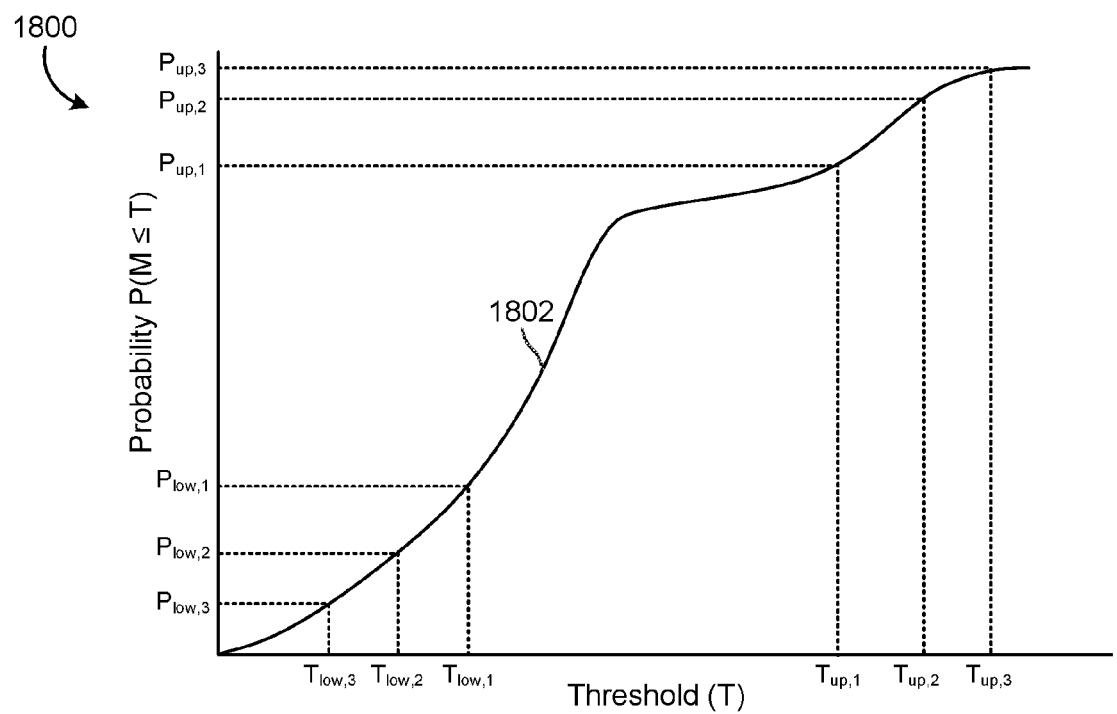
FIG. 18 is a graph 1800 of a cumulative distribution function (CDF) which can be generated by the FDD system based on the kernel density distribution of FIGS. 17A-17B, according to some embodiments.

Referring now to FIGS. 17A-18, several graphs illustrating the kernel density fault detection technique used by kernel density fault detector 540 are shown, according to some embodiments. Referring particularly to FIG. 17A, a graph 1700 of a kernel density distribution 1702 is shown. Kernel density distribution 1702 can be generated by kernel density estimator 542, as described with reference to FIG. 6. For example, kernel density estimator 542 can generate the kernel density distribution using the following equation:

$$f_h(M) = \frac{1}{nh}\sum_{i=1}^{n} K\left(\frac{M-M_i}{h}\right); -\infty < M < \infty$$

where n is the sample size, h is the bandwidth, and the function $$K\left(\frac{M-M_i}{h}\right)$$

is the kernel smoothing function 1704.

Kernel smoothing function 1704 is a non-negative function that integrates to one and has a mean of zero. Kernel density estimator 542 can generate a kernel smoothing function 1704 for each of the modified z-scores $M_i$. In some embodiments, kernel density estimator 542 uses the normal distribution function as the kernel smoothing function 1704.

For example, graph 1704 is shown to include several kernel smoothing functions 1704, each of which is centered at one of the modified z-scores $M_i$. In other embodiments, kernel density estimator 542 can use any of a variety of other functions as the kernel smoothing function 1704 (e.g., uniform, triangular, biweight, triweight, etc.).

Kernel density distribution 1702 represents a summation of the individual kernel smoothing functions 1704. Like a histogram, kernel density distribution 1702 represents the probability distribution of the modified z-scores $M_i$. However, unlike a histogram, kernel density distribution 1702 sums the component smoothing functions 1704 for each modified z-score $M_i$ to produce a smooth, continuous probability distribution curve 1702 instead of placing the data into discrete bins. Kernel density estimator 542 can generate kernel density distribution 1702 by summing the individual component smoothing functions 1704 using the equation for $f_h(M)$.

Referring now to FIG. 17B, a graph 1750 of the kernel density distribution 1702 with several threshold values is shown, according to some embodiments. The threshold values are shown to include a first lower threshold $T_{low,1}$, a second lower threshold $T_{low,2}$, a third lower threshold $T_{low,3}$, a first upper threshold $T_{up,1}$, a second upper threshold $T_{up,2}$, and a third upper threshold $T_{up,3}$. Kernel density fault detector 540 is configured to automatically determine the threshold values and to use the threshold values as control chart limits.

The threshold values $T_{low,1}$, $T_{low,2}$, $T_{low,3}$, $T_{up,1}$, $T_{up,2}$, and $T_{up,3}$ can be automatically determined by threshold calculator 546, as described with reference to FIG. 6. For example, threshold calculator 546 can determine the first lower threshold $T_{low,1}$ and the first upper threshold $T_{up,1}$ such that the interval between $T_{low,1}$ and $T_{up,1}$ excludes a predetermined proportion $\alpha_1$ of the modified z-scores (e.g., $\alpha_1=0.32$). In other words, 32% of the modified z-scores (i.e., the area under the kernel density distribution 1702) can be less than $T_{low,1}$ or greater than $T_{up,1}$. Threshold calculator 546 can determine the second lower threshold $T_{low,2}$ and the second upper threshold $T_{up,2}$ such that the interval between $T_{low,2}$ and $T_{up,2}$ excludes a predetermined proportion $\alpha_2$ of the modified z-scores (e.g., $\alpha_1=0.05$). In other words, 5% of the modified z-scores can be less than $T_{low,2}$ or greater than $T_{up,2}$. Threshold calculator 546 can determine the third lower threshold $T_{low,3}$ and the third upper threshold $T_{up,3}$ such that the interval between $T_{low,3}$ and $T_{up,3}$ excludes a predetermined proportion $\alpha_3$ of the modified z-scores (e.g., $\alpha_1=0.01$). In other words, 1% of the modified z-scores can be less than $T_{low,3}$ or greater than $T_{up,3}$. In some embodiments, threshold calculator 546 uses the cumulative distribution function F(T) to determine the threshold values $T_{low,1}$, $T_{low,2}$, $T_{low,3}$, $T_{up,1}$, $T_{up,2}$, and $T_{up,3}$.

Referring now to FIG. 18, a graph 1800 of a cumulative distribution function (CDF) 1802 is shown, according to some embodiments. CDF 1802 can be generated by CDF generator 544, as described with reference to FIG. 6. For example, CDF generator 544 can generate CDF 1802 based on the kernel density distribution $f_h(M)$ according to the following equation:

$$F(T) = \int_{-\infty}^{T} f_h(M)dM = P(M \leq T)$$

where M is a random variable representing the modified z-scores. The cumulative distribution function F(T) represents the probability P that a random modified z-score M is less than or equal a threshold value T, given the kernel density distribution 1702.

In some embodiments, threshold calculator 546 uses the cumulative distribution function 1802 to determine values for the threshold T that correspond to predetermined probability values P. For example, graph 1800 is shown to include a first lower probability $P_{low,1}$, a second lower probability $P_{low,2}$, a third lower probability $P_{low,3}$, a first upper probability $P_{up,1}$, a second upper probability $P_{up,2}$, and a third upper threshold $P_{up,3}$. Each probability value P is the probability that a random modified z-score M is less than or equal to the corresponding threshold T. Each probability value also represents the area under the kernel density distribution 1702 (shown in FIG. 17B) to the left of the corresponding threshold value T.

Threshold calculator 546 can use the inverse of the cumulative distribution function 1802 to determine the threshold value T that corresponds to each of the probability values P. The inverse of the cumulative distribution function 1802 can be expressed as $F^{-1}(P)=T$, where P is the probability that a random modified z-score M will be less than or equal to the threshold T and $F^{-1}(\ )$ is the inverse of the cumulative distribution function 1802. The inverse cumulative distribution function can be used to determine values of the thresholds $T_{low,1}$, $T_{low,2}$, $T_{low,3}$, $T_{up,1}$, $T_{up,2}$, and $T_{up,3}$ by substituting the values $$\frac{\alpha}{2} \text{ and } 1 - \frac{\alpha}{2}$$

for P, as shown in the following equations:

$$T_{low} = F^{-1}\left(\frac{\alpha}{2}\right)$$

$$T_{up} = F^{-1}\left(1 - \frac{\alpha}{2}\right)$$

In some embodiments, threshold calculator 546 determines values of $T_{low}$ and $T_{up}$ for several different probability values $\alpha$. For example, threshold calculator 546 can determine the first lower threshold $T_{low,1}$ and the first upper threshold $T_{up,1}$ by setting $\alpha=0.32$. In other words 68% of random modified z-scores M will be between $T_{low,1}$ and $T_{up,1}$. Threshold calculator 546 can calculate $T_{low,1}$ and using the following equations:

$$T_{low,1} = F^{-1}(0.16)$$

$$T_{up,1} = F^{-1}(0.84)$$

Threshold calculator 546 can determine the second lower threshold $T_{low,2}$ and the second upper threshold $T_{up,2}$ by setting $\alpha=0.05$. In other words 95% of random modified z-scores M will be between $T_{low,2}$ and $T_{up,2}$. Threshold calculator 546 can calculate $T_{low,2}$ and $T_{up,2}$ using the following equations:

$$T_{low,2} = F^{-1}(0.025)$$

$$T_{up,2} = F^{-1}(0.975)$$

Threshold calculator 546 can determine the third lower threshold $T_{low,3}$ and the third upper threshold $T_{up,3}$ by setting $\alpha=0.01$. In other words 99% of random modified z-scores M will be between $T_{low,3}$ and $T_{up,3}$. Threshold calculator 546 can calculate $T_{low,3}$ and $T_{up,3}$ using the following equations:

$$T_{low,3} = F^{-1}(0.005)$$

$$T_{up,3} = F^{-1}(0.995)$$

Although several specific values of a are provided, it is contemplated that threshold calculator 546 can determine threshold values $T_{low}$ and $T_{up}$ for any probability value a in addition to (or in place of) the specific examples described herein. As such, the lower threshold $T_{low}$ can include any number of lower thresholds (e.g., $T_{low,1}$, $T_{low,2}$, $T_{low,3}$, etc.) and the upper threshold $T_{up}$ can include any number of upper thresholds (e.g., $T_{up,1}$, $T_{up,2}$, $T_{up,3}$, etc.). Kernel density fault detector 540 can use the calculated thresholds in combination with control chart rules 550 to detect abnormal values of the modified z-scores, as described with reference to FIG. 6.

In some embodiments, the graphs shown in FIGS. 7A-18 can be provided as part of a user interface. The user interface can be part of a monitoring and reporting application, energy management application, system dashboard, or other interface configured to present equipment performance information to a user. In some embodiments, the user interface includes coloring (e.g., green, yellow, red, etc.) that indicates the value of the performance metric for the building equipment relative to various threshold values. For example, an icon or text representing the building equipment can be colored green if the performance metric is above a first threshold value, colored yellow if the performance metric is between the first threshold value and a second (lower) threshold value, and colored red if the performance metric is below the second threshold value. In some embodiments, the coloring indicates whether a modified z-score M is within a first range of thresholds (e.g., between $T_{low,1}$ and $T_{up,1}$), a second range of thresholds (e.g., between $T_{low,2}$ and $T_{up,2}$), or a third range of thresholds (e.g., between $T_{low,3}$ and $T_{up,3}$). It is contemplated that the user interface can present such information for a single device or any number of devices.

Kernel Density Fault Detection Results

The KDCC technique was tested on three data sets. Each data set includes a time series of values $x_i$ and indicates the days during which a true fault occurred. The KDCC technique was used to analyze each of the data sets. Fault detections generated by the KDCC technique were compared to the true fault indications to determine whether the KDCC technique generated a true positive (i.e., detecting a fault when a true fault exists), a false positive (i.e., detecting a fault when no true fault exists), a true negative (i.e., not detecting a fault when no true fault exists), or a false negative (i.e., failing to detect a true fault) for each day represented in the time series data.

The first data set was time series data indicating the discharge air temperature (i.e., DA-T) of an air handler (i.e., AHU-1) that had significant setpoint deviation. Table 1 below shows the incidence of true positives (TP), false positives (FP), false negatives (FN), and true negatives (TN) resulting from analyzing the time series data using the KDCC technique.

TABLE 1

| Time Series Data | Date | TP | FP | FN | TN |
|---|---|---|---|---|---|
| AHU-1 DA-T | 16 Mar. 2011 | 1 | 0 | 0 | 0 |
| | 17 Mar. 2011 | 0 | 0 | 1 | 0 |
| # Days = 71 | Total | 1 | 0 | 1 | 69 |

The second data set was time series data indicating the chilled water temperature (i.e., CW-T) for a chiller (i.e., Chiller-1). Table 2 below shows the incidence of true positives (TP), false positives (FP), false negatives (FN), and true negatives (TN) resulting from analyzing the time series data using the KDCC technique.

TABLE 2

| Time Series Data | Date | TP | FP | FN | TN |
|---|---|---|---|---|---|
| Chiller-1 CW-T | 7 Feb. 2011 | 0 | 0 | 0 | 1 |
| | 13 Feb. 2011 | 1 | 0 | 0 | 0 |
| | 15 Feb. 2011 | 0 | 0 | 0 | 1 |
| | 20 Feb. 2011 | 0 | 0 | 0 | 1 |
| | 23 Feb. 2011 | 0 | 0 | 0 | 1 |
| | 24 Feb. 2011 | 0 | 0 | 0 | 1 |
| | 10 Mar. 2011 | 1 | 0 | 0 | 0 |
| | 25 Mar. 2011 | 0 | 0 | 0 | 1 |
| | 26 Mar. 2011 | 0 | 0 | 0 | 1 |
| | 27 Mar. 2011 | 0 | 0 | 0 | 1 |
| | 28 Mar. 2011 | 0 | 0 | 0 | 1 |
| | 15 May 2011 | 0 | 0 | 0 | 1 |
| | 19 May 2011 | 1 | 0 | 0 | 0 |
| | 20 May 2011 | 1 | 0 | 0 | 0 |
| | 24 May 2011 | 0 | 0 | 0 | 1 |
| | 29 May 2011 | 0 | 0 | 0 | 1 |
| | 30 May 2011 | 0 | 0 | 0 | 1 |
| | 10 Jun. 2011 | 1 | 0 | 0 | 0 |
| | 11 Jun. 2011 | 1 | 0 | 0 | 0 |
| | 18 Jun. 2011 | 1 | 0 | 0 | 0 |
| | 19 Jun. 2011 | 1 | 0 | 0 | 0 |
| | 20 Jun. 2011 | 1 | 0 | 0 | 0 |
| | 25 Jun. 2011 | 1 | 0 | 0 | 0 |
| | 28 Jun. 2011 | 1 | 0 | 0 | 0 |
| | 2 Jul. 2011 | 1 | 0 | 0 | 0 |
| | 4 Jul. 2011 | 1 | 0 | 0 | 0 |
| | 5 Jul. 2011 | 1 | 0 | 0 | 0 |
| | 6 Jul. 2011 | 1 | 0 | 0 | 0 |
| | 10 Jul. 2011 | 1 | 0 | 0 | 0 |
| | 11 Jul. 2011 | 1 | 0 | 0 | 0 |
| | 12 Jul. 2011 | 1 | 0 | 0 | 0 |
| | 18 Jul. 2011 | 1 | 0 | 0 | 0 |
| | 19 Jul. 2011 | 1 | 0 | 0 | 0 |
| # Days = 181 | Total | 20 | 0 | 0 | 161 |

The third data set was time series data indicating the chilled water temperature (i.e., CW-T) for another chiller (i.e., Chiller-3). Table 3 below shows the incidence of true positives (TP), false positives (FP), false negatives (FN), and true negatives (TN) resulting from analyzing the time series data using the KDCC technique.

TABLE 3

| Time Series Data | Date | TP | FP | FN | TN |
|---|---|---|---|---|---|
| Chiller-2 CW-T | 21 Jan. 2009 | 0 | 1 | 0 | 0 |
| | 14 Feb. 2009 | 0 | 0 | 1 | 0 |
| | 20 Feb. 2009 | 0 | 0 | 1 | 0 |
| | 28 Feb. 2009 | 1 | 0 | 0 | 0 |
| | 2 Mar. 2009 | 1 | 0 | 0 | 0 |
| | 3 Mar. 2009 | 0 | 0 | 1 | 0 |
| | 5 Mar. 2009 | 1 | 0 | 0 | 0 |
| | 19 May 2009 | 1 | 0 | 0 | 0 |
| | 26 May 2009 | 1 | 0 | 0 | 0 |
| | 9 Jun. 2009 | 0 | 1 | 0 | 0 |
| | 11 Jun. 2009 | 1 | 0 | 0 | 0 |
| | 12 Jun. 2009 | 1 | 0 | 0 | 0 |
| | 13 Jun. 2009 | 1 | 0 | 0 | 0 |
| | 16 Jun. 2009 | 0 | 0 | 1 | 0 |
| | 17 Jun. 2009 | 1 | 0 | 0 | 0 |
| | 18 Jun. 2009 | 1 | 0 | 0 | 0 |
| | 19 Jun. 2009 | 1 | 0 | 0 | 0 |
| | 26 Jun. 2009 | 1 | 0 | 0 | 0 |
| # Days = 181 | Total | 12 | 2 | 4 | 163 |

Table 4 below shows the three data sets and summary measures indicating the accuracy of the KDCC technique. For each of the three data sets, Table 4 indicates the true positive rate (TPR), the true negative rate (TNR), the false positive rate (FPR), the false negative rate (FNR), the precision p, the recall r, the $F_1$-measure $F_1$, and accuracy. The true positive rate TPR can be defined as the fraction of positive instances correctly classified $$\left(\text{e.g., } TPR = \frac{TP}{TP + FN}\right).$$

Similarly, the true negative rate TNR can be defined as the fraction of negative instances correctly identified $$\left(\text{e.g., } TNR = \frac{TN}{TN + FP}\right).$$

The false positive rate FPR can be defined as the fraction of negative instances classified as positive $$\left(\text{e.g., } FPR = \frac{FP}{TN + FP}\right).$$

Similarly, the false negative rate FNR can be defined as the fraction of positive instances classified as negative $$\left(\text{e.g., } FNR = \frac{FN}{TP + FN}\right).$$

The precision p indicates the fraction of instances that are true positives in the group of all positives $$\left(\text{e.g., } p = \frac{TP}{TP + FP}\right).$$

The recall r indicates the fraction of instances that are positive and correctly classified as positive $$\left(\text{e.g., } r = \frac{TP}{TP + FN}\right).$$

The $F_1$ measure represents the harmonic mean between precision p and recall r $$\left(\text{e.g., } F_1 = \frac{2rp}{r + p}\right).$$

indicates the fraction of $$\left(\text{e.g., accuracy} = \frac{TP + TN}{TP + TN + FP + FN}\right).$$

classifications that are correctly classified

TABLE 4

| Metric | Data Set 1 | Data Set 2 | Data Set 3 |
|---|---|---|---|
| TPR | 0.500 | 1.000 | 0.750 |
| TNR | 1.000 | 1.000 | 0.988 |

TABLE 4-continued

| Metric | Data Set 1 | Data Set 2 | Data Set 3 |
|---|---|---|---|
| FPR | 0.000 | 0.000 | 0.012 |
| FNR | 0.500 | 0.000 | 0.250 |
| Precision (p) | 1.000 | 1.000 | 0.857 |
| Recall (r) | 0.500 | 1.000 | 0.750 |
| $F_1$ measure | 0.666 | 1.000 | 0.800 |
| Accuracy | 0.986 | 1.000 | 0.967 |

In some embodiments, a good classifier has a high precision p and a high recall r. The $F_1$ measure represents both of these metrics since the $F_1$ measure is the harmonic mean of recall r and precision p. The $F_1$ measure can have a value close to the lower of its components. Accordingly, to have a high $F_1$ measure, both the recall r and the precision p should be high. The accuracy also shows the overall fraction of correctly classified instances out of the total instances. The KDCC technique has a high accuracy and a high $F_1$ measure for both the second data set and the third data set. However, the KDCC technique has a high accuracy but a low $F_1$ measure for the first data set (due to the low recall r of the first data set). The low recall r can occur due to few fault conditions in the first data set.

Overall, the KDCC technique works well for variables that are controlled to a setpoint, but might not work well for variables that are not controlled to a setpoint. The KDCC technique does not assume normally distributed data and can adaptively adjust the threshold values based on the set of time series data (e.g., the time series of modified z-scores). Fault detector selector 526 can uses these strengths and weaknesses to determine whether to use integration fault detector or kernel density fault detector for a set of time series data.

Flow Diagrams

Figure 19:
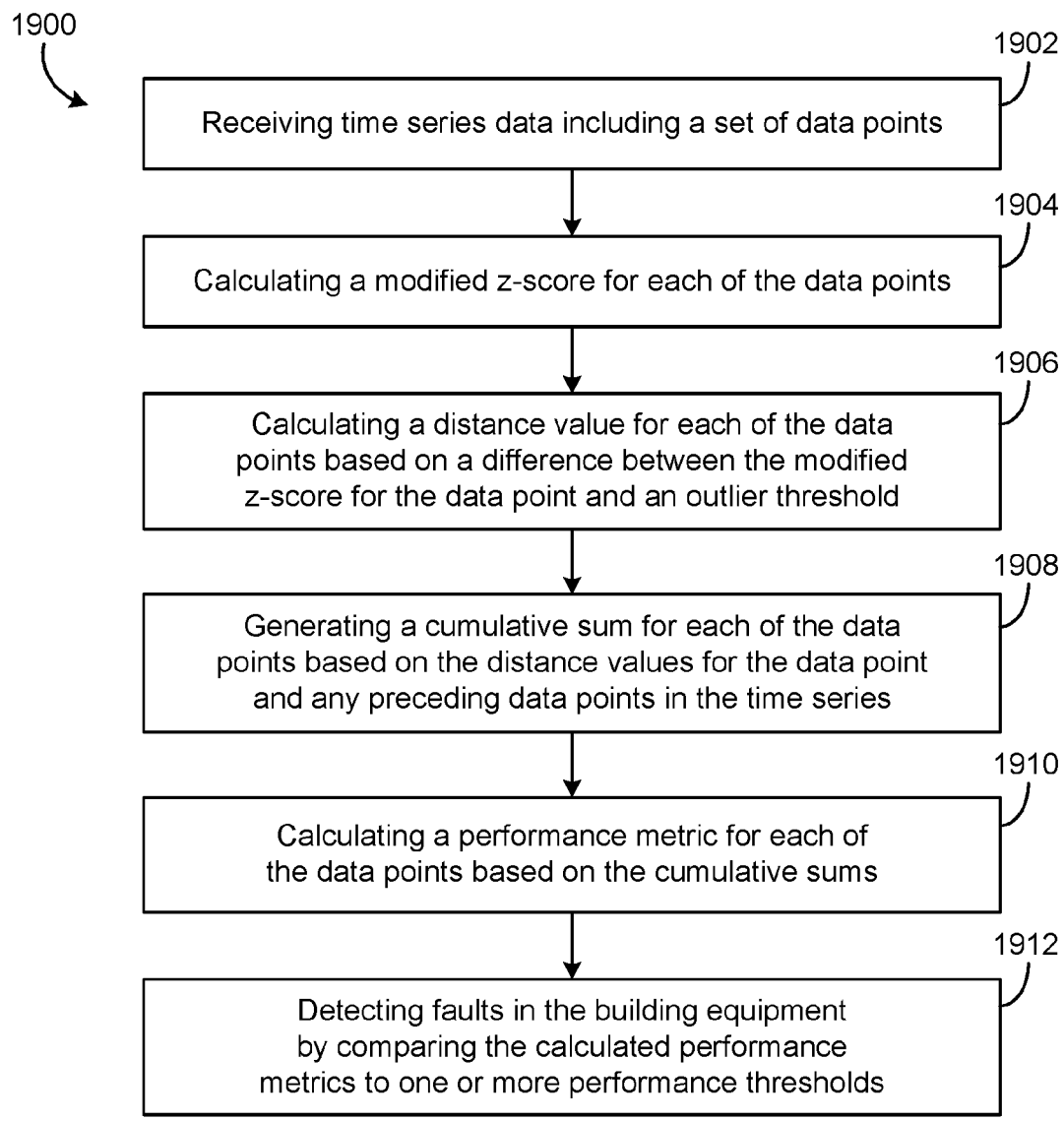
FIG. 19 is a flow diagram illustrating a fault detection by integration technique which can be performed by the FDD system, according to some embodiments.

Referring now to FIG. 19, a flow diagram 1900 illustrating the fault detection by integration technique is shown, according to some embodiments. The fault detection by integration technique can be used by integration fault detector 530 to detect faults in building equipment based on a time series of data, as described with reference to FIG. 6.

Flow diagram 1900 is shown to include receiving time series data including a set of data points (block 1902). In some embodiments, each of the data points has a data value affected by operating the building equipment (e.g., if the building equipment is a chiller, heater, compressor, or other operable device). In other embodiments, the time series can include values measured by the building equipment (e.g., if the building equipment is a sensor) or calculated by the building equipment (e.g., if the building equipment is a smart device such as a controller).

The building equipment can include any type of equipment capable of monitoring and/or controlling conditions within a building (e.g., HVAC equipment, lighting equipment, security equipment, fire safety equipment, etc.) or other types of equipment which can be used in or around a building (e.g., ICT equipment, lifts/escalators, refrigeration equipment, advertising or signage, cooling equipment, vending equipment, etc.). The building equipment can include various types of sensors (e.g., temperature sensors, humidity sensors, lighting sensors, motion sensors, voltage sensors, etc.) configured to measure a variable of interest in or around a building (e.g., temperature, humidity, light intensity, power consumption, etc.) and/or controllable equipment configured to affect the measured variable (e.g., heaters, chillers, humidifiers, lighting devices, etc.).

Flow diagram 1900 is shown to include calculating a modified z-score for each of the data points (block 1904). Calculating the modified z-score can include calculating the median absolute deviation MAD of the time series data and/or the median $\tilde{x}$ of the time series data. In some embodiments, the MAD can be calculated using the following equation:

$$MAD = median(|x_i - \tilde{x}|)$$

where $x_i$ is the ith sample of the time series and $\tilde{x}$ is the median of the samples within the selected data window. The expression $|x_i - \tilde{x}|$ represents the absolute deviation $A_i$ of the sample $x_i$ relative to the median $\tilde{x}$. The function median( ) calculates the median of the set of absolute deviations $A_i$, where i=1 . . . n and n is the total number of samples within the selected data window.

In some embodiments, the modified z-score $M_i$ is calculated using the following equation:

$$M_i = \frac{x_i - \tilde{x}}{K * MAD} = \frac{x_i - \tilde{x}}{1.4826 * MAD} = \frac{0.6745 * (x_i - \tilde{x})}{MAD}$$

where the constant K has a value of K=1.426 for large and normally distributed data sets. However, it is contemplated that other values of K could be used for other types of data sets. For example, the value of K for a given data set can be selected such that the product K*MAD is equal to the standard deviation σ of the data set. In other words, the value of K can be calculated using the equation $$K = \frac{\sigma}{MAD}.$$

Flow diagram 1900 is shown to include calculating a distance value for each of the data points based on a difference between the modified z-score for the data point and an outlier threshold (block 1906). In some embodiments, the outlier threshold is a positive outlier threshold $T_{high}$ if the modified z-score $M_i$ is positive, but a negative outlier threshold $T_{low}$ if the modified z-score $M_i$ is negative. For example, each distance value $d_i$ can be calculated using the following piecewise equation:

$$d_i = \begin{cases} M_i - T_{high} & \text{if } M_i \geq 0 \\ T_{low} - M_i & \text{if } M_i < 0 \end{cases}$$

Accordingly, the distance value $d_i$ represents an amount by which the corresponding modified z-score $M_i$ exceeds the positive outlier threshold $T_{high}$ (if $M_i$ is positive) or an amount by which the modified z-score $M_i$ is less than the negative outlier threshold $T_{low}$ (if $M_i$ is negative). Positive values of $d_i$ indicate that the corresponding modified z-score $M_i$ is outside the range between $T_{low}$ and $T_{high}$, whereas negative values of $d_i$ indicate that the corresponding modified z-score $M_i$ is between $T_{low}$ and $T_{high}$. In some embodiments, $T_{low}$ is approximately −3.5 (i.e., $T_{low}$=−3.5), whereas $T_{high}$ is approximately 3.5 (i.e., $T_{high}$=3.5).

In some embodiments, the outlier threshold is a single threshold $T_{threshold}$. The distance value $d_i$ can be defined as the amount by which the absolute value of the corresponding modified z-score $M_i$ exceeds the threshold $T_{threshold}$. For example, the distance value $d_i$ can be calculated using the following equation:

$$d_i = |M_i| - T_{threshold}$$

Positive values of $d_i$ indicate that the corresponding modified z-score $M_i$ is either greater than $T_{threshold}$ or less than $-T_{threshold}$, whereas negative values of $d_i$ indicate that the corresponding modified z-score $M_i$ is between $T_{threshold}$ and $-T_{threshold}$. In some embodiments, $T_{threshold}$ is approximately 3.5 (i.e., $T_{threshold}=3.5$).

In some embodiments, the distance value $d_i$ is calculated for each of the modified z-scores $M_i$ (i.e., $D \ni \{d_1, d_2, \ldots d_n\}$). The distances values $d_i$ can be stored as time series values where each distance value $d_i$ represents an element of the time series and corresponds to a particular element $x_i$ of the original time series.

Flow diagram 1900 is shown to include generating a cumulative sum for each of the data points (block 1908). Each cumulative sum can be based on the distance values for the data point and any preceding data points in the time series. In other words, each cumulative sum $X_i$ can be calculated as the summation of the distance values up to and including $d_i$, as shown in the following equation:

$$X_i = \sum_{j=1}^{i} d_j$$

such that the value of the cumulative sum $X_i$ increases when $d_j$ is positive and decreases when $d_j$ is negative. For example, the first cumulative sum $X_1$ is equal to the first distance value $d_1$, whereas the second cumulative sum $X_2$ is equal to the sum $d_1+d_2$.

In some embodiments, each cumulative sum $X_i$ is calculated subject to the constraint that the cumulative sum $X_i$ cannot decrease below zero during the summation. For example, the cumulative sum $X_i$ can be calculated using the following equation:

$$X_i = \min\begin{cases} X_{i-1} + d_i \\ 0 \end{cases}$$

where $X_0$ is set to a value of $X_0=0$ such that $X_1=\min(d_i, 0)$. This equation constrains the value of $X_i$ to be greater than or equal to zero after each distance $d_i$ is added. Alternatively, the cumulative sum $X_i$ can be calculated using the equation:

$$X_i = \min\begin{cases} \sum_{j=1}^{i} d_j \\ 0 \end{cases}$$

which constrains the value of $X_i$ to be greater than or equal to zero at the end of the summation.

In some embodiments, a cumulative sum $X_i$ is calculated for each of the distance values $d_i$ (i.e., $X \ni \{X_1, X_2, \ldots X_n\}$). The cumulative sums $X_i$ can be stored as time series values where each cumulative sum $X_i$ represents an element of the time series and corresponds to a particular element $x_i$ of the original time series.

Flow diagram 1900 is shown to include calculating a performance metric for each of the data points based on the cumulative sums (block 1910). In some embodiments, a performance metric $P_i$ is calculated for each cumulative sum $X_i$. The performance metrics $P_i$ can be calculated using the following equation:

$$P_i = P_{ideal} - G * X_i * \Delta T$$

where $P_{ideal}$ is the maximum possible value of the performance metric $P_i$ (e.g., $P_{ideal}=100$) which indicates ideal performance, G is a tunable gain term, and $\Delta T$ is the sampling period. In some embodiments, the gain G is initially set to a value of approximately G=0.4. The gain G can be adjusted to increase or decrease the impact of the cumulative sum $X_i$ on the calculated performance metric $P_i$. In various embodiments, the gain G can be set based on the type of time series data and/or based on an attribute of an equipment model associated with the time series data, as described with reference to FIG. 6.

Flow diagram 1900 is shown to include detecting faults in the building equipment by comparing the calculated performance metrics to one or more performance thresholds (block 1912). In some embodiments, the performance thresholds are threshold values that define various levels of performance. For example, the threshold values can include a first performance threshold $T_1$ (e.g., $T_1=100$), a second performance threshold $T_2$ (e.g., $T_2=90$), a third performance threshold $T_3$ (e.g., $T_3=80$), and so on. It is contemplated that any number of performance thresholds can be defined and/or used to evaluate the performance metrics $P_i$.

Faults can be detected by evaluating one or more values of the performance metric $P_i$ using fault detection rules. The fault detection rules define faults as a function of the performance metrics $P_i$. For example, a fault detection rule can define a fault as a performance metric $P_i$ below one or more of the threshold values (e.g., $P_i<T_3$). Another fault detection rule can define a fault as multiple consecutive values of the performance metric $P_i$ below a threshold value (e.g., $P_i<T_2$ and $P_{i-1}<T_2$). The fault detection rules can be applied to the time series of performance metrics $P_i$ to determine whether any faults are detected. Detected faults can be provided to fault diagnostics 528 to diagnose a cause of the faults, stored in memory 518, reported to a user, and/or reported to a building management system.

Figure 20:
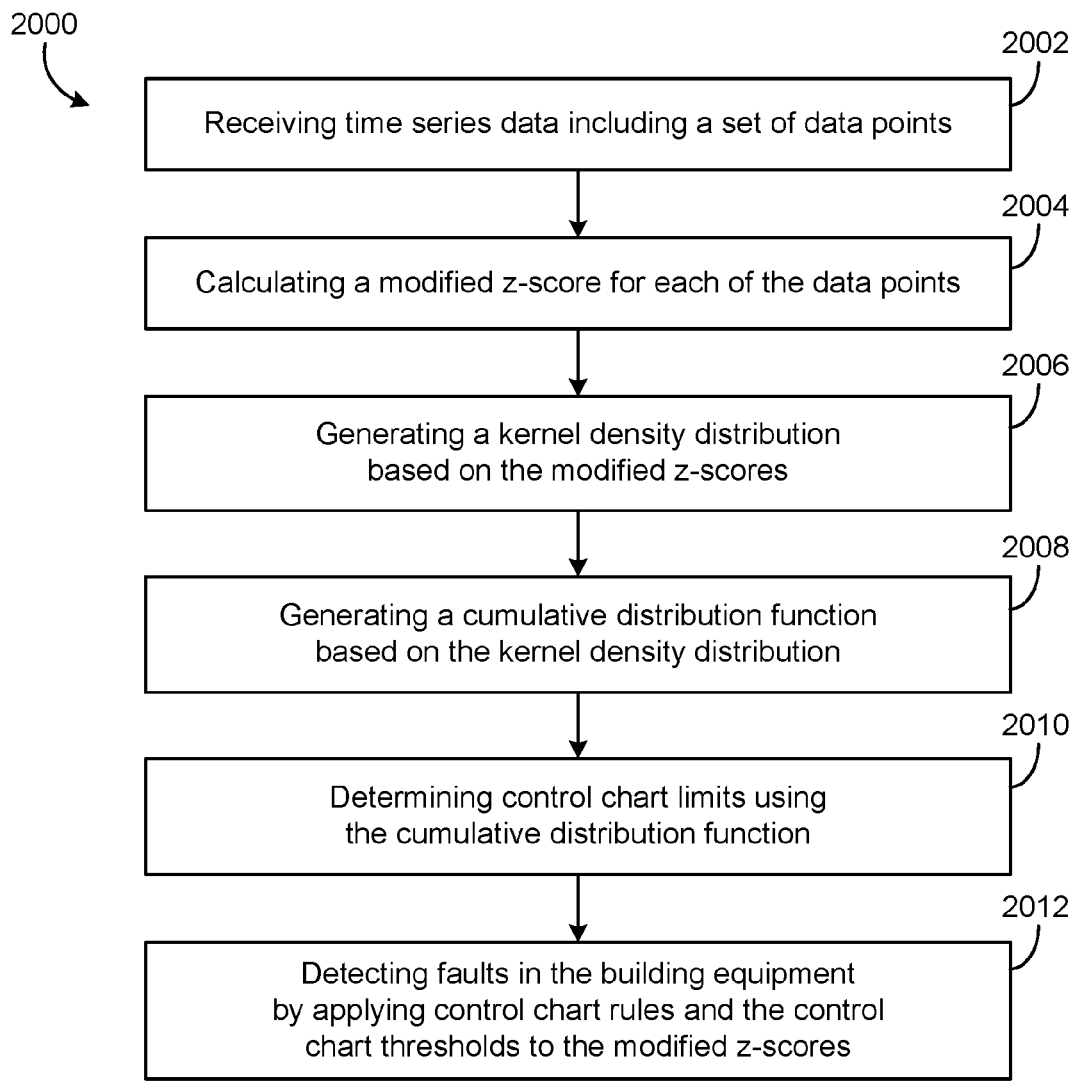
FIG. 20 is a flow diagram 2000 illustrating a kernel density fault detection technique which can be performed by the FDD system, according to some embodiments.

Referring now to FIG. 20, a flow diagram 2000 illustrating the kernel density fault detection technique is shown, according to some embodiments. The kernel density fault detection technique can be used by kernel density fault detector 540 to detect faults in building equipment based on a time series of data, as described with reference to FIG. 6.

Flow diagram 2000 is shown to include receiving time series data including a set of data points (block 2002). The time series of data points can be windowed to select a predetermined range of the data (e.g., 5 days). In some embodiments, each of the data points has a data value affected by operating the building equipment (e.g., if the building equipment is a chiller, heater, compressor, or other operable device). In other embodiments, the time series can include values measured by the building equipment (e.g., if the building equipment is a sensor) or calculated by the building equipment (e.g., if the building equipment is a smart device such as a controller).

The building equipment can include any type of equipment capable of monitoring and/or controlling conditions within a building (e.g., HVAC equipment, lighting equipment, security equipment, fire safety equipment, etc.) or other types of equipment which can be used in or around a building (e.g., ICT equipment, lifts/escalators, refrigeration equipment, advertising or signage, cooling equipment, vending equipment, etc.). The building equipment can include various types of sensors (e.g., temperature sensors, humidity sensors, lighting sensors, motion sensors, voltage sensors, etc.) configured to measure a variable of interest in or around a building (e.g., temperature, humidity, light intensity, power consumption, etc.) and/or controllable equipment configured to affect the measured variable (e.g., heaters, chillers, humidifiers, lighting devices, etc.).

Flow diagram 2000 is shown to include calculating a modified z-score for each of the data points (block 2004). Calculating the modified z-score can include calculating the median absolute deviation MAD of the time series data and/or the median $\tilde{x}$ of the time series data. In some embodiments, the MAD can be calculated using the following equation:

$$MAD = \text{median}(|x_i - \tilde{x}|)$$

where $x_i$ is the ith sample of the time series and $\tilde{x}$ is the median of the samples within the selected data window. The expression $|x_i - \tilde{x}|$ represents the absolute deviation $A_i$ of the sample $x_i$ relative to the median $\tilde{x}$. The function median( ) calculates the median of the set of absolute deviations $A_i$, where $i=1 \ldots n$ and n is the total number of samples within the selected data window.

In some embodiments, the modified z-score $M_i$ is calculated using the following equation:

$$M_i = \frac{x_i - \tilde{x}}{K * MAD} = \frac{x_i - \tilde{x}}{1.4826 * MAD} = \frac{0.6745 * (x_i - \tilde{x})}{MAD}$$

where the constant K has a value of K=1.426 for large and normally distributed data sets. However, it is contemplated that other values of K could be used for other types of data sets. For example, the value of K for a given data set can be selected such that the product K*MAD is equal to the standard deviation σ of the data set. In other words, the value of K can be calculated using the equation $$K = \frac{\sigma}{MAD}.$$

Flow diagram 2000 is shown to include generating a kernel density distribution based on the modified z-scores (block 2006). A kernel density distribution is a nonparametric representation of a probability density function (PDF) of a random variable. Kernel density estimation can be viewed as data smoothing where inferences about the population of data points are made based on a finite data sample (i.e., the samples within the selected data window). The kernel density distribution can be generated based on the normalized set of sample data (i.e., the modified z-scores $M_i$) within the selected data.

In some embodiments, the kernel density distribution is generated using the following equation:

$$f_h(M) = \frac{1}{nh} \sum_{i=1}^{n} K\left(\frac{M - M_i}{h}\right); -\infty < M < \infty$$

where n is the sample size, h is the bandwidth, and the function $$K\left(\frac{M - M_i}{h}\right)$$

is the kernel smoothing function. The kernel smoothing function $$K\left(\frac{M - M_i}{h}\right)$$

is a non-negative function that integrates to one and has a mean of zero (e.g., if the kernel smoothing function is a standardized normal distribution). In other embodiments, the kernel smoothing function can have a non-zero mean and/or can integrate to a value other than one (e.g., if the kernel smoothing function is a chi-square function, a beta function, or other arbitrary distribution). In some embodiments, kernel density estimator 542 uses the normal distribution function as the kernel smoothing function $$K\left(\frac{M - M_i}{h}\right).$$

In other embodiments, any of a variety of other functions can be used as the kernel smoothing function $$K\left(\frac{M - M_i}{h}\right)$$

(e.g., uniform, triangular, biweight, triweight, etc.). A kernel smoothing function $$K\left(\frac{M - M_i}{h}\right)$$

can be generated for each of the modified z-scores $M_i$. For example, if the normal distribution function is used as the kernel smoothing function $$K\left(\frac{M - M_i}{h}\right),$$

a set of normal distribution functions can be generated, each of which is centered at one of the modified z-scores $M_i$.

The kernel density distribution $f_h(M)$ represents a summation of the individual kernel smoothing functions $$K\left(\frac{M - M_i}{h}\right).$$

Like a histogram, the kernel density distribution $f_h(M)$ represents the probability distribution of the modified z-scores $M_i$. However, unlike a histogram, the kernel density distribution $f_h(M)$ sums the component smoothing functions $$K\left(\frac{M - M_i}{h}\right)$$

for each modified z-score $M_i$ to produce a smooth, continuous probability distribution curve instead of placing the data into discrete bins. The kernel density distribution $f_h(M)$ can be generated by summing the individual component smoothing functions using the equation for $f_h(M)$.

Flow diagram 2000 is shown to include generating a cumulative distribution function based on the kernel density distribution (block 2008). In some embodiments, the cumulative distribution function is defined as:

$$F(T) = \int_{-\infty}^{T} f_h(M) dM = P(M \leq T)$$

where M is a random variable representing the modified z-scores. The cumulative distribution function F(t) represents the probability P that a random modified z-score M is less than or equal to the threshold value T, given the kernel density distribution of the modified z-scores defined by $f_h(M)$.

Flow diagram 2000 is shown to include determining control chart limits using the cumulative distribution function (block 2010). In some embodiments, the cumulative distribution function F(T) is used to determine values for the threshold T that correspond to predetermined probability values P. For example, the cumulative distribution function F(T) can be used to define an interval between a lower threshold $T_{low}$ and an upper threshold $T_{up}$ that excludes a predetermined proportion α of random modified z-scores M. In other words, (1−α)*100% of random modified z-scores M will be between $T_{low}$ and $T_{up}$. The lower threshold $T_{low}$ and the upper threshold $T_{up}$ can be defined in terms of the cumulative distribution function F(T) using the following equations:

$$F(T_{low}) = \int_{-\infty}^{T_{low}} f_h(M) dM = P(M \leq T_{low}) = \frac{\alpha}{2}$$

$$F(T_{up}) = \int_{-\infty}^{T_{up}} f_h(M) dM = P(M \leq T_{up}) = 1 - \frac{\alpha}{2}$$

The inverse of the cumulative distribution function F(T) can be used to determine the values of $T_{low}$ and $T_{up}$. The inverse of the cumulative distribution function can be expressed as $F^{-1}(P) = T$, where P is the probability that a random modified z-score M will be less than or equal to the threshold T and $F^{-1}(\ )$ is the inverse of the cumulative distribution function F( ). The inverse cumulative distribution function can be used to determine values of the thresholds $T_{low}$ and $T_{up}$ by substituting the values $$\frac{\alpha}{2} \text{ and } 1 - \frac{\alpha}{2}$$

for P, as shown in the following equations:

$$T_{low} = F^{-1}\left(\frac{\alpha}{2}\right)$$

$$T_{up} = F^{-1}\left(1 - \frac{\alpha}{2}\right)$$

Values of $T_{low}$ and $T_{up}$ can be determined for several different probability values a. For example, values can be determined a first lower threshold $T_{low,1}$ and a first upper threshold $T_{up,1}$ that define an interval which excludes 32% of random modified z-scores M by setting α=0.32. In other words 68% of random modified z-scores M will be between $T_{low,1}$ and $T_{up,1}$. $T_{low,1}$ and $T_{up,1}$ can be calculated using the following equations:

$$T_{low,1} = F^{-1}(0.16)$$

$$T_{up,1} = F^{-1}(0.84)$$

Values can be determined for a second lower threshold $T_{low,2}$ and a second upper threshold $T_{up,2}$ that define an interval which excludes 5% of random modified z-scores M by setting α=0.05. In other words 95% of random modified z-scores M will be between $T_{low,2}$ and $T_{up,2}$. $T_{low,2}$ and $T_{up,2}$ can be calculated using the following equations:

$$T_{low,2} = F^{-1}(0.025)$$

$$T_{up,2} = F^{-1}(0.975)$$

Values can be determined for a third lower threshold $T_{low,3}$ and a third upper threshold $T_{up,3}$ that define an interval which excludes 1% of random modified z-scores M by setting α=0.01. In other words 99% of random modified z-scores M will be between $T_{low,3}$ and $T_{up,3}$. $T_{low,3}$ and $T_{up,3}$ can be calculated using the following equations:

$$T_{low,3} = F^{-1}(0.005)$$

$$T_{up,3} = F^{-1}(0.995)$$

Although several specific values of a are provided, it is contemplated that threshold values $T_{low}$ and $T_{up}$ can be determined for any probability value α in addition to (or in place of) the specific examples described herein. As such, the lower threshold $T_{low}$ can include any number of lower thresholds (e.g., $T_{low,1}$, $T_{low,2}$, $T_{low,3}$, etc.) and the upper threshold $T_{up}$ can include any number of upper thresholds (e.g., $T_{up,1}$, $T_{up,2}$, $T_{up,3}$, etc.).

Flow diagram 2000 is shown to include detecting faults in the building equipment by applying control chart rules and the control chart thresholds to the modified z-scores (block 2012). The control chart rules define faults based on the values of the modified z-scores $M_i$ relative to the various thresholds provided by block 2010. For example, one control chart rule can define a fault as a modified z-score $M_i$ having a value outside the range between the third lower threshold $T_{low,3}$ and the third upper threshold $T_{up,3}$. This control chart rule can be used to detect faults by comparing each of the modified z-scores $M_i$ to both the third lower threshold $T_{low,3}$ and the third upper threshold $T_{up,3}$. A fault can be detected in response to a determination that any of the modified z-scores is less than the third lower threshold $T_{low,3}$ or greater than the third upper threshold $T_{up,3}$ (i.e., fault if $M_i < T_{low,3}$ or $M_i > T_{up,3}$ for i=1 . . . n).

Another control chart rule can define a fault as two of three consecutive modified z-scores $M_i$ having values outside the range between the second lower threshold $T_{low,2}$ and the second upper threshold $T_{up,2}$. This control chart rule can be used to detect faults by comparing each of the modified z-scores $M_i$ to both the second lower threshold $T_{low,2}$ and the second upper threshold $T_{up,2}$. A fault can be detected in response to a determination that two or more of any three consecutive modified z-scores (e.g., $M_i$, $M_{i+1}$, $M_{i+2}$) are less than the second lower threshold $T_{low,2}$ or greater than the second upper threshold $T_{up,2}$ (i.e., fault if $M_i$ AND ($M_{i+1}$ OR $M_{i+2}$) < $T_{low,2}$ or $M_i$ AND ($M_{i+1}$ OR $M_{i+2}$) > $T_{up,2}$ for i=1 . . . n−1).

In block 2012, the control chart rules are used to determine whether any of the criteria provided by the control chart rules are satisfied. If the criteria of a control chart rule are satisfied, FDD system 510 can determine that a fault is detected. Several sets of control chart rules which can be used in block 2012 are described in detail with reference to FIG. 6.

Configuration of Exemplary Embodiments

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements can be reversed or otherwise varied and the nature or number of discrete elements or positions can be altered or varied. Accordingly, all such modifications are intended to be included within the scope of the present disclosure. The order or sequence of any process or method steps can be varied or re-sequenced according to alternative embodiments. Other substitutions, modifications, changes, and omissions can be made in the design, operating conditions and arrangement of the exemplary embodiments without departing from the scope of the present disclosure.

The present disclosure contemplates methods, systems and program products on any machine-readable media for accomplishing various operations. The embodiments of the present disclosure can be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures show a specific order of method steps, the order of the steps may differ from what is depicted. Also two or more steps can be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

What is claimed is:

1. A system for detecting faults in building equipment, the system comprising:
   an integration fault detector configured to detect faults in the building equipment by analyzing time series data using an integration fault detection technique;
   a kernel density fault detector configured to detect faults in the building equipment by analyzing the time series data using a kernel density estimation fault detection technique; and
   a fault detector selector configured to select the integration fault detector or the kernel density fault detector for use in detecting faults in the building equipment based on an attribute of the time series data; and
   a building equipment controller configured to adjust an operation of the building equipment in response to detecting one or more faults in the building equipment.

2. The system of claim 1, wherein the building equipment comprise at least one of:
   one or more individual devices comprising at least one of a heater, a chiller, an air handling unit, a variable air volume unit, a pump, a fan, a cooling tower, a valve, an actuator, a damper, and a thermal energy storage (TES) device;
   a building subsystem comprising at least one of a building electrical subsystem, an information communication technology subsystem, a security subsystem, a HVAC subsystem, a lighting subsystem, a lift/escalators subsystem, a fire safety subsystem, a refrigeration subsystem, an advertising or signage subsystem, a cooking subsystem, a vending subsystem, and a printer or copy service subsystem;
   one or more subplant systems comprising at least one of a heater subplant, a heat recovery chiller subplant, a chiller subplant, a cooling tower subplant, a hot TES subplant, and a cold TES subplant; and
   an energy plant comprising a plurality of the subplant systems.

3. The system of claim 1, wherein:
   the attribute of the time series data indicates that the time series data represent an uncontrolled process variable; and
   the fault detector selector is configured to select the integration fault detector in response to a determination that the time series data represents an uncontrolled process variable.

4. The system of claim 3, wherein the uncontrolled process variable comprises at least one of an efficiency metric for the building equipment, a coefficient of performance for the building equipment, a power consumption of the building equipment, and an uncontrolled flowrate affected by operating the building equipment.

5. The system of claim 1, wherein:
   the attribute of the time series data indicates that the time series data represent a variable controlled to a setpoint; and
   the fault detector selector is configured to select the kernel density fault detector in response to a determination that the time series data represents a variable controlled to a setpoint.

6. The system of claim 5, wherein the variable controlled to a setpoint comprises at least one of a controlled flowrate, a controlled temperature, a controlled pressure, a controlled humidity, and a controlled power consumption.

7. The system of claim 1, wherein:
   the integration fault detector and the kernel density fault detector are configured to initiate a corrective action in response to detecting a fault in the building equipment; and
   the corrective action comprises at least one of generating an alarm, providing a feedback to a controller for the building equipment, shutting off the building equipment, and automatically switching from using the building equipment to using other equipment configured to perform a same function as the building equipment in an automated control process.

8. The system of claim 1, further comprising a modified z-score calculator configured to calculate a modified z-score for each data point of the time series data, wherein the modified z-score is provided as an input to the integration fault detector and the kernel density fault detector.

9. The system of claim 8, wherein the modified z-score calculator is configured to calculate the modified z-score by:
  determining a median of the time series data;
  determining a median absolute deviation of the time series data; and
  using the median and the median absolute deviation to calculate the modified z-score.

10. The system of claim 1, wherein the integration fault detector comprises:
  a distance calculator configured to calculate distance values comprising a distance value for each data point of the time series data;
  an integrator configured to generate, for each data point of the time series data, a cumulative sum of the distance values calculated for the data point and any previous data points in the time series data; and
  a performance metric evaluator configured to calculate calculated performance metrics comprising a performance metric for each data point of the time series data based on the cumulative sum for the data point and to detect faults in the building equipment by comparing the calculated performance metrics to one or more performance thresholds.

11. The system of claim 1, wherein the kernel density fault detector comprises:
  a kernel density estimator configured to generate a kernel density function based on the time series data;
  a cumulative distribution function generator configured to generate a cumulative distribution function based on the kernel density function;
  a threshold calculator configured to determine one or more control chart thresholds using the cumulative distribution function; and
  an abnormal data detector configured to detect faults in the building equipment by applying control chart rules and the control chart thresholds to the time series data.

12. A method for detecting faults in building equipment using an integration fault detection technique, the method comprising:
  operating the building equipment to generate time series data and receiving the time series data, wherein the time series data comprises a plurality of data points each having a value affected by an operation of the building equipment;
  calculating a modified z-score for each of the plurality of data points;
  calculating a distance value for each of the plurality of data points, the distance value indicating a difference between the modified z-score for the data point and an outlier threshold;
  generating, for each of the plurality of data points, a cumulative sum of the distance values calculated for the data point and any previous data points in the time series data;
  calculating, for each of the plurality of data points, a performance metric based on the cumulative sum for the data point;
  detecting faults in the building equipment by comparing the calculated performance metrics to one or more performance thresholds; and
  adjusting the operation of the building equipment in response to detecting one or more faults in the building equipment.

13. The method of claim 12, wherein calculating the modified z-score comprises:
  determining a median of the time series data;
  determining a median absolute deviation of the time series data; and
  using the median and the median absolute deviation to calculate the modified z-score.

14. The method of claim 12, wherein calculating the distance value comprises, for each of the plurality of data points:
  determining whether the modified z-score for the data point is positive or negative;
  calculating a first difference between the modified z-score and a first outlier threshold in response to a determination that the modified z-score is positive; and
  calculating a second difference between the modified z-score and a second outlier threshold in response to a determination that the modified z-score is negative.

15. The method of claim 12, wherein calculating the distance value comprises:
  determining whether the modified z-score for the data point is positive or negative;
  subtracting a first outlier threshold from the modified z-score in response to a determination that the modified z-score is positive; and
  subtracting the modified z-score from a second outlier threshold in response to a determination that the modified z-score is negative.

16. The method of claim 12, wherein generating the cumulative sum comprises, for each of the plurality of data points:
  identifying a previous cumulative sum calculated for a previous data point in the time series data;
  adding the distance value for the data point to the previous cumulative sum;
  determining whether a result of the adding has a negative value;
  in response to a determination that the result of the adding has a negative value, setting the cumulative sum for the data point to zero; and
  in response to a determination that the result of the adding does not have a negative value, setting the cumulative sum for the data point to the result of the adding.

17. The method of claim 16, wherein identifying the previous cumulative sum comprises:
  determining whether the data point is a first data point of the time series data; and
  setting the previous cumulative sum to zero in response to a determination that the data point is the first data point of the time series data.

18. The method of claim 12, wherein the building equipment comprise at least one of:
  one or more individual devices comprising at least one of a heater, a chiller, an air handling unit, a variable air volume unit, a pump, a fan, a cooling tower, a valve, an actuator, a damper, and a thermal energy storage (TES) device;
  a building subsystem comprising at least one of a building electrical subsystem, an information communication technology subsystem, a security subsystem, a HVAC subsystem, a lighting subsystem, a lift/escalators subsystem, a fire safety subsystem, a refrigeration subsystem, an advertising or signage subsystem, a cooking subsystem, a vending subsystem, and a printer or copy service subsystem;
  one or more subplant systems comprising at least one of a heater subplant, a heat recovery chiller subplant, a chiller subplant, a cooling tower subplant, a hot TES subplant, and a cold TES subplant; and an energy plant comprising a plurality of the subplant systems.

19. The method of claim 12, wherein the time series data represent an uncontrolled process variable comprising at least one of an efficiency metric for the building equipment, a coefficient of performance for the building equipment, a power consumption of the building equipment, and an uncontrolled flowrate affected by operating the building equipment.

20. A method for detecting faults in building equipment using a kernel density fault detection technique, the method comprising:
   operating the building equipment to generate time series data and receiving the time series data, wherein the time series data comprise a plurality of data points each having a value affected by an operation of the building equipment;
   calculating modified z-scores comprising a modified z-score for each of the plurality of data points;
   generating a kernel density distribution based on the modified z-scores;
   generating a cumulative distribution function based on the kernel density distribution;
   determining one or more control chart thresholds using the cumulative distribution function;
   detecting faults in the building equipment by applying control chart rules and the control chart thresholds to the modified z-scores; and
   adjusting the operation of the building equipment in response to detecting one or more faults in the building equipment.

21. The method of claim 20, wherein the cumulative distribution function is an empirical cumulative distribution function derived from empirical data.

22. The method of claim 20, wherein generating the kernel density distribution comprises:
   generating kernel smoothing function comprising a kernel smoothing function for each of the modified z-scores; and
   combining the kernel smoothing functions to form the kernel density distribution.

23. The method of claim 20, wherein the cumulative distribution function expresses a probability that a random modified z-score has a value less than or equal to a threshold value, wherein the random modified z-score is selected from a set of modified z-scores defined by the kernel density distribution.

24. The method of claim 20, wherein determining the one or more control chart thresholds comprises:
   identifying one or more probability values;
   generating an inverse of the cumulative distribution function; and
   using the one or more probability values as inputs to the inverse of the cumulative distribution function to determine a control chart threshold corresponding to each of the probability values.

25. The method of claim 20, wherein detecting faults in the building equipment by applying the control chart rules and the control chart thresholds to the modified z-scores comprises at least one of:
   determining that a fault exists in response to a determination that a predetermined number of the modified z-scores are outside of a first range defined by the control chart thresholds; and
   determining that a fault exists in response to a determination that a percentage of the predetermined number of the modified z-scores are outside of a second range defined by the control chart thresholds, the second range being wider than the first range.

26. The method of claim 20, wherein the building equipment comprise at least one of:
   one or more individual devices comprising at least one of a heater, a chiller, an air handling unit, a variable air volume unit, a pump, a fan, a cooling tower, a valve, an actuator, a damper, and a thermal energy storage (TES) device;
   a building subsystem comprising at least one of a building electrical subsystem, an information communication technology subsystem, a security subsystem, a HVAC subsystem, a lighting subsystem, a lift/escalators subsystem, a fire safety subsystem, a refrigeration subsystem, an advertising or signage subsystem, a cooking subsystem, a vending subsystem, and a printer or copy service subsystem;
   one or more subplant systems comprising at least one of a heater subplant, a heat recovery chiller subplant, a chiller subplant, a cooling tower subplant, a hot TES subplant, and a cold TES subplant; and
   an energy plant comprising a plurality of the subplant systems.

27. The method of claim 20, wherein the time series data represent a variable controlled to a setpoint comprising at least one of a controlled flowrate, a controlled temperature, a controlled pressure, a controlled humidity, and a controlled power consumption.

* * * * *